United States Patent
Lee et al.

(10) Patent No.: US 9,794,913 B2
(45) Date of Patent: Oct. 17, 2017

(54) SYSTEMS AND/OR METHODS FOR PROVIDING EPDCCH IN A MULTIPLE CARRIER BASED AND/OR QUASI-COLLATED NETWORK

(71) Applicant: InterDigital Patent Holdings, Inc., Wilmington, DE (US)

(72) Inventors: Moon-il Lee, Farmingdale, NY (US); Changsoo Koo, Melville, NY (US); Sung-Hyuk Shin, Northvale, NJ (US); Janet A. Stern-Berkowitz, Little Neck, NY (US); Marian Rudolf, Montreal (CA); Fengjun Xi, Huntington Station, NY (US); Ananth Kini, Philadelphia, PA (US); Seyed Mohsen Hosseinian, East Northport, NY (US); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 242 days.

(21) Appl. No.: 13/751,114

(22) Filed: Jan. 27, 2013

(65) Prior Publication Data
US 2013/0194931 A1   Aug. 1, 2013

Related U.S. Application Data

(60) Provisional application No. 61/591,508, filed on Jan. 27, 2012, provisional application No. 61/612,834, (Continued)

(51) Int. Cl.
| H04J 1/16 | (2006.01) |
|---|---|
| H04W 72/04 | (2009.01) |
| H04L 5/00 | (2006.01) |

(52) U.S. Cl.
CPC ........... *H04W 72/04* (2013.01); *H04L 5/0053* (2013.01)

(58) Field of Classification Search
None
See application file for complete search history.

(56) References Cited

U.S. PATENT DOCUMENTS

| 2011/0252139 A1* | 10/2011 | Bhattad et al. ............... 709/226 |
|---|---|---|
| 2011/0268078 A1 | 11/2011 | Ahn et al. |

(Continued)

FOREIGN PATENT DOCUMENTS

| CN | 102036297 A | 4/2011 |
|---|---|---|
| CN | 102170703 A | 8/2011 |

(Continued)

OTHER PUBLICATIONS

U.S. Appl. No. 61/523,568 for Nory et al. (US 2013/0044664 A1).*
(Continued)

*Primary Examiner* — Kibrom T Hailu
(74) *Attorney, Agent, or Firm* — Condo Roccia Koptiw LLP

(57) ABSTRACT ePDCCH may be provided. For example, a WTRU may receive a configuration for monitoring an ePDCCH resource. Based on the configuration, the WTRU may be configured to monitor and may monitor the ePDCCH resource on a particular subframe. Additionally, a WTRU may derive an aggregation level for a subframe associated with an aggregation level number $N_{AL}$. The WTRU may transmit or monitor an ePDCCH using the aggregation level associated with the $N_{AL}$ for the subframe. A WTRU may also receive a reference signal. The WTRU may then determine the type of reference signal received. The WTRU may perform a demodulation of the PDSCH or ePDCCH using a demodulation timing based on the determined type. The ePDCCH or PDSCH may also be monitored or received by identifying a demodulation reference timing implicitly based on a location of one or more ePDCCH resources where the WTRU may receive DCI.

30 Claims, 30 Drawing Sheets

Related U.S. Application Data filed on Mar. 19, 2012, provisional application No. 61/688,164, filed on May 9, 2012, provisional application No. 61/644,972, filed on May 9, 2012, provisional application No. 61/678,612, filed on Aug. 1, 2012, provisional application No. 61/706,119, filed on Sep. 26, 2012, provisional application No. 61/720,646, filed on Oct. 31, 2012, provisional application No. 61/753,279, filed on Jan. 16, 2013.

(56) References Cited

U.S. PATENT DOCUMENTS

| | | | |
|---|---|---|---|
| 2011/0269442 A1* | 11/2011 | Han | H04W 72/082 455/418 |
| 2012/0106374 A1 | 5/2012 | Gaal et al. | |
| 2013/0010685 A1* | 1/2013 | Kim et al. | 370/315 |
| 2013/0044664 A1* | 2/2013 | Nory | H04L 1/0045 370/311 |
| 2013/0058285 A1* | 3/2013 | Koivisto et al. | 370/329 |
| 2013/0083736 A1* | 4/2013 | Yin et al. | 370/329 |
| 2013/0086188 A1* | 4/2013 | Mays et al. | 709/206 |
| 2013/0114521 A1* | 5/2013 | Frenne et al. | 370/329 |
| 2013/0163551 A1 | 6/2013 | Zhu et al. | |
| 2014/0126487 A1* | 5/2014 | Chen et al. | 370/329 |
| 2016/0254938 A1 | 9/2016 | Morozov et al. | |

FOREIGN PATENT DOCUMENTS

| | | |
|---|---|---|
| RU | 2439809 C2 | 9/2011 |
| RU | 2573393 C2 | 1/2016 |
| WO | WO 2010/082877 A1 | 7/2010 |
| WO | WO 2010/141611 A1 | 12/2010 |
| WO | WO 2011/103308 A2 | 8/2011 |

OTHER PUBLICATIONS

3rd Generation Partnership Project (3GPP), R1-112517, "Discussion on ePDCCH Design Issues", Samsung, TSG-RAN1 #66 Meeting, Athens, Greece, Aug. 22-26, 2011, 4 pages.
3rd Generation Partnership Project (3GPP), R1-113743, "Design of E-PDCCH Search Space", CATT, TSG RAN WG1 Meeting #67, San Francisco, USA, Nov. 14-18, 2011, 3 pages.
3rd Generation Partnership Project (3GPP), R1-113957, DM RS Sequence Setting for Downlink CoMP, ETRI, TSG RAN WG1 Meeting #67,San Francisco, USA, Nov. 14-18, 2011,3 pages.
3rd Generation Partnership Project (3GPP), R1-113993, "UE Behaviors According to Search Space Configuration", LG Electronics, TSG RAN WG1 Meeting #67, San Francisco, US, Nov. 14-18, 2011, 2 pages.
3rd Generation Partnership Project (3GPP), R1-114081, "Mapping Design for E-PDCCH in Rel-11",NTT DOCOMO, TSG RAN WG1 Meeting #67, San Francisco, USA, Nov. 14-18, 2011, 5 pages.
3rd Generation Partnership Project (3GPP), R1-114112, "DM-RS Configuration in Support of Downlink CoMP", Qualcomm Incorporated, TSG-RAN WG1 #67, San Francisco, USA, Nov. 14-18, 2011, 4 pages.
3rd Generation Partnership Project (3GPP), R1-114125, "Search Space Design for e-PDCCH", Qualcomm Incorporated, TSG RAN WG1 #67, San Francisco, USA, Nov. 14-18, 2011, 3 pages.
$3^{rd}$ Generation Partnership Project (3GPP), TS 36.211 V10.1.0, "$3^{rd}$ Generation Partnership Project; Technical Specification Group Radio Access Network; Evolved Universal Terrestrial Radio Access (E-UTRA); Physical Channels and Modulation (Release 10)", Mar. 2011, 103 pages.
$3^{rd}$ Generation Partnership Project (3GPP), 36.212 V10.1.0, $3^{rd}$ Generation Partnership Project; Technical Specification Group Radio Access Network; Evolved Universal Terrestrial Radio Access (E-UTRA); Multiplexing and channel coding (Release 10), Mar. 2011, 76 pages.
$3^{rd}$ Generation Partnership Project (3GPP), TS 36.213 V10.1.0, $3^{rd}$ Generation Partnership Project; Technical Specification Group Radio Access Network; Evolved Universal Terrestrial Radio Access (E-UTRA); Physical layer procedures (Release 10), Mar. 2011, 115 pages.
$3^{rd}$ Generation Partnership Project (3GPP), R1-122002, "On Aggregation Levels for ePDCCH", Ericsson, ST-Ericsson, 3GPP TSG-RAN WG1 #69, Prague, Czech Republic, May 21-25, 2012, 2 pages.
$3^{rd}$ Generation Partnership Project (3GPP), R1-121369, "Co-located and non-colocated antenna ports", Renesas Mobile Europe Ltd., 3GPP TSG-RAN WG1 Meeting # 68 bis, Jeju, Korea, Mar. 26-30, 2012, 6 pages.
$3^{rd}$ Generation Partnership Project (3GPP), R1-121919, "LS response on antenna ports co-location", 3GPP TSG-RAN1 Meeting # 68bis, Jeju, Korea, Mar. 26-30, 2012, 2 pages.

* cited by examiner

Figure 17

| | | | | |
|---|---|---|---|---|
| 0 | 9 | 18 | 27 | eCCE # 0 |
| 1 | 10 | 19 | 28 | eCCE # 1 |
| 2 | 11 | 20 | 29 | eCCE # 2 |
| 3 | 12 | 21 | 30 | eCCE # 3 |
| 4 | 13 | 22 | 31 | eCCE # 4 |
| 5 | 14 | 23 | 32 | eCCE # 5 |
| 6 | 15 | 24 | 33 | eCCE # 6 |
| 7 | 16 | 25 | 34 | eCCE # 7 |
| 8 | 17 | 26 | 35 | eCCE # 8 |

SYSTEMS AND/OR METHODS FOR PROVIDING EPDCCH IN A MULTIPLE CARRIER BASED AND/OR QUASI-COLLATED NETWORK

CROSS-REFERENCE TO RELATED APPLICATIONS

This application claims the benefit of U.S. Provisional Patent Application Nos. 61/591,508 filed Jan. 27, 2012; 61/612,834 filed Mar. 19, 2012; 61/688,164 filed May 9, 2012; 61/644,972 filed May 9, 2012; 61/678,612 filed Aug. 1, 2012; 61/706,119 filed Sep. 26, 2012; 61/720,646 filed Oct. 31, 2012; and 61/753,279 filed Jan. 16, 2013, the contents of which are hereby incorporated by reference herein.

BACKGROUND

Current communication systems (e.g., a LTE/LTE-Advanced system) may provide multiple antennas, multiple component carriers, and/or quasi-collated antenna ports to support transmissions. Such multiple antennas, multiple component carriers, and/or quasi-collated antenna ports may be provided for various purposes including peak system throughput enhancement, extended cell coverage, higher Doppler support, and the like. Unfortunately, such communication systems may provide an ePDCCH design that may be focused on a single component carrier (e.g., rather than multiple component carriers and/or multiple antennas) and/or may not be suitable to support quasi-collated antenna ports such that performance in a multiple carrier system may be limited and/or may not be adequately designed to avoid errors in frames and/or subframes (e.g., special subframes), may have tighter PDSCH and/or CSI reporting processing times, may not provide suitable PUCCH resource allocation, may not provide a PDCCH indication during a configuration and/or reference symbols that may be quasi-collated with an antenna port may not be provided at a sufficient time for use by ePDCCH and/or the decoding thereof.

SUMMARY

Systems, methods, and instrumentalities may be disclosed to provide ePDCCH in a multiple carrier communication system. For example, a UE or WTRU may receive a configuration for monitoring an ePDCCH resource. Based on such a configuration, the UE or WTRU may be configured to monitor the ePDCCH resource on a particular subframe. The WTRU may then monitor the ePDCCH resource on the subframe. In example embodiments, the subframe may not be a special subframe, the configuration may be received via higher layer signalling, the configuration may includes one or more PRB sets for monitoring on the ePDCCH resource where the PRB sets may include a set of eCCEs that include eREGs, further monitoring a PDCCH resource on a different subframe, demodulating the ePDCCH resource, and the like.

Systems, methods, and instrumentalities may also be disclosed for providing an ePDCCH based on an aggregation level. For example, a UE or WTRU may derive an aggregation level (e.g., an eCCE aggregation level) for a subframe. The UE or WTRU may derive such an aggregation level based on an aggregation level number $N_{AL}$ for the subframe where, in an embodiment, $N_{AL}$ may be a positive integer. The UE or WTRU may transmit or monitor an ePDCCH according to or using an aggregation level associated with the $N_{AL}$ for the subframe. For example, if a search space is {1,2,4,8} and $N_{AL}$ is 2, the UE or WTRU may monitor according to {2,4,8,16}.

Systems, methods, and instrumentalities may further be disclosed herein for receiving or monitoring ePDCCH or PDSCH. For example, a UE or WTRU may receive a reference signal. The UE or WTRU may then determine the type of reference signal received. The UE or WTRU may perform a demodulation of the PDSCH or ePDCCH using a demodulation timing based on the type. For example, when the reference signal may be a channel state information reference signal (CSI-RS), a PDSCH demodulation may be performed using a demodulation reference timing based on a Fast Fourier Transform (FFT) timing and a channel estimation coefficient associated with the CSI-RS. In additional embodiments, the ePDCCH or PDSCH may be monitored by identifying a demodulation reference timing implicitly based on a location of one or more ePDCCH resources where the UE or WTRU may receive downlink control information (DCI).

BRIEF DESCRIPTION OF THE DRAWINGS

A more detailed understanding may be had from the following description, given by way of example in conjunction with the accompanying drawings.

FIG. 17 illustrates an example embodiment of carrier aggregation with different TDD UL-DL configuration(s).

FIG. 22 illustrates an example embodiment of a block interleaver.

DETAILED DESCRIPTION

Figure 1A:
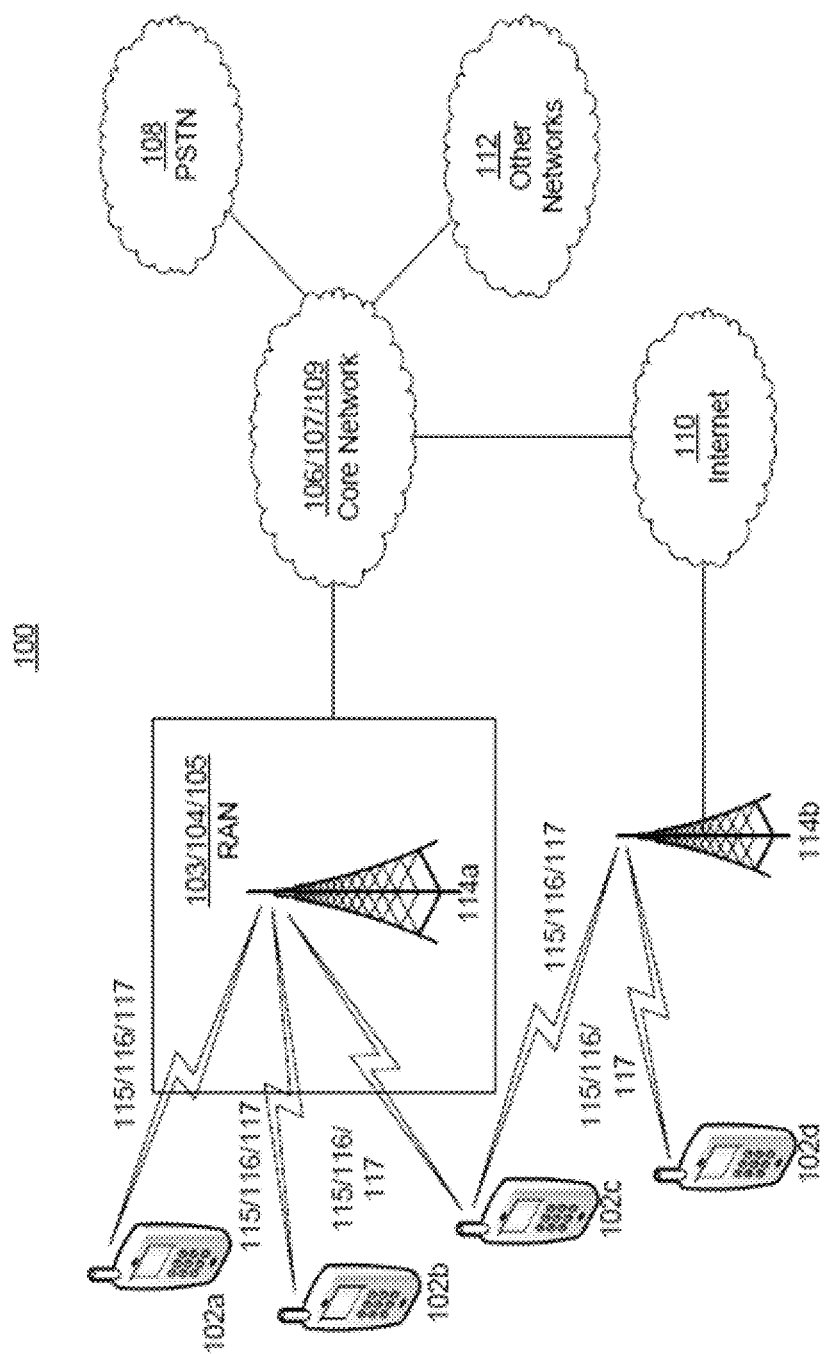
FIG. 1A depicts a diagram of an example communications system in which one or more disclosed embodiments may be implemented.

A detailed description of illustrative embodiments may now be described with reference to the FIGs. However, while the embodiments herein may be described in connection with exemplary embodiments, they should not be limited thereto and other embodiments may be used or modifications and additions may be made to the described embodiments for performing the same, or similar, functions of the disclosure without deviating therefrom. In addition, the FIGs. may illustrate call flows that may be exemplary. It should be understood that other embodiments may be used. The order of the flows may be varied. Also, flows may be omitted if not implemented and additional flows may be added.

Systems and/or methods for providing an efficient downlink control channel design (e.g., an enhanced downlink control channel) in a multi-carrier based wireless network (e.g., such as the network described in FIGS. 1A-1E) may be disclosed. For example, such systems and/or methods may provide and/or use localized and/or distributed resource allocation in multiple carrier system including, for example, distributed resource allocation across multiple component carriers may be provided. Additionally, PDSCH and/or CSI feedback processing time relaxation may be provided and/or used in such systems and/or methods including flexible PDSCH processing time adaptation based on multiple component carrier reception in combination with ePDCCH and/or flexible CSI reporting time adaptation based on reporting bandwidth, the number of component carriers, and the like. In an embodiment, such systems and/or methods may further provide and/or use ePDCCH and/or legacy uplink control signaling relations including cross-carrier scheduling and/or a new allocation of an ePDCCH physical and/or logical address (e.g., a CCE index) for the relation of uplink control channels. TDD specific embodiments for such systems and/or methods may also be provided and/or used including ePDCCH usage in a special subframe and/or TDD inter-band. According to an example embodiment, a PDCCH fallback transmission mode may be provided and/or used for such systems and/or methods where UE or WTRU behaviors of a PDCCH reception in an ambiguity period with a RRC-configured PDCCH configuration between legacy PDCCH and ePDCCH.

Additionally, such systems and/or methods may provide and/or use a variable eREG and/or eCCE definition including, for example, a full FDM based eREG definition. Such systems and/or method may further provide and/or use an eCCE-to-eREG mapping based on an ePDCCH transmission mode, an interleaver design with a variable eREG and/or eCCE definition, an adaptive eREG-to-eCCE mapping (e.g., a variable number of eREGs per eCCE according to a reference signal overhead in a subframe), and the like. In an embodiment, an antenna port association for eREG and/or eCCE may be provided and/or used in such systems and/or methods including a location and/or aggregation level based antenna port mapping and/or a PRG size definition for PRB-bundling. An ePDCCH search space design including, for example, a common search space and/or a WTRU or UE-specific search space, a TBS restriction according to a TA and/or CSI feedback request, and/or a PUCCH allocation based on an ePDCCH with multiple downlink component carriers may also be provided and/or used with such systems and/or methods.

According to an embodiment, such systems and/or methods may provide and/or use an antenna port association with a WTRU or UE-specific configuration including combinations of a RE-position based mapping and/or a WTRU or UE-specific configuration and/or antenna port mapping rules based on a common search space and WTRU or UE-specific search space in a distributed transmission. In an embodiment, collision handling between ePDCCH resources and legacy signals other than PDSCH including rate-matching and/or puncturing rules may be provided and/or used for such systems and/or methods. Additionally, adaptive eREG-to-eCCE mapping, a mapping rule based on a subframe characteristic, and the like may be provided and/or used. In additional embodiments, a TBS restriction in a TDD mode according to a HARQ-ACK timing may be provided and/or used.

Such systems and/or methods may further provide and/or use an ePDCCH resource. For example, multiple ePDCCH resource sets with variable resource sizes per set may be provided and/or used depending on the system bandwidth including a downlink control information (DCI) format dependent on ePDCCH candidates, an ePDCCH resource set dependent on a hashing function, and/or an ePCFICH indication of the number of ePDCCH resource sets.

PUCCH (A/N) resource allocation for ePDCCH may also be provided and/or used (e.g., in such systems and/or methods) including support for MU-MIMO.

In an embodiment, such systems and/or methods may also provide PRS collision handling techniques including broadcasting PRS configuration information and/or providing WTRU or UE behaviors when ePDCCH resources may collide with a PRS.

Multiple ePDCCH resource sets for a multiple carrier system may further be provided and/or defined by such systems and/or methods. For example, a DM-RS sequence may be defined. In such an embodiment, A DM-RS sequence generator (XID) may be provided, used, and/or defined per ePDCCH set or for each ePDCCH set. Additionally, when a WTRU or UE may receive a PDSCH associated with an ePDCCH, the same XID received from ePDCCH may be used for PDSCH demodulation. In additional embodiments, PUCCH resource allocation with multiple ePDCCH resource sets may be provided and/or used and/or a search space definition of localized transmissions including an ePDCCH transmission specific hash function definition and/or ePDCCH transmission specific eCCE indexing such as different eCCE indexing according to or based on an aggregation level may be provided and/or used. eREG-to-eCCE mapping may also be provided and/or used. For example, a cell-specific eREG-to-eCCE mapping based on the localized and distributed transmissions may be provided and/or used. In an embodiment, supported transmission modes associated with ePDCCH may also be provided and/or defined including, for example, a subset of transmission modes supported by ePDCCH and/or (e.g., according to the transmission scheme) the supportable ePDCCH type (e.g., localized and distributed) that may be different.

Additionally, such systems and/or methods may provide ePDCCH a WTRU or UE-specific search space (e.g., an equation associated therewith) and a hash function. For example, a search space equation for localized and distributed ePDCCH and/or a hash function with multiple ePDCCH sets may be provided and/or used Such systems and/or methods may further provide an ePDCCH common search space including an eREG/eCCE definition for the common search space, starting symbol (e.g., associated therewith), a resource definition/configuration, and/or support for overlapping resources between UE-specific search space and common search space.

Systems and methods providing a demodulation reference timing indication may be disclosed. For example, single demodulation reference timing support and multiple demodulation reference timing support such as resource specific demodulation reference timing and an indication of a demodulation reference timing (e.g., a demodulation reference timing indication) may be provided as described herein.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b may be each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
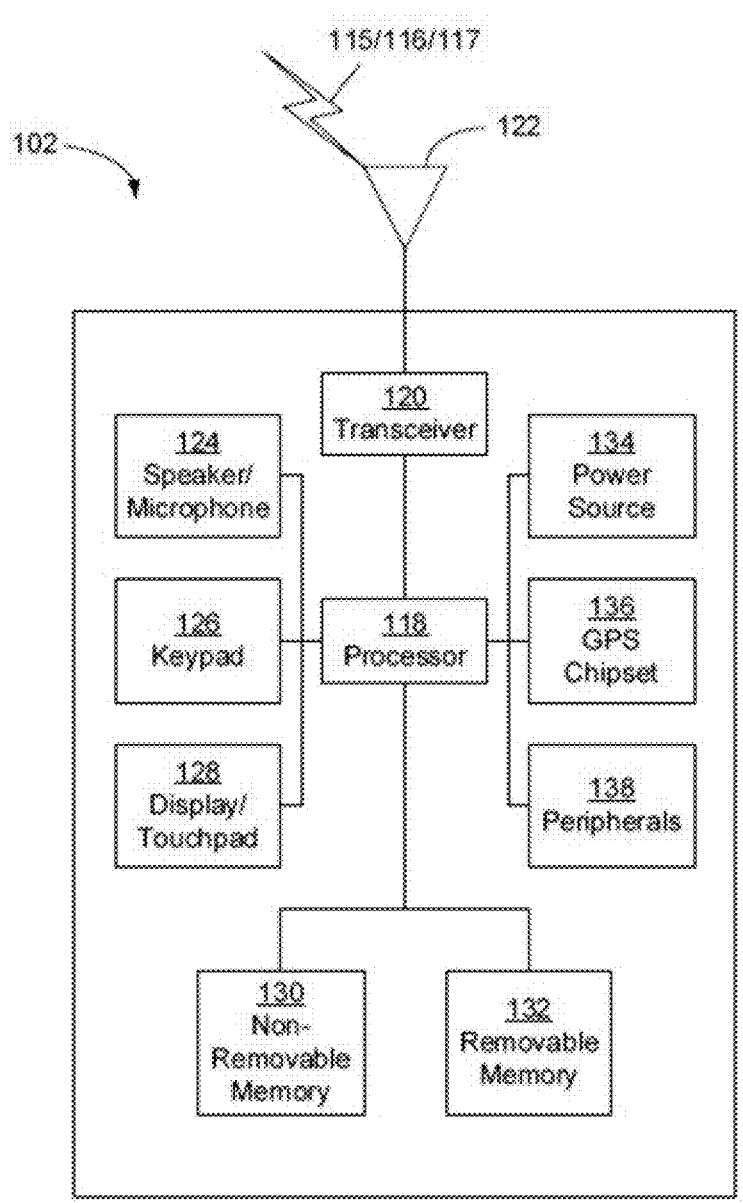
FIG. 1B depicts a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that may be to be transmitted by the transmit/receive element 122 and to demodulate the signals that may be received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
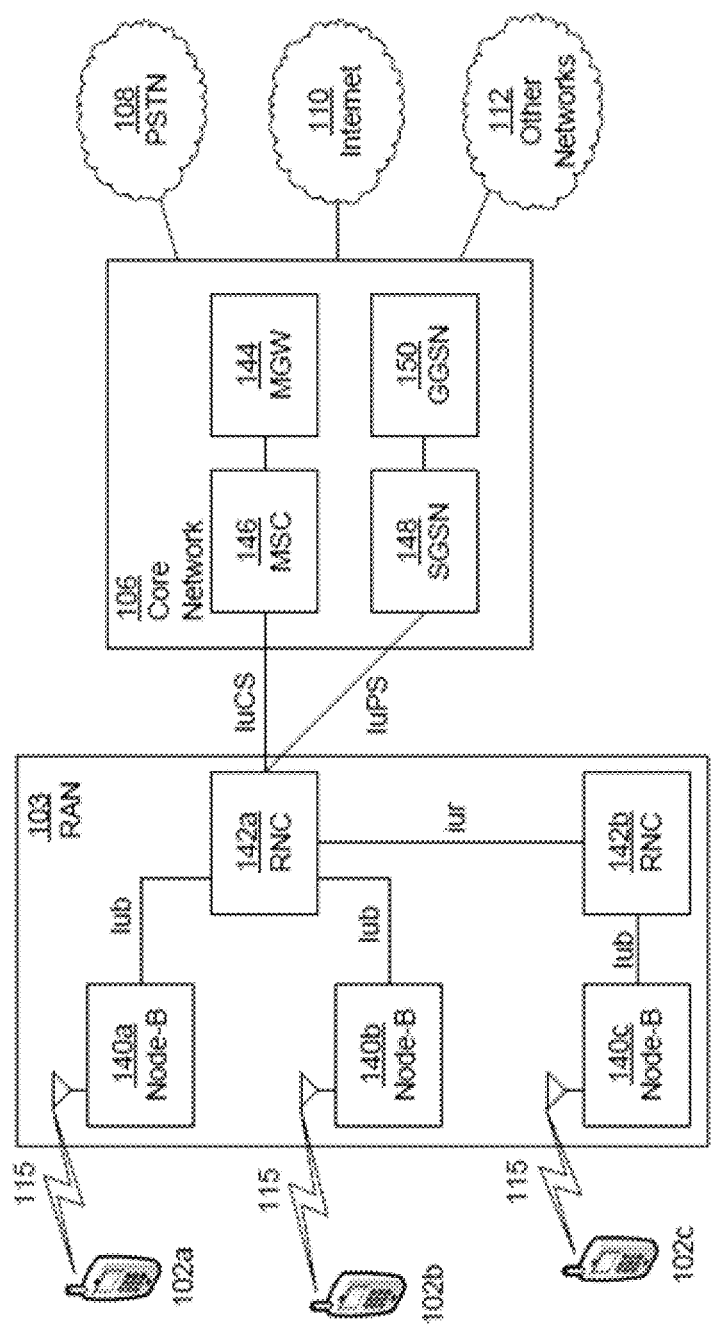
FIG. 1C depicts a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements may be depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that may be owned and/or operated by other service providers.

Figure 1D:
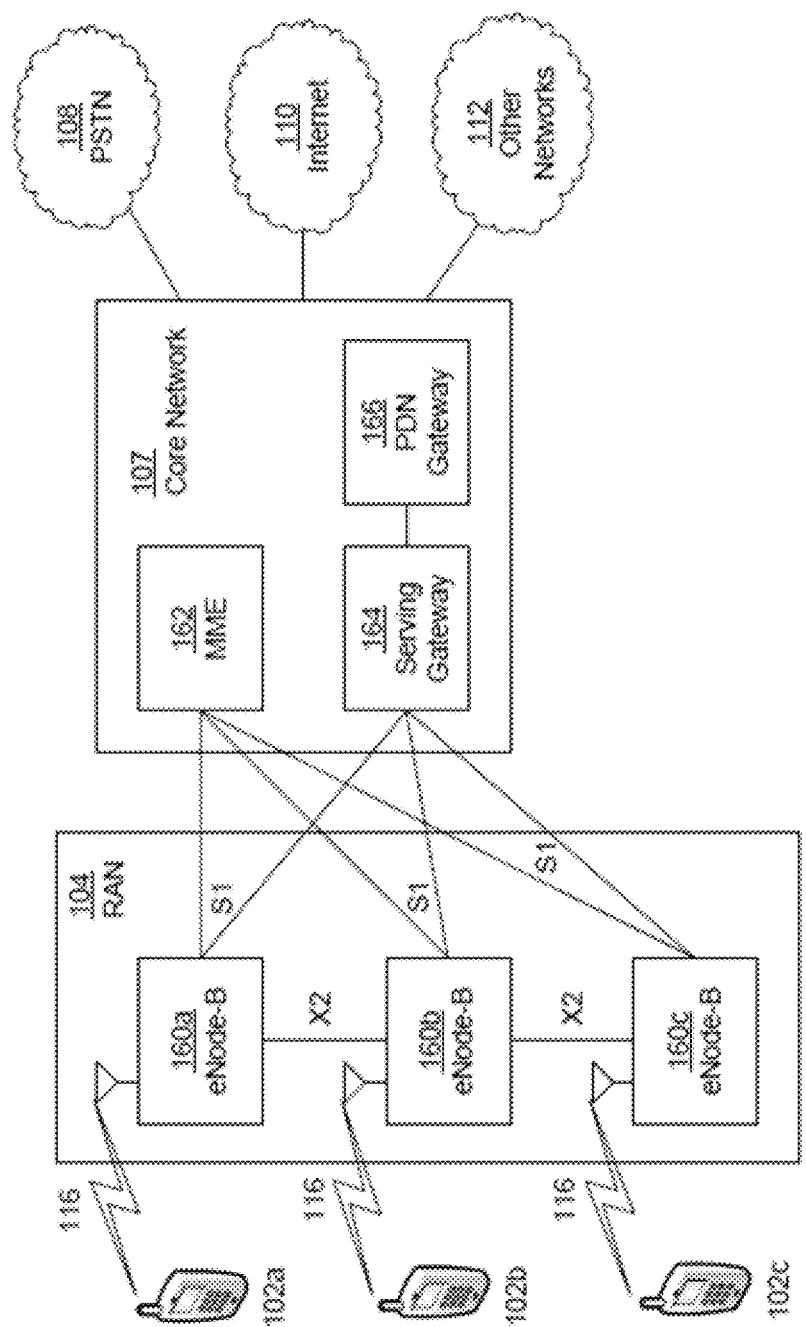
FIG. 1D depicts a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management entity (MME) 162, a serving gateway 164, and a packet data network (PDN) gateway 166. While each of the foregoing elements may be depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that may be owned and/or operated by other service providers.

Figure 1E:
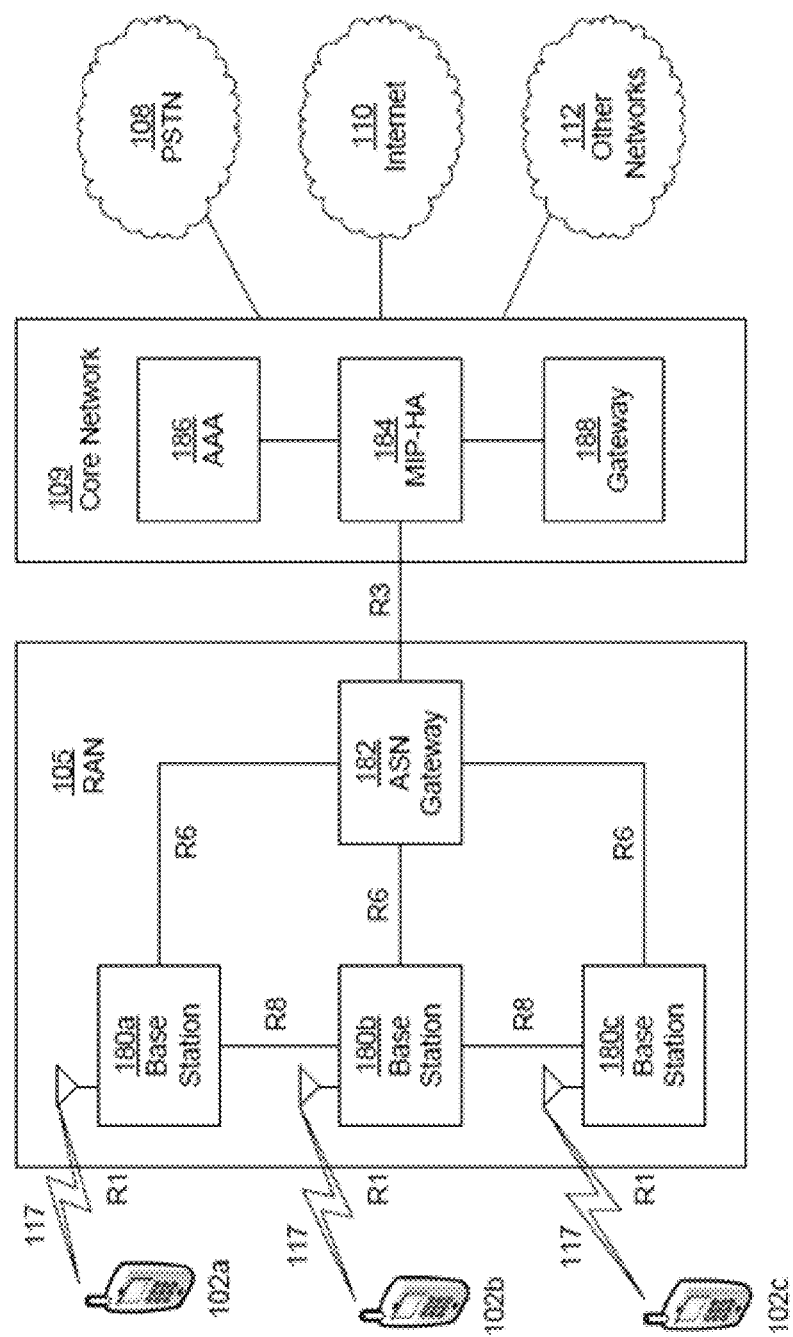
FIG. 1E depicts a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements may be depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that may be owned and/or operated by other service providers.

Although not shown in FIG. 1E, it should be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

According to an example embodiment, collaborative and/or multiple antenna transmissions may be provided in a communication system (e.g., a LTE/LTE-Advanced system) such as the communication system 100 described above with respect to FIGS. 1A-1E. In embodiments, such collaborative transmissions may be provided and/or used such that a PDSCH transmission for a WTRU or UE (e.g., a LTE-A WTRU or UE) may be dynamically changed between transmission points without a cell selection/re-selection procedure. A WTRU or UE-specific RS based downlink control channel transmission may also be provided and/or used, for example, to enhance PDCCH performance.

Additionally, such multiple antenna transmissions may be provided and/or used for various purposes including peak system throughput enhancement, extended cell coverage and high Doppler support. For example, single-user multiple-input multiple-output (SU-MIMO) may be used in such the communication system to increase peak and/or average user equipment (UE) or WTRU throughput. Additionally, multi-user MIMO may be used in such a communication system to improve peak and/or average system throughput by exploiting multi-user diversity gain. Table 1 illustrates example MIMO capabilities that may be used in a wireless communication system to improve throughput, diversity gain, and the like.

TABLE 1

Example MIMO Capabilities in a Communication System (e.g., in LTE/LTE-Advanced)

| Key | 3GPP E-UTRA | | |
|---|---|---|---|
| Downlink MIMO | LTE | | LTE-Advanced |
| Techniques | Release 8 | Release 9 | Release 10 |
| DL SU MIMO | Up to 4 streams | Up to 4 streams | Up to 8 streams |
| MU-MIMO | Up to 2 users (unitary precoding) | Up to 4 users (non-unitary precoding) | Up to 4 users (non-unitary precoding) |
| UL SU-MIMO | 1 stream | 1 stream | Up to 4 streams |
| MU-MIMO | Up to 8 users | Up to 8 users | Up to 8 users |

To assist with the MIMO performance (e.g., according to or based on WTRU or UE channel environments), up to, for example, nine transmission modes have been employed. Such transmission modes may include a transmit diversity mode, an open-loop spatial multiplexing mode, a closed-loop spatial multiplexing mode, and the like. Additionally, MIMO link adaption may be used and/or provided. In embodiments, a WTRU or UE may report channel-state information (CSI) of multiple transmit antenna ports to enable or facilitate such a MIMO link adaptation.

For example, a reference signal may be provided and/or used, for example, with the CSI. In an embodiment, a reference signal may be provided as or classified to a WTRU or UE-specific reference signal (WTRU or UE-RS) and/or a cell-specific reference signal (CRS). According to an embodiment, the WTRU or UE-RS may be used for a specific WTRU or UE such that the RS may be transmitted for the resources allocated to the WTRU or UE. Additionally, in an embodiment, the CRS may be a cell-specific reference signal that may be shared by each of the UEs in the cell such that the RS may be transmitted in a wideband manner.

According to or based on use, a reference signal (RS) may be, for example, differentiated to a demodulation reference signal (DM-RS) and/or a channel-state-information reference signal (CSI-RS). The DM-RS may be used for a particular WTRU or UE and the RS may be precoded to exploit beamforming gain. In an embodiment, the WTRU or UE-specific DM-RS may not be shared with other UEs in the cell. As such, the DM-RS may be transmitted in the time and/or frequency resources allocated for the WTRU or UE. Additionally, the DM-RS may be limited for use with demodulation.

Figure 2:
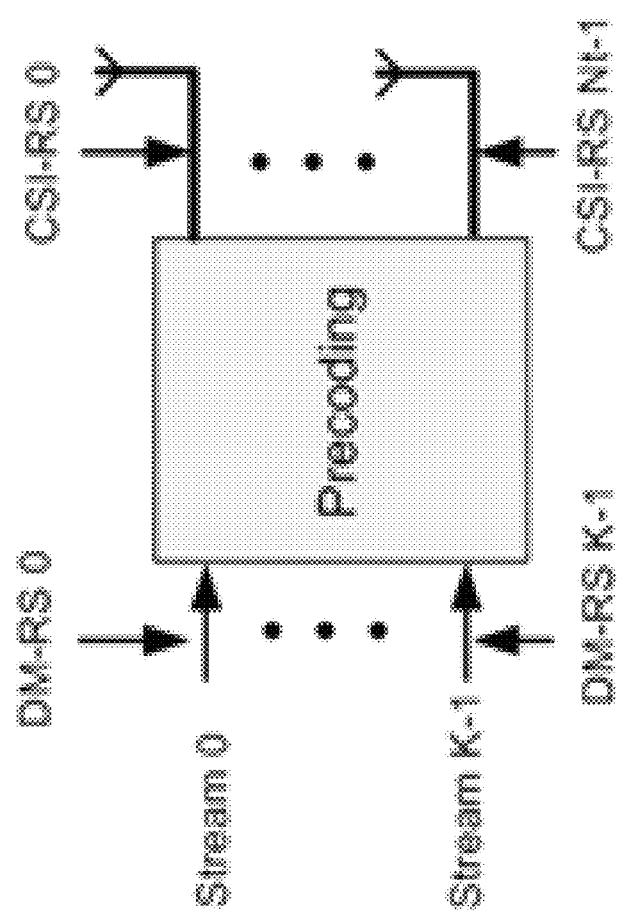
FIG. 2 illustrates an example embodiment of a WTRU or UE-specific precoded DM-RS.

FIG. 2 illustrates an example embodiment of providing a WTRU or UE-specific precoded DM-RS. As shown in FIG. 2, if a precoded DM-RS may be employed, the RS may be precoded using a precoding used for the data symbol and the number of RS sequences corresponding to the number of layers K may be transmitted. In an embodiment, K may be equal to or smaller than physical antenna ports $N_T$. Additionally, the K streams in FIG. 2 may be allocated for a WTRU or UE or shared with multiple UEs. If multiple UEs may share the K streams, the co-scheduled UEs may share the same time/frequency resources at the same time.

Figure 3:
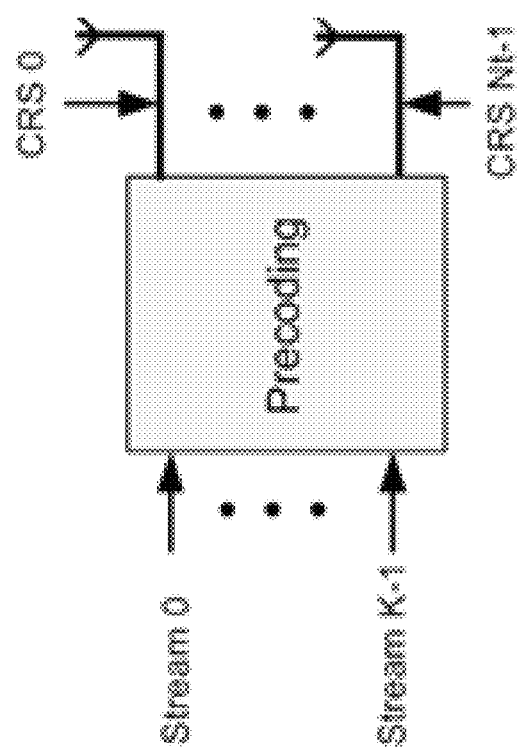
FIG. 3 illustrates an example embodiment of a non-precoded cell-specific RS.

As described above, a cell-specific reference signal (CRS) may be provided and/or used. According to an example embodiment, the CRS may be defined for the UEs in a cell and may be used for demodulation and/or measurement. Additionally, in example embodiments, the CRS may be shared by UEs. In such an embodiment (e.g., since the CRS may be shared by the UEs), non-precoded RS may be used and/or employed, for example, to keep uniform cell coverage. The precoded RS may have different cell coverage according to the directions and/or due to a beamforming effect. FIG. 3 shows an example embodiment of a MIMO transmitter that may be used for a non-precoded CRS transmission as described herein.

Additionally, in example embodiments, antenna virtualization may be provided and/or used. For example, if the number of the physical antenna port and logical antenna port may be different, antenna virtualization may be used (e.g., with CRS and/or the non-precoded CRS transmission shown in FIG. 3). RS sequences may also be transmitted for antenna ports irrespective of the number of streams.

Figure 4:
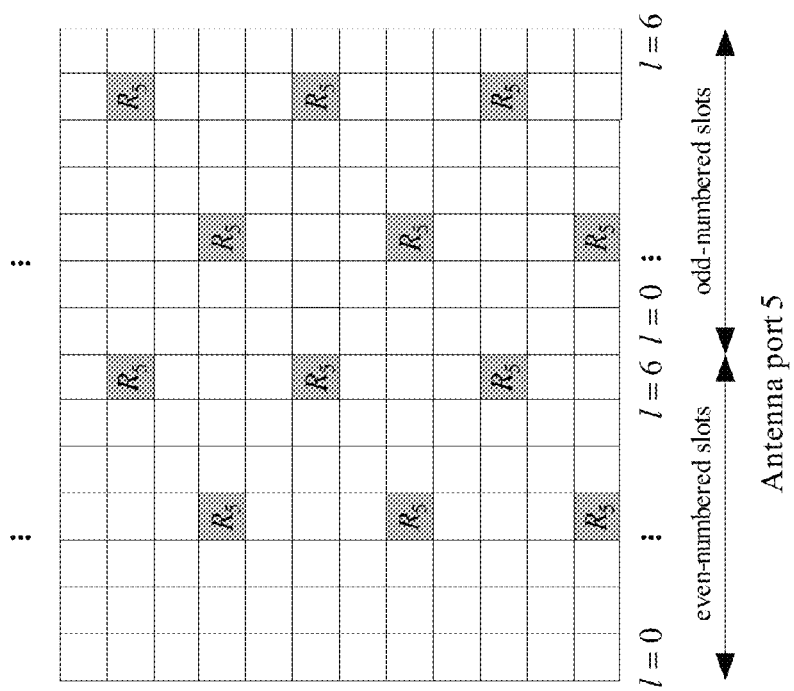
FIG. 4 illustrates an example embodiment of a WTRU or UE-specific DM-RS for normal CP (e.g., port 5).

According to example embodiments, different structures for DM-RS and/or CRS may be provided and/or used. FIG. 4 shows an example embodiment of a DM-RS (e.g., an antenna port-5) structure that may be used (e.g., in an LTE system) to support non-codebook based transmission. In an embodiment, the structure shown in FIG. 4 may be used at an eNB, for example, where the antenna port-5 may be limited supporting one layer transmission. Additionally, the antenna port-5 shown in FIG. 4 may be transmitted with a CRS and, as such, the RS overhead (e.g., in total) may increase.

Figure 5:
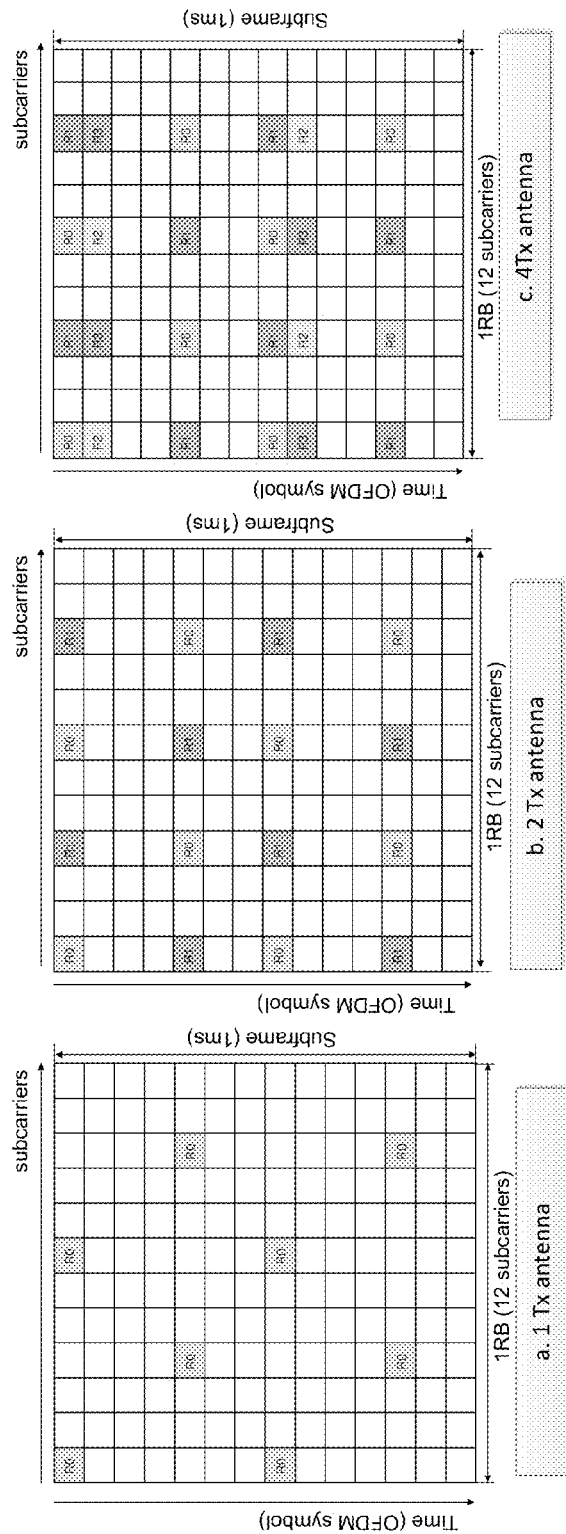
FIGS. 5a-5c illustrate example embodiments of a CRS structure based on the number of antenna ports.

FIG. 5 shows an example embodiment of a CRS structure according to or based on a number of antenna ports. The CRS patterns (e.g., shown in FIG. 5) for each antenna port may be mutually orthogonal in the time and/or frequency domain. As shown in FIG. 5, R0 and R1 may indicate CRS for antenna port 0 and antenna port 1 respectively. In an embodiment, to avoid interference between CRS antenna ports, the data REs that may be located at the RE where a CRS antenna ports may be transmitted may be muted.

According to example embodiments, a predefined sequence (e.g., a Pseudo-random (PN), an m-sequence, and the like) may be multiplied with downlink RS that may minimize inter-cell interference and/or may improve channel estimation accuracy associated with CRS. The PN sequence may be applied at an OFDM symbol level in a subframe and the sequence may be defined according to the cell-ID, subframe number, the position of OFDM symbol, and the like. For example, the number of CRS antenna ports may be two, for example, in an OFDM symbol that may include a CRS per PRB and the number PRB in a communication system such as an LTE system may vary from 6 to 110. In such an embodiment, the total number of CRS for an antenna port in an OFDM symbol that may include a RS may be $2 \times N_{RB}$, which may imply that the sequence length may be $2 \times N_{RB}$. Additionally, in such an embodiment, $N_{RB}$ may denote the number of RBs corresponding to a bandwidth and the sequence may be binary or complex. The sequence r(m) may provide the complex sequence as follows $$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max} - 1$$

where $N_{RB}^{max}$ may denote the number of RBs corresponding to a maximum bandwidth in a communication system such as an LTE system, $N_{RB}^{max}$ may be 110. Additionally, c may denote a PN sequence with length-31 and may be defined with a Gold-sequence. If a DM-RS may be configured, the following equation may be used:

$$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 12N_{RB}^{PDSCH} - 1$$

where $N_{RB}^{PDSCH}$ may denote a number of RBs allocated for a specific WTRU or UE. The sequence length may vary according to the number RBs allocated for a WTRU or UE.

Figure 6:
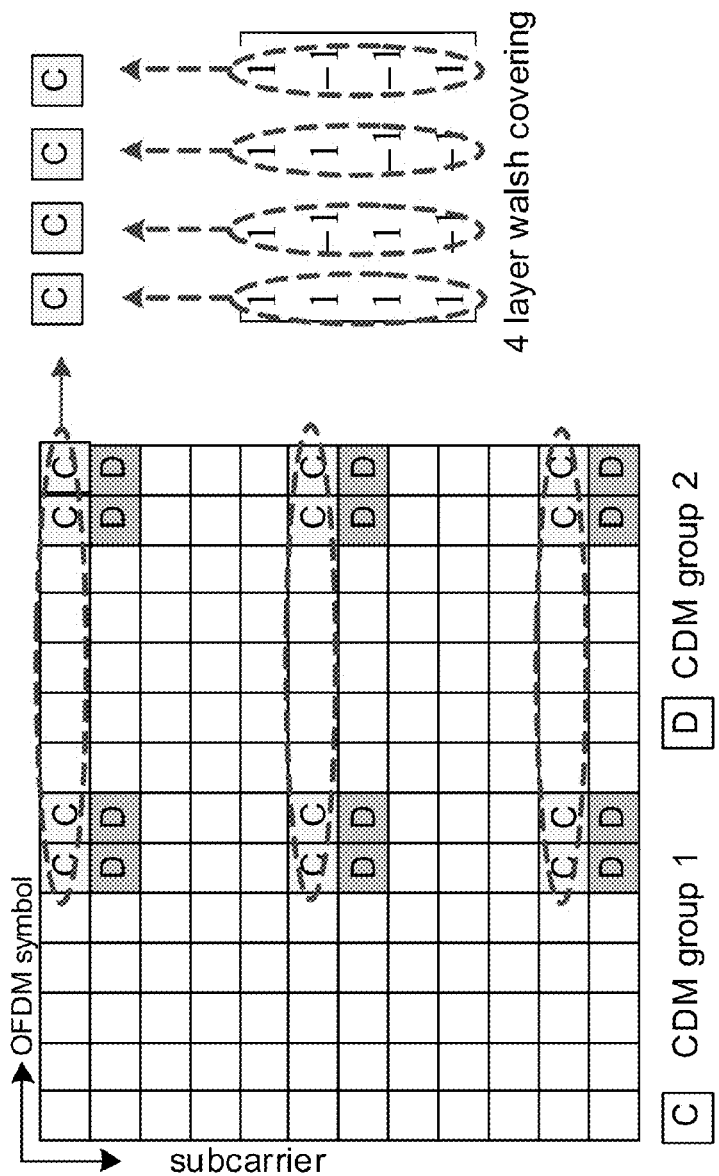
FIG. 6 illustrates an example embodiment of DM-RS pattern that may support, for example, eight layers.

In an embodiment, a reference signal (RS) structure may also be provided (e.g., in 3GPP LTE-A). For example, to reduce the overall RS overhead, a DM-RS based downlink transmission may be used (e.g., in a communication system such as in LTE-A). Additionally, the CRS-based downlink transmission may transmit RS sequences for the physical antenna ports. As such, the DM-RS based downlink transmission may reduce the RS overhead considering that the number of RSs that may be provided or used for DM-RS may be the same as the number of layers. Additionally, according to an embodiment, the number of layers may be equal to or smaller than the number of physical antenna ports. FIG. 6 shows an example embodiment of DM-RS patterns in a PRB for a subframe (e.g., a DM-RS pattern supporting up to 8 layers) that may be provided and/or used.

In embodiments, two CDM groups may be used for multiplexing, for example, up to 4 layers in each CDM group such that up to 8 layers may be multiplexed as a maximum in this pattern. For CDM multiplexing of each CDM group, 4×4 Walsh spreading may also be used.

Additionally, since the DM-RS may be used for demodulation performance (e.g., may be limited to being used for demodulation performance), a time and/or frequency sparse CSI-RS may be provided, for example, for measurements.

Figure 7:
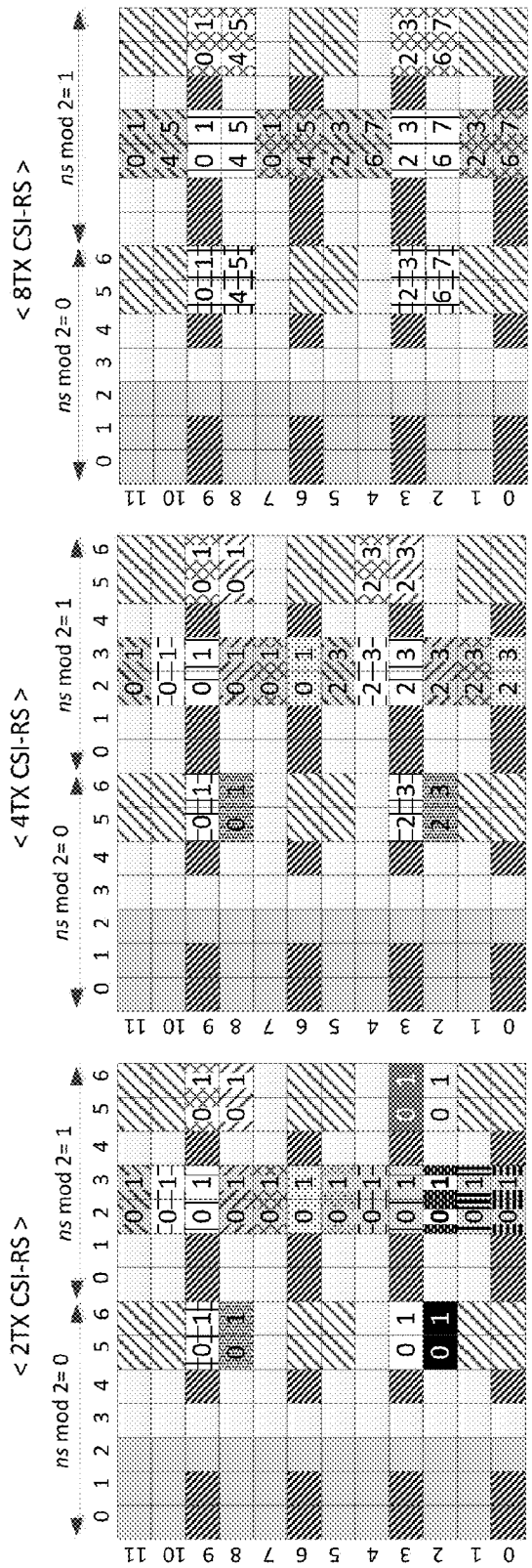
FIG. 7 illustrates an example embodiment of CSI-RS patterns that may be reused based on the number of ports.

The CSI-RS may be transmitted with a duty cycle such as {5, 10, 20, 40, 80} ms in the PDSCH region. In addition, up to 20 CSI-RS patterns for reuse may be available in a subframe. FIG. 7 illustrates an example embodiment of CSI-RS patterns for reuse according to the number of ports (e.g., where up to 20 CSI-RS patterns may be reused). In FIG. 7, the same patterns or shading with a corresponding TX number included therein or associated therewith may represent the same set of REs for a CSI-RS configuration.

Observed Time Difference of Arrival (OTDOA) may also be provided and/or used, for example, for positioning, in a communication system such as an LTE system. For OTDOA positioning, a WTRU or UE may receive one or more signals from a reference cell and/or one or more additional cells, for example, neighbor cells, may measure the observed time differences of arrival of these signals (e.g., between each additional or neighbor cell and the reference cell), and/or may report such measurements, information or signals to the network. Based on the locations of the cells, timing differences among them which may be fixed, and/or other information, the network may derive the WTRU or UE position by a means such as trilateration or triangulation (e.g., assuming the WTRU or UE may measure at least three cells) and/or by other methods or techniques that may provide a location and/or position. The reference cell may be or may not be a serving cell, for example a serving cell of the WTRU or UE. For example, the reference cell may be the serving cell of the WTRU or UE if the WTRU or UE may have one serving cell which may, for example, be in the case of no carrier aggregation (CA). In another example, the reference cell may be a serving cell such as a primary cell, PCell, which may be, for example, in the case of carrier aggregation. In an embodiment, the time difference of arrival may be measured based on a known signal. For example (e.g., for LTE), the WTRU or UE may use the cell-specific reference symbols (CRS) for such measurements and/or, for a cell that may transmit the positioning reference signal (PRS), for example, the WTRU or UE may use the PRS. To perform positioning measurements, the WTRU or UE may receive supporting information or assistance data such as information associated with the cells and/or signals to be measured. For OTDOA, the assistance data may include PRS related parameters. In example embodiments, support of OTDOA by a WTRU or UE may be optional and the use of CRS or PRS for a given cell may be provided and/or decided by WTRU or UE implementations.

In an example embodiment, a positing reference signal (PRS) may be transmitted by the eNB such that the eNB may be aware of or may know its transmission parameters for cells under its control. For a given cell, PRS may be defined to be provided or included in $N_{PRS}$ consecutive downlink subframes for each positioning instance (e.g., a PRS positioning occasion) where, for example, the first subframe of the $N_{PRS}$ downlink subframes may satisfy or provide $(10 \times n_f + \lfloor n_s/2 \rfloor - \Delta_{PRS}) \bmod T_{PRS} = 0$. According to an example embodiment, $N_{PRS}$ may be 1, 2, 4, and/or 6 subframes and the parameters $T_{PRS}$ and $\Delta_{PRS}$ may be the PRS periodicity and PRS offset respectively. Additionally, the PRS periodicity may be 160, 320, 640, and/or 1280 subframes and the PRS offset may be a value between 0 and the PRS periodicity minus 1 or one less than the PRS periodicity. The PRS bandwidth (BW) may be narrowband or wideband such that the PRS BW may occupy a partial BW (e.g., part of the full or entire BW) of the cell and/or the full BW of the cell. The BW values may include, for example, 6, 15, 25, 50, 75, and/or 100 resource blocks (RBs). In an embodiment, when the PRS may occupy a partial BW, the RBs may be in the center of the band or at any other suitable location within the band. Parameters which may be used for, provided for, defined for, and/or used to define the PRS (e.g., which may be referred to as PRS information and/or prs-info) for a cell may include one or more of the following: the number of DL subframes (e.g., $N_{PRS}$); a PRS configuration index (e.g., 0 to 4095) that may be used (e.g., in a table or other suitable structure) to obtain $T_{PRS}$ and $\Delta_{PRS}$ (e.g., the PRS periodicity and offset); the PRS BW; PRS muting information that may define when PRS occasions may be muted (e.g., not transmitted) in the cell; and the like.

According to an embodiment, PRS positioning occasions may be muted in a cell, for example, periodically. The PRS muting configuration may be defined by a periodic PRS muting sequence that may have a periodicity of 2, 4, 8, and/or 16 positioning occasions in embodiments. The PRS muting information may be provided using a p-bit field for periodicity p where each bit may correspond to a PRS positioning occasion in each muting sequence and/or may indicate whether that occasion may be muted or not. When a PRS positioning occasion may be muted in a cell, PRS may not be transmitted in the $N_{PRS}$ subframes (e.g., any of the $N_{PRS}$ subframes) of the particular occasion in that cell.

Additionally, when the PRS muting information may be signaled to a WTRU or UE in the positioning assistance data (e.g., when the PRS muting information may be included in positing assistance data and signaled therewith), the first bit of the PRS muting sequence may correspond to the first PRS positioning occasion that may start after the beginning of the system frame number (SFN) being zero (e.g., SFN=0) where the SFN may be the SFN of the WTRU's or UE's OTDOA reference cell.

Figure 8:
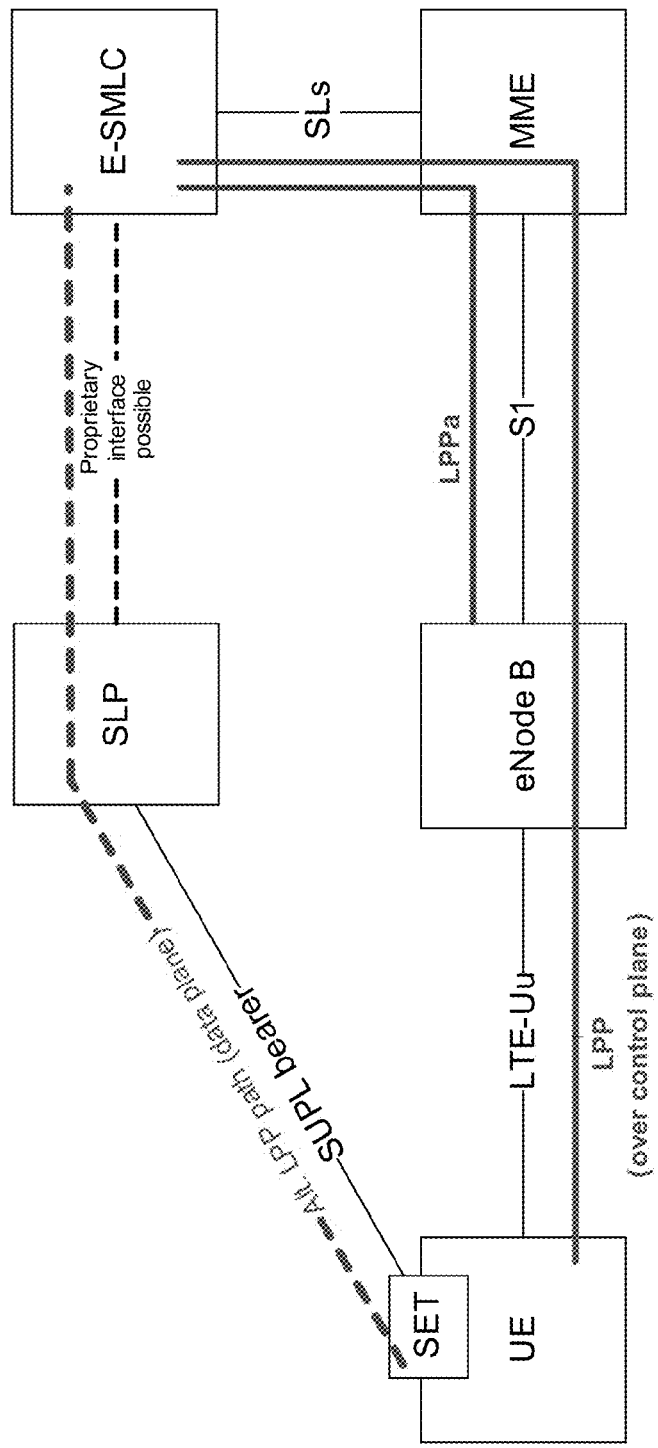
FIG. 8 illustrates an example embodiment of a positioning architecture.

FIG. 8 illustrates an example embodiment of an architecture that may be used for positioning. According to an embodiment, the architecture shown in FIG. 8 may be used with an LTE communication system such as the communication systems 100 shown FIGS. 1A and 1C-1E and may provide positioning for the LTE communication system. As shown in FIG. 8, positioning of or by a UE or WTRU may be controlled by an Enhanced Serving Mobile Location Center (E-SMLC). In an example embodiment, the communication between the WTRU and E-SMLC may be point-to-point and/or transparent to an eNB. The WTRU or UE may communicate with the E-SMLC using a protocol such as the LTE Positioning Protocol (LPP) over the control plane or the data plane as shown in FIG. 8. Such a communication (e.g., between the WTRU or UE and E-SMLC) may be encapsulated in signaling or data between the eNB and the WTRU or UE or between a Secure User Plane Location (SUPL) Location Platform (SLP) and the WTRU or UE. According to an example embodiment, the eNB may not see what may be inside the LPP messages. The communication between the E-SMLC and the WTRU may pass through a Mobility Management Entity (MME) or a SLP where the MME or SLP may direct the communication to and/or from the appropriate WTRU and may or may not see the contents of the communication and may or may not modify the contents and/or the transport of the communication. Communication may be possible or enabled via the SLP and/or may be via a SUPL bearer if the WTU or UE may be a SUPL Enabled Terminal (SET).

Additionally, the information that may pass or be exchanged between the WTRU or UE and the E-SMLC may include one or more of the capability of the WTRU or UE to support OTDOA positioning, instructions from the E-SMLC to perform OTDOA measurements, OTDOA positioning assistance data from the E-SMLC to the WTRU or UE such as which cells are the reference and/or additional or neighbor cells for OTDOA, and measurement reports from the WTRU or UE to the E-SMLC. Assistance data or other exchanged information may include information such as cell ID and/or carrier frequency, and/or the PRS information for the reference cell and/or the additional or neighbor cells. Since PRS transmission may be the responsibility of the eNB, the E-SMLC may obtain at least some of the PRS information from one or more eNBs where communication between an E-SMLC and an eNB may be via an LPPa interface or protocol.

According to an example embodiment, one or more transmission modes may be provided and/or used in the communication system to transmit and/or receive information, data, and/or signals. Table 3 illustrates example embodiments of transmission modes for a communication system (e.g., LTE and/or LTE-Advanced systems) that may be used to provide information and/or signals disclosed herein. The transmission modes provided in Table 3 (e.g., except for TM-7, 8, and 9 in one embodiment) may use CRS for both demodulation and measurement. Additionally, for TM-7 and 8 shown in Table 3, DM-RS may be used for demodulation and CRS may be used for measurements. According to an embodiment, for TM-9 shown in Table 3, DM-RS and CSI-RS may be used for demodulation and measurement, respectively.

TABLE 3

| Transmission modes in LTE/LTE-A | |
|---|---|
| Transmission mode (TM) | Transmission scheme of PDSCH |
| 1 | Single-antenna port, port 0 |
| 2 | Transmit diversity |
| 3 | Transmit diversity if the associated rank indicator may be 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports may be one, Single-antenna port, port 0; otherwise Transmit diversity |
| 8 | If the UE may be configured without PMI/RI reporting: if the number of PBCH antenna ports may be one, single-antenna port, port 0; otherwise transmit diversity If the UE may be configured with PMI/RI reporting: closed-loop spatial multiplexing |
| 9 | If the UE may be configured without PMI/RI reporting: if the number of PBCH antenna ports may be one, single-antenna port, port 0; otherwise transmit diversity Closed-loop spatial multiplexing with up to 8 layer transmission, ports 7-14 |

According to an example embodiment, channel state information (CSI) feedback may be provided and used. For example, multiple (e.g., two) types of reporting channels may be used such as PUCCH and/or PUSCH. The PUCCH reporting channel may provide CSI feedback while allowing limited feedback overhead. The PUSCH reporting channel may allow a large amount of feedback overhead with less reliability. The PUCCH reporting channel may be used for periodic CSI feedback for coarse link adaptation and/or the PUSCH reporting may be triggered aperiodically for finer link adaptation.

TABLE 4

Reporting modes in LTE/LTE-A

| Scheduling Mode | Periodic CSI reporting channels | Aperiodic CSI reporting channel |
|---|---|---|
| Frequency non-selective | PUCCH | |
| Frequency selective | PUCCH | PUSCH |

Figure 9:
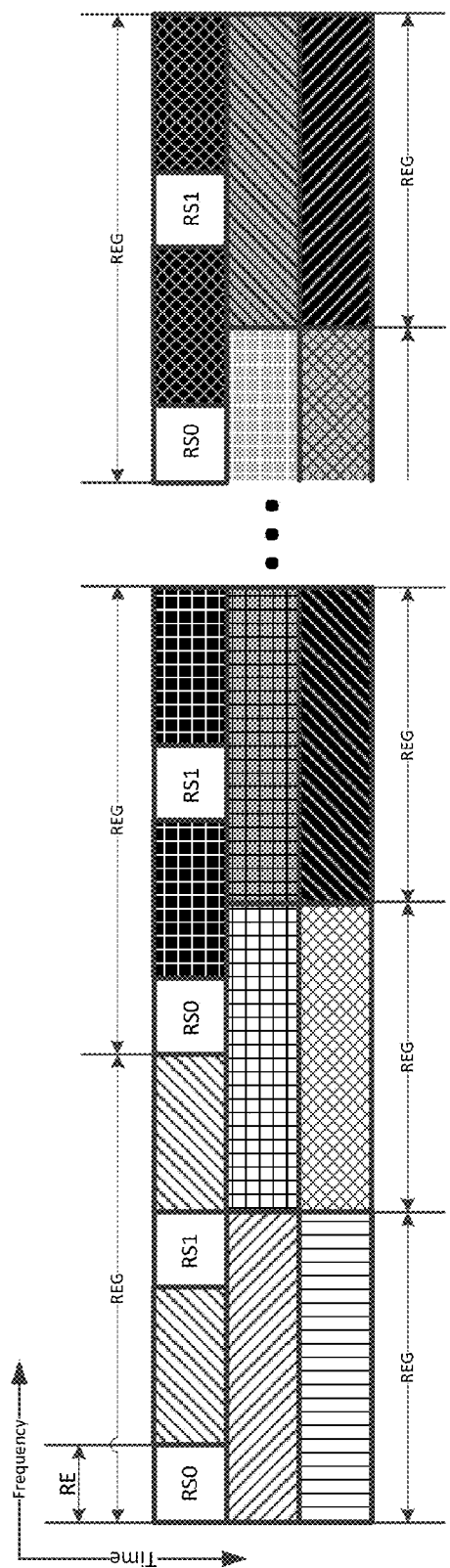
FIG. 9 illustrates an example embodiment of a REG definition in a downlink control channel region with 2Tx CRS.
Figure 10:
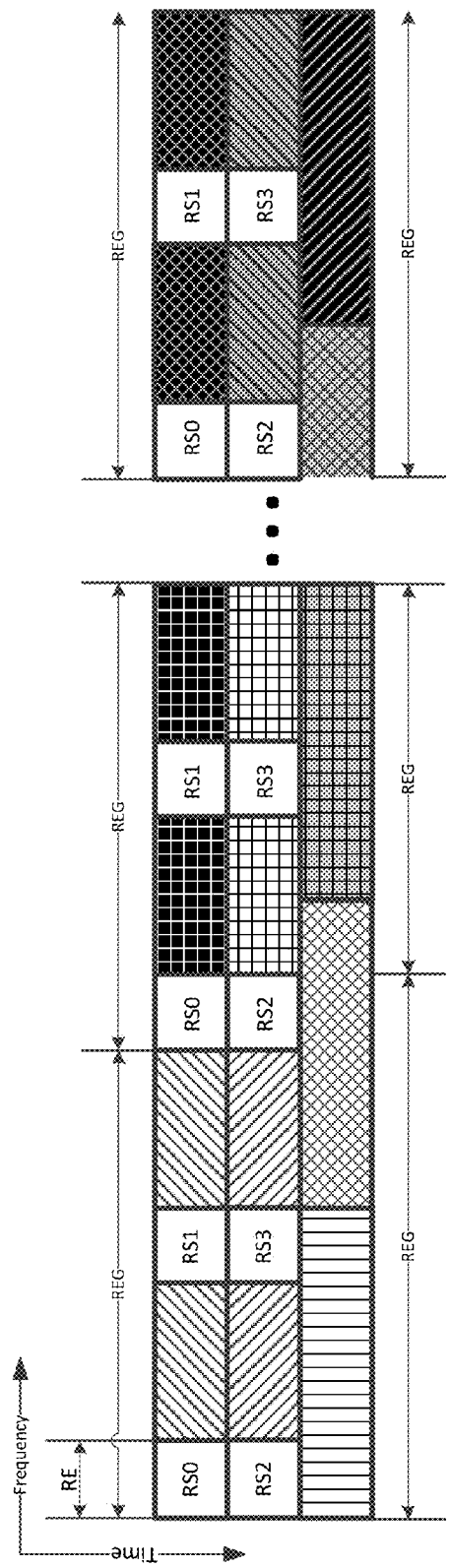
FIG. 10 illustrates an example embodiment of a REG definition in a downlink control channel region with 4Tx CRS.

Downlink control channels may also be provided and/or used. The downlink control channels may occupy the first 1 to 3 OFDM symbol(s) in each subframe according to the overhead of the control channels. This dynamic resource allocation to handle downlink control channel overhead may allow efficient downlink resource utilization, which may result in higher system throughput. Various types of downlink control channels may be transmitted within the downlink control channel region in each subframe, such as PCFICH (Physical Control Format Indicator Channel), PHICH (Physical Hybrid-ARQ Indicator Channel), and/or PDCCH (Physical Downlink Control Channel). The downlink control channel resource unit may be defined as 4 contiguous REs in the frequency domain called REG (Resource Elements Group) as illustrated in FIGS. 9 and 10. FIG. 9 illustrates an exemplary REG definition in downlink control channel region with 2Tx CRS. FIG. 10 illustrates an exemplary REG definition in downlink control channel region with 4Tx CRS. As shown, if the CRS may be located in the same OFDM symbol, the REG may be defined in 4 contiguous REs without CRS.

In another embodiment, a physical control format indicator channel (PCFICH) may be provided and/or used as described herein. For example, a PCFICH may be transmitted in the $0^{th}$ OFDM symbol in each subframe and/or indicate the number of OFDM symbols used for downlink control channel in the subframe. The subframe-level dynamic downlink control channel resource allocation may be possible by using the PCFICH. A WTRU or UE may detect CFI (Control Format Indicator) from a PCFICH and the downlink control channel region may be defined in the subframe according to the CFI value. Table 5 shows a CFI codeword which may be detected from the PCFICH, and Table 6 shows details of downlink control channel resource allocation according to the CFI value, subframe type, and system bandwidth. In embodiments, The PCFICH may be skipped if a subframe may be defined as a non-PDSCH supportable subframe such that a WTRU or UE may not be trying to detect PCFICH in the subframe.

TABLE 5

CFI codeword

| CFI | CFI codeword <$b_0, b_1, \ldots, b_{31}$> |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

TABLE 6

Number of OFDM symbols used for PDCCH

| Subframe | Number of OFDM symbols for PDCCH when $N_{RB}^{DL} > 10$ | Number of OFDM symbols for PDCCH when $N_{RB}^{DL} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

Figure 11:
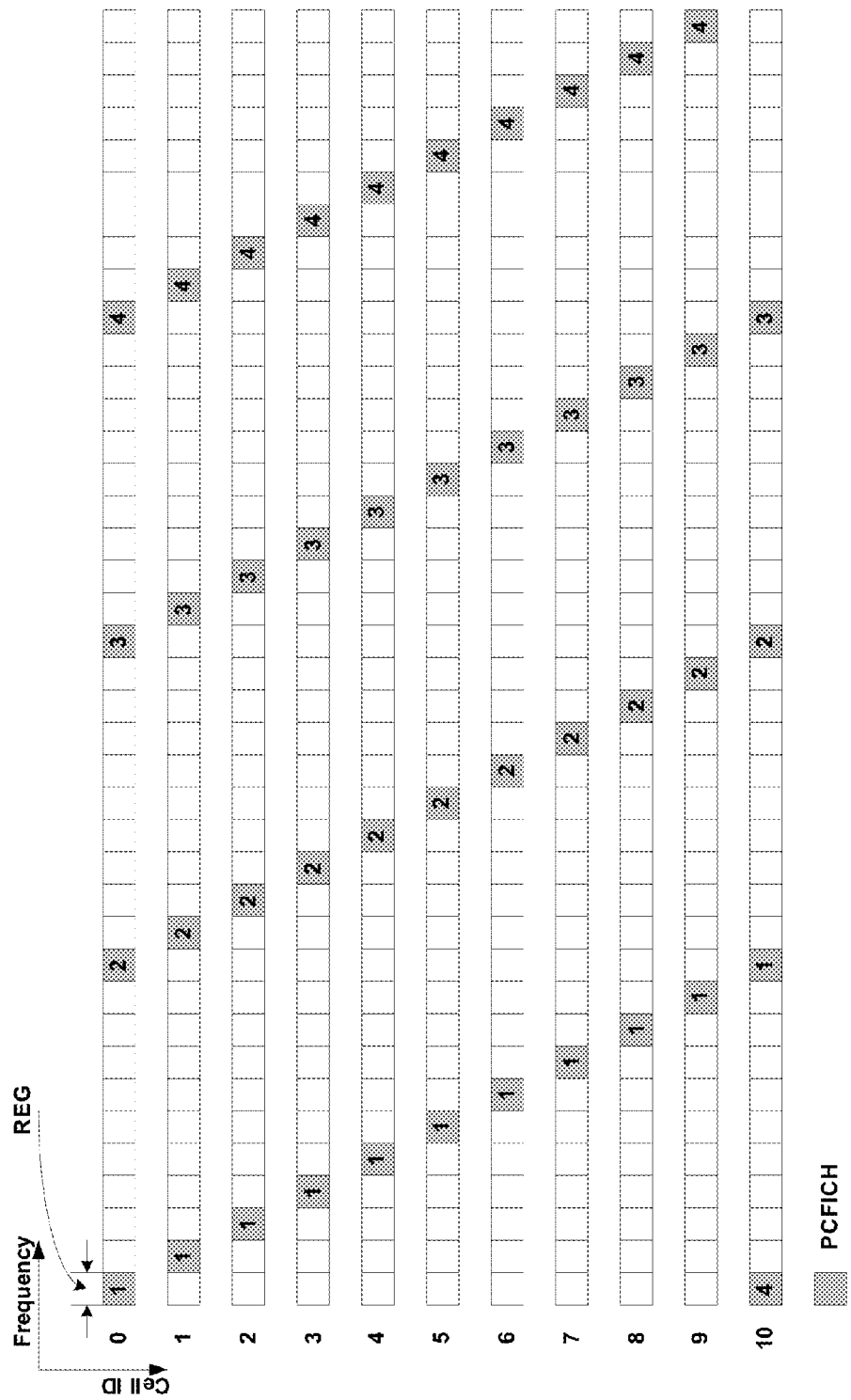
FIG. 11 illustrates an example embodiment of PCFICH REG allocation based on PCI.

In an embodiment, four REGs may be used for PCFICH transmission in the $0^{th}$ OFDM symbol in a subframe and/or the REGs may be uniformly distributed in the whole system bandwidth to exploit frequency diversity gain. The starting point of PCFICH transmission may be different according to the physical cell-ID (PCI) as illustrated in the FIG. 11. The frequency shift of PCFICH tied with cell-ID may provide the performance of PCFICH detection performance by avoiding PCFICH collision among multiple neighbor cells while achieving diversity order four from its distributed allocation. At a WTRU or UE receiver, a procedure (e.g., a first procedure) for downlink control channel detection may be decoding PCFICH to figure out the number of OFDM symbols in the subframe. Given that downlink control resource may be defined by PCFICH, the PCFICH detection error may result in the loss of a downlink grant, an uplink grant, and/or PHICH reception.

A physical hybrid-ARQ indicator channel (PHICH) may be provided and/or used, as described herein. In an embodiment, a PHICH may be used to transmit an ACK or NACK corresponding to the PUSCH transmitted in an uplink subframe. A PHICH may be transmitted in a distributed manner across system bandwidth and OFDM symbols within a downlink control channel. The number of OFDM symbols may be defined as PHICH duration and configurable via higher layer signaling. The PHICH resource position may vary according to PHICH duration.

Figure 12:
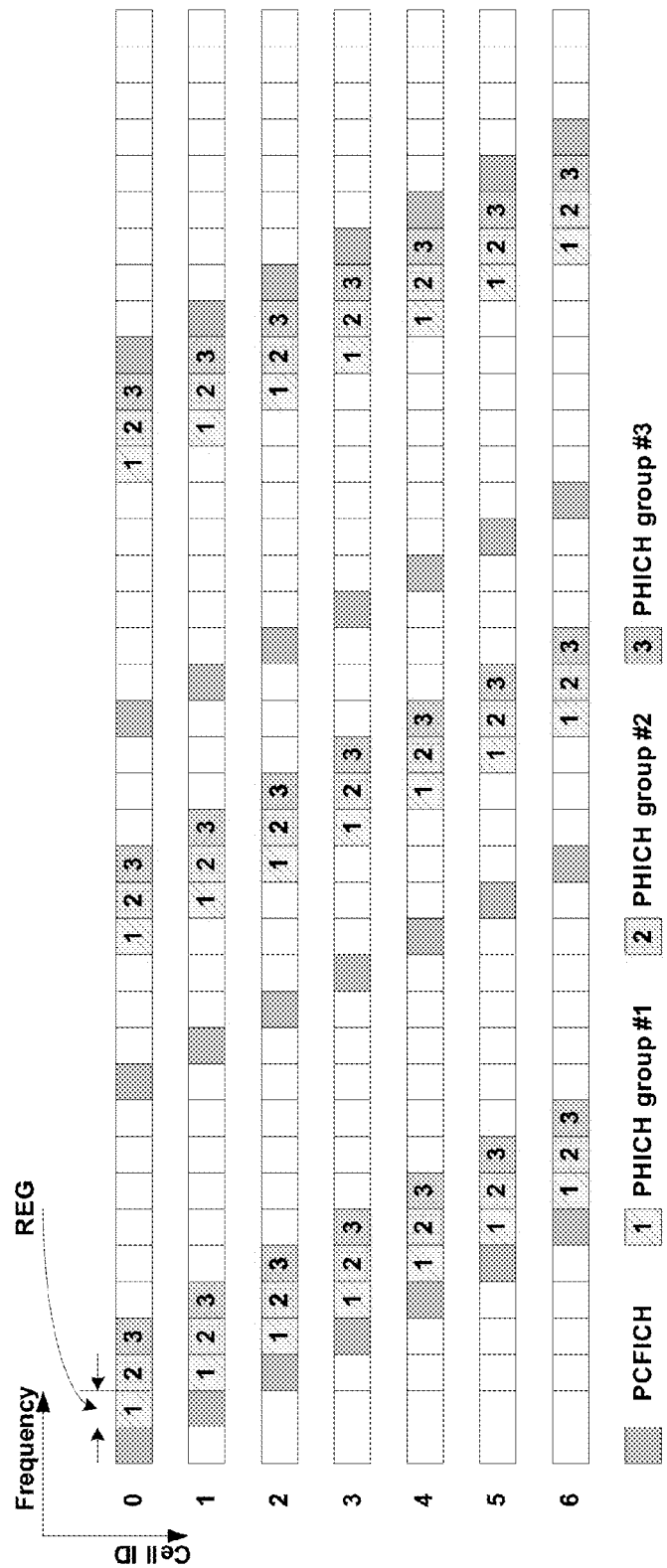
FIG. 12 illustrates an example embodiment of PCFICH and PHICH REG allocation based on PCI.

FIG. 12 shows exemplary PCFICH and PHICH resource allocations (e.g., PCFICH and PHICH REGs allocation according to PCI). As shown in the FIG. 12, multiple PHICH groups may be defined in a cell and a PHICH group may comprise multiple PHICHs with orthogonal sequences and the PHICH for a WTRU or UE may be defined dynamically with resource information in an uplink grant such as lowest PRB index ($I_{PRB\_RA}^{lowest\_index}$) and DM-RS cyclic shift ($n_{DMRS}$). Two index pairs (PHICH group index: $n_{PHIGH}^{group}$, PHICH sequence index: $n_{PHIGH}^{seq}$) may indicate the PHICH resource for a specific WTRU or UE. In the PHICH index pair ($n_{PHIGH}^{group}$, $n_{PHIGH}^{seq}$) each index may be defined as follows:

$$n_{PHIGH}^{group} = (I_{PRB\_RA}^{lowest\_index} + n_{DMRS}) \bmod N_{PHIGH}^{group}$$

$$n_{PHIGH}^{seq} = (\lfloor I_{PRB\_RA}^{lowest\_index} / N_{PHIGH}^{group} \rfloor + n_{DMRS}) \bmod 2N_{SF}^{PHIGH}$$

where the $N_{PHIGH}^{group}$ may imply the number of PHICH groups available in the system and may be defined as follows:

$$N_{PHICH}^{group} = \begin{cases} \lceil N_g(N_{RB}^{DL}/8) \rceil \\ 2 \cdot \lceil N_g(N_{RB}^{DL}/8) \rceil \end{cases}$$

where $N_g$ may be a 2 bit information transmitted via PBCH (Physical Broadcasting Channel) and the information may be within $N_g \in \{1/6, 1/2, 1, 2\}$.

Additionally, an orthogonal sequence according to the spreading factor may also be provided and/or used as illustrated, for example, in Table 7.

TABLE 7

Orthogonal sequence according to sequence index and spreading factor.

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

A physical downlink control channel (PDCCH) may be provided and/or used as described herein. For example, a PDCCH may be defined with one or multiple consecutive CCE (Control Channel Element) resources in which one CCE may comprise 9 REGs. The number of available CCE ($N_{CCE}$) may be defined with $N_{CCE} = \lfloor N_{REG}/9 \rfloor$ REG, where $N_{REG}$ may be the number of REGs not assigned to PCFICH or PHICH. Table 8-1 illustrates exemplary available PDCCH formats by definition of a number of consecutive CCEs that may be provided, used, and/or supported. As shown in the Table 8-1, the four PDCCH formats may be supported and/or the number of CCEs according to the PDCCH format may be different. The number of CCEs in a PDCCH format may be called an aggregation level.

TABLE 8-1

Supported PDCCH formats

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

In an embodiment, a WTRU or UE may monitor a PDCCH candidate and/or blindly decode the given number of times (e.g., as shown in the table 8-2). The set of PDCCH candidates that may be monitored by a WTRU or UE may be defined as a search space.

TABLE 8-2

PDCCH candidates monitored by a WTRU or UE

| | Search space $S_k^{(L)}$ | | Number of |
|---|---|---|---|
| Type | Aggregation level L | Size [in CCEs] | PDCCH candidates $M^{(L)}$ |
| WTRU or UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Aggregation levels $\{1, 2, 4, 8\}$ may be supported in a WTRU or UE-specific search space and the aggregation levels $\{4, 8\}$ may be supported in common search space. The search space $S_k^{(L)}$ at aggregation level $L \in \{1,2,4,8\}$ may be defined by a set of PDCCH candidates. For each serving cell on which PDCCH may be monitored, the CCEs corresponding to PDCCH candidate m of the search space $S_k^{(L)}$ may be given by $$L \cdot \{(Y_k + m') \bmod \lfloor N_{CCE,k}/L \rfloor\} + i$$

where $Y_k$ may be defined as described herein and $i = 0, \ldots, L-1$. For the common search space, $m' = m$. Additionally, for the WTRU or UE specific search space and for the serving cell on which PDCCH may be monitored, if the monitoring WTRU or UE may be configured with carrier indicator field $m' = m + M^{(L)} \cdot n_{CI}$ where $N_{CI}$ may be the carrier indicator field value. Otherwise, if the monitoring WTRU or UE may not be configured with a carrier indicator field, $m' = m$ where $m = 0, \ldots, M^{(L)} - 1$ and $M^{(L)}$ may be the number of PDCCH candidates to monitor in the given search space. For the common search spaces, $Y_k$ may be set to 0 for the two aggregation levels $L = 4$ and $L = 8$. For the WTRU or UE-specific search space KL) at aggregation level L, the variable $Y_k$ may be defined by $Y_k = (A \cdot Y_{k-1}) \bmod D$, where $Y_{-1} = n_{RNTI} \neq 0$, $A = 39827$, $D = 65537$ and $k = \lfloor n_s/2 \rfloor$, $n_s$ may be the slot number within a radio frame.

Figure 13:
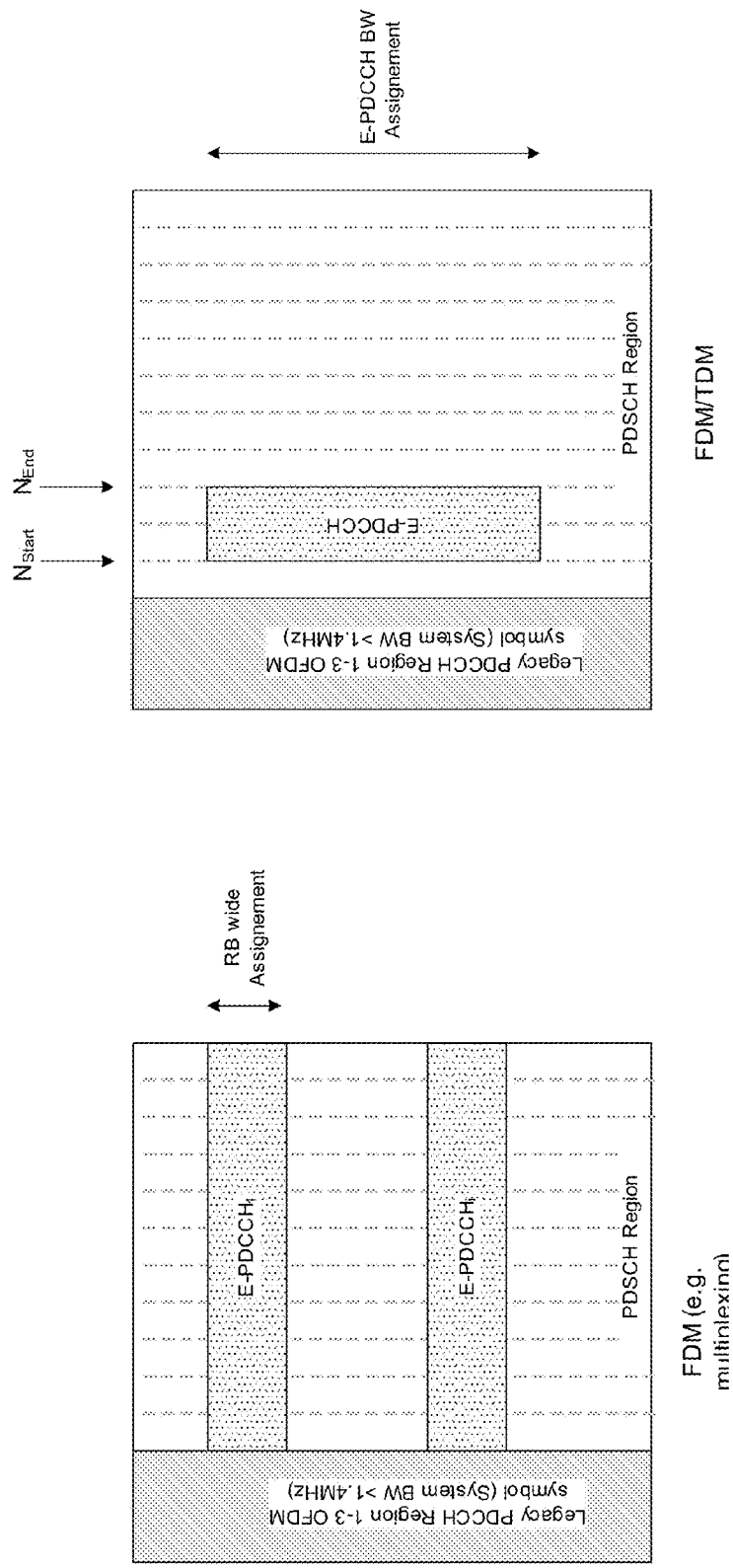
FIG. 13 illustrates an example embodiment of ePDCCH multiplexing with PDSCH (e.g., FDM multiplexing).

As described herein PDCCHs may be enhanced (e.g., an ePDCCH may be provided) by transmitting PDCCHs in a PDSCH region with a WTRU or UE-specific reference signal such that beamforming gain, frequency domain ICIC, and/or PDCCH capacity improvement gain may be achieved and/or improved. FIG. 13 illustrates an exemplary ePDCCH multiplexing with PDSCH (FDM multiplexing).

In an example embodiment, PUCCH may be allocated in relation to PDCCH. For example, the physical resources used for PUCCH may depend on one or more parameters, such as $N_{RB}^{(2)}$ and/or $N_{cs}^{(1)}$, given by higher layers. The variable $N_{RB}^{(2)} \geq 0$ may denote the bandwidth in terms of resource blocks that may be available for use by PUCCH formats 2/2a/2b transmission in each slot. The variable $N_{cs}^{(1)}$ may denote the number of cyclic shift used for PUCCH formats 1/1a/1b in a resource block used for a mix of formats 1/1a/1b and 2/2a/2b. The value of $N_{cs}^{(1)}$ may be an integer multiple of $\Delta_{shift}^{PUCCH}$ within the range of $\{0, 1, \ldots, 7\}$, where $\Delta_{shift}^{PUCCH}$ may be provided by higher layers. In an embodiment, there may be no mixed resource block present if $N_{cs}^{(1)} = 0$. Additionally, there may be (e.g., at most) one resource block in each slot supporting a mix of formats 1/1a/1b and 2/2a/2b. Resources that may be used for transmission of PUCCH formats 1/1a/1b, 2/2a/2b and 3 may be represented by the non-negative indices $$n_{PUCCH}^{(1,\tilde{p})}, n_{PUCCH}^{(2,\tilde{p})} < N_{RB}^{(2)}N_{sc}^{RB} + \left\lceil \frac{N_{cs}^{(1)}}{8} \right\rceil \cdot (N_{sc}^{RB} - N_{cs}^{(1)} - 2),$$

and $$n_{PUCCH}^{(3,\tilde{p})},$$

respectively.

Mapping to physical resources may be provided and/or used, for example, as described herein. In such embodiments, the block of complex-valued symbols $z^{(\tilde{p})}(i)$ may be multiplied with the amplitude scaling factor $\beta_{PUCCH}$ to conform to a transmit power $P_{PUCCH}$ and/or mapped in sequence starting with $z^{(\tilde{p})}(0)$ to resource elements. PUCCH may use one resource block in each of the two slots in a subframe. Within the physical resource block used for transmission, the mapping of $z^{(\tilde{p})}(i)$ two resource elements (k, l) on antenna port p and not used for transmission of reference signals may be in increasing order of first k, then l and the slot number, and may start with the first slot in the subframe. The relation between the index $\tilde{p}$ and the antenna port number p may be defined.

The physical resource blocks that may be used for transmission of PUCCH in slot $n_s$ may be given by $$n_{PRB} = \begin{cases} \left\lfloor \frac{m}{2} \right\rfloor & \text{if } (m + n_s \bmod 2)\bmod 2 = 0 \\ N_{RB}^{UL} - 1 - \left\lfloor \frac{m}{2} \right\rfloor & \text{if } (m + n_s \bmod 2)\bmod 2 = 1 \end{cases}$$

where the variable m may depend on the PUCCH format. For formats 1, 1a and 1b $$m = \begin{cases} N_{RB}^{(2)} & \text{if } n_{PUCCH}^{(1,\tilde{p})} < c \cdot N_{cs}^{(1)}/\Delta_{shift}^{PUCCH} \\ \left\lfloor \frac{n_{PUCCH}^{(1,p)} - c \cdot N_{cs}^{(1)}/\Delta_{shift}^{PUCCH}}{c \cdot N_{cs}^{(1)}/\Delta_{shift}^{PUCCH}} \right\rfloor + N_{RB}^{(2)} + \left\lceil \frac{N_{cs}^{(1)}}{8} \right\rceil & \text{otherwise} \end{cases}$$

$$c = \begin{cases} 3 & \text{normal cyclic prefix} \\ 2 & \text{extended cyclic prefix,} \end{cases}$$

for formats 2, 2a and 2b $$m = \lfloor n_{PUCCH}^{(2,\tilde{p})}/N_{sc}^{RB} \rfloor,$$

and for format 3

$$m = \lfloor n_{PUCCH}^{(3,\tilde{p})}/N_{SF,0}^{PUCCH} \rfloor.$$

Figure 14:
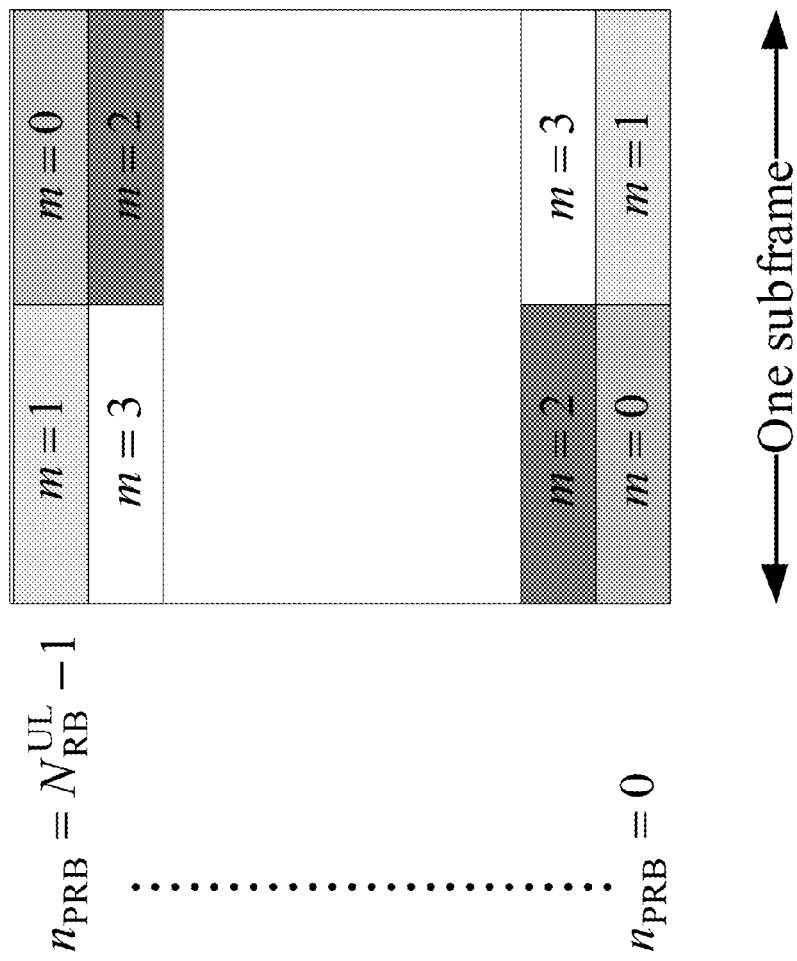
FIG. 14 illustrates an example embodiment of a mapping to a physical resource block for PUCCH.

Mapping of modulation symbols for the physical uplink control channel may be illustrated in FIG. 14. In embodiments of simultaneous transmission of sounding reference signal and PUCCH format 1, 1a, 1b or 3 when there may be one serving cell configured, a shortened PUCCH format may be used where the last SC-FDMA symbol in the second slot of a subframe may be left empty.

FDD HARQ-ACK procedures and/or methods for a configured serving cell may be provided. For exmaple, HARQ-ACK transmission on two antenna ports ($p\in[p_0,p_1]$) may be supported for PUCCH format 1a/1b. For FDD and one configured serving cell, the WTRU or UE may use PUCCH resource $n_{PUCCH}^{(1,\tilde{p})}$ for transmission of HARQ-ACK in subframe n for $\tilde{p}$ mapped to antenna port p for PUCCH format 1a/1b as described herein below (e.g., where one or more of the following may apply).

For a PDSCH transmission indicated by the detection of a corresponding PDCCH in subframe n−4, or for a PDCCH indicating downlink SPS release in subframe n−4, the WTRU or UE may use $n_{PUCCH}^{(1,\tilde{p}_0)} = n_{CCE} + N_{PUCCH}^{(1)}$ for antenna port $p_0$ in subframe n where $n_{CCE}$ may be the number of the first CCE (e.g., lowest CCE index used to construct the PDCCH) used for transmission of the corresponding DCI assignment and/or $N_{PUCCH}^{(1)}$ may configured by higher layers. For two antenna port transmission the PUCCH resource for antenna port $p_1$ may be given by $n_{PUCCCH}^{(1,\tilde{p}_1)} = n_{CCE} + 1 + N_{PUCCH}^{(1)}$.

For a PDSCH transmission on the primary cell where there may not be a corresponding PDCCH detected in subframe n−4, the value of $n_{PUCCH}^{(1,\tilde{p})}$ may be determined according to higher layer configuration. For a WTRU or UE configured for two antenna port transmission, a PUCCH resource value may map to two PUCCH resources with the first PUCCH resource $n_{PUCCH}^{(1,\tilde{p}_0)}$ for antenna port $p_0$ and the second PUCCH resource $n_{PUCCH}^{(1,\tilde{p}_1)}$ for antenna port $p_1$. Otherwise, the PUCCH resource value may map to a single PUCCH resource $n_{PUCCH}^{(1,\tilde{p}_0)}$ for antenna port $p_0$.

The FDD HARQ-ACK feedback procedures for more than one configured serving cell may be based on a PUCCH format 1b with channel selection HARQ-ACK procedure or a PUCCH format 3 HARQ-ACK procedures, for example. HARQ-ACK transmission on two antenna ports ($p\in[p_0,p_1]$) may be supported for PUCCH format 3.

For FDD with two configured serving cells and PUCCH format 1b with channel selection, the WTRU or UE may transmit b(0)b(1) on PUCCH resource $n_{PUCCH}^{(1)}$ selected from A PUCCH resources $n_{PUCCH,j}^{(1)}$ where $0 \leq j \leq A-1$ and $A \in \{2,3,4\}$. HARQ-ACK(j) may denote the ACK/NACK/DTX response for a transport block or SPS release PDCCH associated with serving cell c, where the transport block and/or serving cell for HARQ-ACK(j) and A PUCCH resources may be given by a table.

A WTRU or UE configured with a transmission mode that may support up to two transport blocks on serving cell, c, may use the same HARQ-ACK response for the transport blocks in response to a PDSCH transmission with a single transport block or a PDCCH indicating downlink SPS release associated with the serving cell c.

Additionally, the WTRU or UE may determine the A PUCCH resources, $n_{PUCCH,j}^{(1)}$ associated with HARQ-ACK (j) where $0 \leq j \leq A-1$ according to one or more embodiments described herein (e.g., one or more of the following example embodiments).

For a PDSCH transmission indicated by the detection of a corresponding PDCCH in subframe n−4 on the primary cell, or for a PDCCH indicating downlink SPS release in subframe n−4 on the primary cell, the PUCCH resource may be $n_{PUCCH,j}^{(1)} = n_{CCE} + N_{PUCCH}^{(1)}$, and for transmission mode that supports up to two transport blocks, the PUCCH resource $n_{PUCCH,j+1}^{(1)}$ may be given by $n_{PUCCH,j+1}^{(1)} = n_{CCE} + 1 + N_{PUCCH}^{(1)}$ where $n_{CCE}$ may be the number of the first CCE used for transmission of the corresponding PDCCH and $N_{PUCCH}^{(1)}$ may be configured by higher layers.

For a PDSCH transmission on the primary cell where there may not be a corresponding PDCCH detected in subframe n−4, the value of $n_{PUCCH,j}^{(1)}$ may be determined according to higher layer configuration. For a transmission mode that supports up to two transport blocks, the PUCCH resource $n_{PUCCH,j+1}^{(1)}$ may be given by $n_{PUCCH,j+1}^{(1)} = n_{PUCCH,j}^{(1)} + 1$.

For a PDSCH transmission indicated by the detection of a corresponding PDCCH in subframe n−4 on the secondary cell, the value of $n_{PUCCH,j}^{(1)}$, and the value of $n_{PUCCH,j+1}^{(1)}$ for the transmission mode that supports up to two transport blocks may be determined according to higher layer configuration. The TPC field in the DCI format of the corresponding PDCCH may be used to determine the PUCCH resource values from one of the resource values (e.g., four resource values) configured by higher layers. For a WTRU or UE configured for a transmission mode that supports up to two transport blocks a PUCCH resource value may map to multiple (e.g., two) PUCCH resources ($n_{PUCCH,j}^{(1)}$, $n_{PUCCH,j+1}^{(1)}$). Otherwise, the PUCCH resource value may map to a single PUCCH resource $n_{PUCCH,j}^{(1)}$.

Resource allocation in carrier aggregation situations may be provided. For ePDCCH transmission, localized and distributed resource allocations may be implemented for better support of UEs having different channel conditions in a cell. A localized resource allocation may allow frequency selective gain so that an eNB scheduler may increase spectral efficiency by exploiting channel state information of a WTRU or UE experiencing low Doppler frequency. A distributed resource allocation may provide frequency diversity gain so that reliable PDCCH transmission performance may be achieved without channel state information, which may be appropriate for a WTRU or UE suffering from high Doppler frequency. Currently, ePDCCHs may be designed based on single component carriers such that the performance may be limited if such designs may be used in multiple carrier network.

In a system having multiple component carriers, the localized resource allocation and distributed resource allocation may be optimized for frequency selective scheduling gain and/or frequency diversity gain. Such ePDCCH designs may be focused on single component carrier such that the performance may be limited in a multiple carrier system.

Additionally, a WTRU or UE may provide a HARQ-ACK response in subframe n+4 when a WTRU or UE receives PDSCH in subframe n. As the PDCCH blind detection may desire or require some portion of time before starting PDSCH decoding, the PDSCH processing time may be reduced to less than 4 ms. A timing advance may reduce PDSCH processing time so that a WTRU or UE may finish its decoding processing before n+4, for example, assuming a case in which a largest transport block size, highest rank, and/or longest timing advance may be considered. That is, PDSCH processing time may be further reduced. Since ePDCCH may be transmitted in a PDSCH region, this may reduce PDSCH processing time, for example, in a multiple carrier system a maximum transport block size may be doubled. A similar processing time reduction may be observed for aperiodic CSI reporting. Aperiodic CSI reporting maybe triggered by a downlink control channel, the CSI feedback processing time may be reduced by ePDCCH reception and this may become more serious as the number of component carriers gets larger for CSI reporting at the same time. Unfortunately, as described, currently the PDSCH processing time and aperiodic CSI reporting processing time at a WTRU or UE receiver may be tighter due to the use of ePDCCH instead of legacy PDCCH and currently these issues may be more significant when carrier aggregation may be used.

Additionally, an uplink control channel allocation may be provided. For example, FDD HARQ-ACK feedback procedures may be based on a PUCCH format 1a/1b (e.g., a dynamically assigned PUCCH format 1a/1b) for one configured serving cell (e.g., in a single cell operation like Rel-8 or R8). For 2 or more DL serving cells for FDD, PUCCH feedback may use a PUCCH format 1b (e.g., a dynamically assigned PUCCH format 1b) with channel selection (e.g., if 2 DL serving cells may be used) or a PUCCH format 3 (e.g., semi statically-configured PUCCH format 3) in combination with ARI (e.g., if 3 or more configured serving cell may be used). In TDD (e.g., Rel-10 TDD), single cell operation may be based on PUCCH format 1 (e.g., dynamically assigned PUCCH format 1) with channel selection. PUCCH format 1 with channel selection (e.g., if 2 or more DL serving cells may be used) and/or PUCCH format 3 or PUCCH F3 may be used as a function of the RRC configuration.

In an embodiment, with a dynamically derived PUCCH resource, such as for the case of single carrier operation or a DL assignment received on the primary serving cell with DL carrier aggregation and for a PDSCH transmission indicated by the detection of a corresponding PDCCH in subframe n−4 on the primary cell, and/or for a PDCCH indicating downlink SPS release in subframe n−4 on the primary cell, the PUCCH resource may be $n_{PUCCH,j}^{(1)} = n_{CCE} + N_{PUCCH}^{(1)}$, and/or for a transmission mode that supports up to two transport blocks, the PUCCH resource $n_{PUCCH,j+1}^{(1)}$ may be given by $n_{PUCCH,j+1}^{(1)} = n_{CEE} + 1 + N_{PUCCH}^{(1)}$ where $n_{CCE}$ may be the number of the first CCE used for transmission of the corresponding PDCCH and $N_{PUCCH}^{(1)}$ may be configured by higher layers. In an embodiment with PUCCH format 3, the PUCCH index maybe pre-configured through RRC and/or for a given DL subframe n−4, the corresponding PUCCH index in UL subframe n may be derived from the ARI carried in the TPC field of the DL assignment message on the SCell.

For a single carrier mode of operation, since the structure and/or resource region of the ePDCCH may be different from that of the legacy PDCCH, a PUCCH resource allocation mechanism may be specified to be able to allocate PUCCH resources to users or UEs (or WTRUs) decoding DCI's using ePDCCH, which may be difficult with multiple carriers. Additionally, for DL carrier aggregation, a PUCCH resource allocation mechanism may be used to allow users (or WTRUs) decoding ePDCCH on at least one of the DL serving cells to transmit ACK/NACK information corresponding to the DL data transmissions scheduled on a primary and one or more secondary serving cells.

Frame Structure 2 TDD support may also be provided. In a TDD system, a PDSCH may be transmitted in a PDSCH region in a downlink subframe and/or a PDSCH region (e.g., DwPTS) in a subframe. In DwPTS (e.g., a Downlink Pilot Time Slot where a number of OFDM symbols reserved for downlink transmission in a special subframe), the available number of OFDM symbols for PDSCH transmission may be limited and/or vary according to the configurations. Since the legacy PDCCH may be transmitted together in the same subframe, embodiments of ePDCCH transmission may be provided separately.

If multiple component carriers may be configured with a different DL-UL subframe configuration in a TDD system, the downlink control channel may not be supported for a specific downlink subframe in a secondary cell, for example, when cross-carrier scheduling may be used. This may result in a downlink subframe waste in the secondary cell. Due to the lack of the number of OFDM symbols in DwPTS and/or variable number of OFDM symbols for PDSCH transmission, currently the ePDCCH transmission in a subframe may be needed (e.g., as described herein below) or detailed WTRU or UE behavior may be defined (e.g., as described herein below) to help avoid an error.

PDCCH fallback may be provided. For example, as ePDCCH may be supported with a legacy PDCCH in a network, a WTRU or UE may be configured to a specific PDCCH type via higher layer signaling. In such an embodiment, there may be an ambiguity period in which an eNB scheduler may not know whether a WTRU or UE may monitor an RRC signaled PDCCH type or not. A PDCCH fallback transmission, which may be received by a WTRU or UE regardless of the configured PDCCH type, may be defined to avoid resource waste and/or unexpected WTRU or UE behavior. In such an embodiment, if a WTRU or UE may be configurable between legacy PDCCH and ePDCCH in a semi-static manner with higher layer signaling, a WTRU or UE may need to be able to continuously or continually receive a PDCCH during the configuration process.

Figure 15:
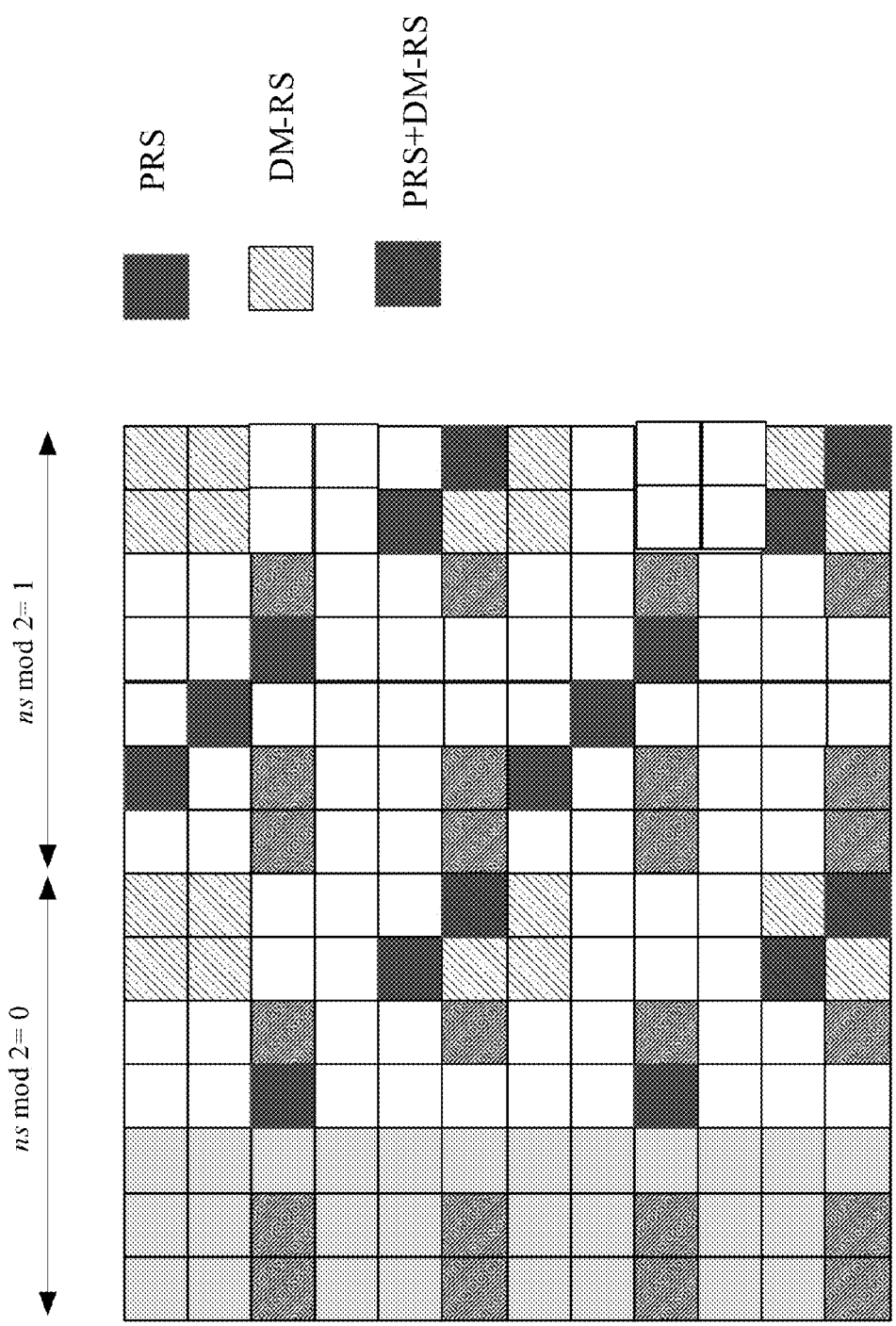
FIG. 15 illustrates an example embodiment of a collision between DM-RS and PRS.

Resource collision may further occur between PRS and ePDCCH. For example, when ePDCCH is used in a cell, PRS transmitted by the cell may overlap or collide with certain REs of the ePDCCH transmission. When the PRS BW overlaps the ePDCCH transmission BW, the PRS transmission may collide with the DM-RS of the ePDCCH transmission. An example of this collision is shown in FIG. 15. As illustrated in FIG. 15, the Vshift may equal 0. Such an overlap may result in performance degradation that, currently, may be too severe for the WTRU or UE to properly decode the ePDCCH. The eNB may have no knowledge of which WTRUs or UEs may be aware of the PRS transmission, since the WTRU's or UE's support of OTDOA, performance of related measurements, and/or knowledge of PRS information may be based on the transparent communication between the WTRU or UE and the E-SMLC, for example. Additionally, systems and/or methods may be provided herein for handling and/or for avoiding such collisions.

As described herein, systems and/or methods may be provided to provide an ePDCCH that may be used with multiple carriers. For example, a resource definition or description such as an ePDCCH resource configuration may be provided. In the ePDCCH resource configuration, a resource element (RE) in a subframe may be used for ePDCCH that may satisfy one or more of the following: may not collide with downlink antenna ports (e.g., reference signal) from 0 to 22 except for antenna ports {4, 5}; may not be occupied by PCFICH, PHICH, and/or PDCCH; not used for PSS/SSS and/or PBCH; may not be configured for a muted RE (e.g., zero-power CSI-RS, ABS, null RE); may not be used for PDSCH; may not be used for PMCH for a configured MBFSN subframe(s); and/or which may be used for an above purpose, but may be differential by applying mutually orthogonal patterns to both ePDCCH and non-ePDCCH (e.g., as described herein).

Figure 16:
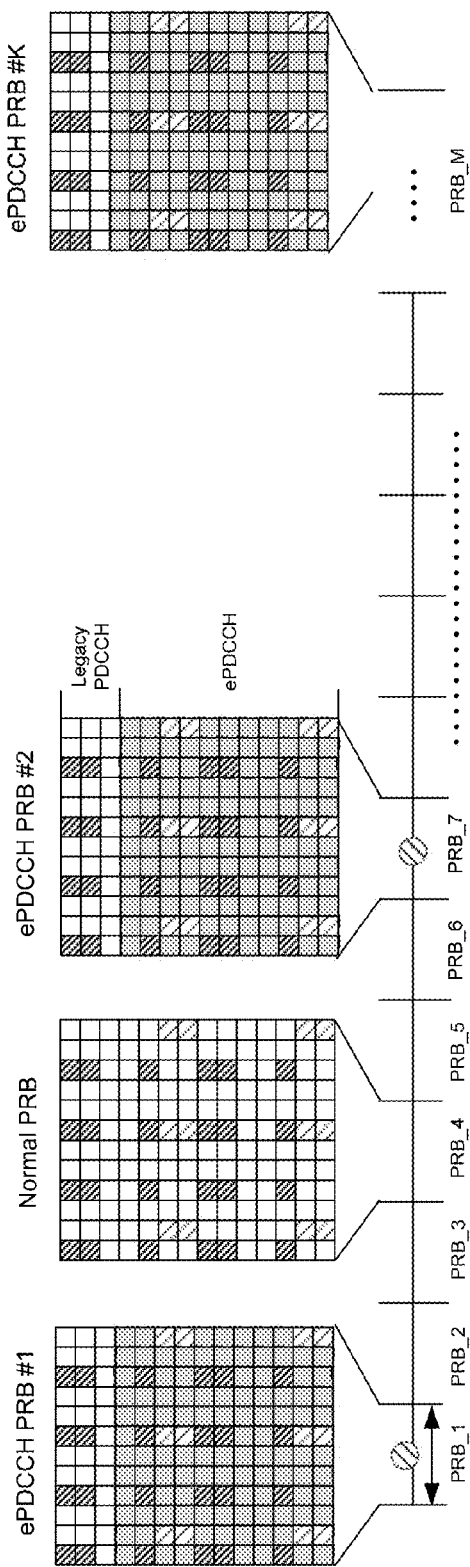
FIG. 16 illustrates an example embodiment of ePDCCH resource allocation in a subframe.

A resource configured for FDD and TDD (e.g., in a single DL Carrier) may also be provided. For example, a subset of a physical resource block(s) (PRB), which may be referred to as a PRB-pair or RB, in a subframe may be configured for an ePDCCH transmission and the ePDCCH resources may be provided to a WTRU or UE by using broadcast channel(s) (e.g., MIB, SIB-x) and/or higher layer signalling (e.g., RRC, MAC, and the like). The subset of PRB may be consecutive PRBs or distributed PRBs. If a system bandwidth may be 5 MHz (e.g. where 25 PRBs may be available, $N_{RB}^{max,DL}=25$), the subset $N_{RB}^{ePDCCH}$ of PRBs for ePDCCH may be configured, where $N_{RB}^{ePDCCH} < N_{RB}^{max,DL}$. FIG. 16 shows an example for ePDCCH multiplexing with PDSCH, where ePDCCH resources may be allocated in a subframe. The PRB level ePDCCH multiplexing with PDSCH may be used (e.g., as shown).

In an embodiment, ePDCCH PRBs may be reserved, for example, to enable simpler ePDCCH reception and/or reduced blind decoding complexity. Additionally, the ePDCCH PRBs may be configured in PRB-pair level and may include one or more of the following. For example, resource allocation types for PDSCH transmission may be used including resource allocation type 0, which may be a bitmap based indication with resource block group (RBG) where RBG may be defined according the system bandwidth; resource allocation type 1, which may be a bitmap based indication with RBG subset; resource allocation type 2, which may be a contiguous resource allocation (e.g., starting RB number and/or length may be given); the resource allocation type for ePDCCH resource may be different according to ePDCCH modes (e.g., distributed and localized transmissions), for example, resource allocation type 0 may be used for localized transmission and resource allocation type 1 may be used for distributed allocation; and/or the RBs for localized and distributed transmission may be overlapped, that is, a PRB-pair may be used for localized and distributed transmission. Additionally, a per-PRB-pair level bitmap indication may be used where a bitmap per PRB-level may be provided to indicate the ePDCCH resources that may use $N_{DL,PRB}$ bits and $N_{DL,PRB}$ may indicate a number of PRB-pairs in the downlink system. In embodiments, predefined PRBs may also be used. For example, multiple PRB-pair subsets may be defined for ePDCCH and/or the subset number may be informed to a WTRU or UE. Each PRB-pair subset may include one or more numbers of PRB-pairs and the PRB-pairs in a PRB-pair subset may be mutually orthogonal with another PRB-pair subset. At least one of PRB-pair subset may be used without configuration. The PRB-pair subset may be used for common search space, or used for the first PRB-pair subset for WTRU or UE-specific search space. The subset number may be informed to a WTRU or UE dynamically. For example, the subset number may be indicated in each subframe in which a WTRU or UE may monitor or receive ePDCCH. Predefined PRBs may be used for a common search space. Configuration based PRBs may be used for a WTRU or UE-specific search space. The ePDCCH PRB embodiments described herein may be used per ePDCCH resource set if multiple ePDCCH resource sets may be configured for a WTRU or UE. The ePDCCH resource set and ePDCCH region may be used interchangeably.

According to an example embodiment, a WTRU or UE may have a particular behavior to monitor ePDCCH based on a given ePDCCH indication. For example, the ePDCCH resources may be informed to a WTRU or UE via broadcasting channels and/or RRC signaling. The WTRU or UE may monitor ePDCCH within its search space which may be in a subset of PRBs configured for ePDCCH. The subset of PRBs may be informed to a WTRU or UE with dynamic indication in an implicit or explicit manner. For example, an indication bit may be transmitted in the subframe and/or a DM-RS scrambling sequence may indicate which subset of PRBs configured for ePDCCH may be used. The ePDCCH resources may be informed to a WTRU or UE with an ePDCCH resource index (ERI) from a set of ePDCCH configurations and/or the ERI may be informed via higher layer signaling or implicitly derived from at least one of following: a subframe index and/or SFN; Cell-ID; and/or RNTI (e.g., C-RNTI, P-RNTI, SI-RNTI). A WTRU or UE may be informed regarding types of ePDCCH resources such as a "system ePDCCH resources" and/or a "WTRU or UE-specific ePDCCH resources." WTRU or UE behavior associated with these ePDCCH resource types may include one or more of the following: a WTRU or UE may receive the system ePDCCH resource information via a broadcast channel or higher layer signaling. A WTRU or UE may receive WTRU or UE-specific ePDCCH resource information from higher layer signaling. The WTRU or UE-specific ePDCCH resource may be the same as system ePDCCH resources. The WTRU or UE-specific ePDCCH resource may be a subset of system ePDCCH resources in a time and/or frequency domain. For example, a subset of PRBs in a subframe and/or a subset of time subframe/frame may be the WTRU or UE-specific ePDCCH resources. In embodiments, a WTRU or UE may not receive (e.g., may not assume to receive) PDSCH in a system ePDCCH resource that may not be in the WTRU or UE-specific ePDCCH resources. A WTRU or UE may receive (e.g., assume to receive) PDSCH in a system ePDCCH resources that may not be in the WTRU or UE-specific ePDCCH resources. A WTRU or UE may receive (e.g., may assume to receive) PDSCH in a WTRU or UE-specific ePDCCH resource if ePDCCH may not be transmitted in an ePDCCH PRB-pair.

According to an example embodiment, the ePDCCH PRBs may be configured in multiple steps, such as long-term and short-term ePDCCH resources. For example, the long-term ePDCCH resources may be defined in a semi-static manner and/or the short-term ePDCCH resources may be defined within the long-term ePDCCH resources in a dynamic manner. Also, the long-term ePDCCH resources, cell-specific ePDCCH resources, semi-static ePDCCH resources, temporal ePDCCH resources, and/or higher layer configured ePDCCH resources may be used interchangeably.

In an embodiment, the long-term ePDCCH resource may be a set of PRB-pairs within a system bandwidth. The resource allocation type 0, 1, or 2 may be used for indicating a set of PRB-pairs as a long-term ePDCCH resource. A number of bits (e.g., $N_{RB}^{max,DL}$) may be used for bitmap based allocation to support flexibility (e.g., full flexibility). The resource indication for long-term ePDCCH resource may be informed to a WTRU or UE via broadcasting or higher layer signalling. A WTRU or UE may know or assume that a part of long-term ePDCCH resources (e.g., PRB-pairs) may be used for PDSCH transmission. If a PDSCH resource allocation may collide with long-term ePDCCH resources while not colliding with short-term ePDCCH resources, a WTRU or UE may know or assume that PDSCH may be transmitted in the resources. If a PDSCH resource allocation collides with both long-term and short-term ePDCCH resources, a WTRU or UE may assume that PDSCH may not be transmitted in the resource and/or rate-match around the resources.

The short-term ePDCCH resource may be named as WTRU or UE-specific ePDCCH resources, dynamic ePDCCH resources, per-subframe ePDCCH resources, and/or L1 signalling based ePDCCH resources. The short-term ePDCCH resources may be a subset of long-term ePDCCH resources. The subset of ePDCCH resources may be indicated in each subframe so that the eNB may change the subset of ePDCCH resources from a subframe to another.

The indication for short-term ePDCCH resources may be based on explicit signalling. The explicit signalling may include one or multiple indication bits transmitted in the same subframe and/or the location of the indication bits may be fixed. According to an example embodiment, the fixed location may be the lowest index of the PRB-pairs configured for long-term ePDCCH resources. The fixed location may be predefined irrespective of the long-term/short-term ePDCCH resources. For example, the lowest index of the PRB-pair in the system bandwidth. The fixed location may be based on distributed transmission.

The indication for short-term ePDCCH resources may be based on implicit signalling. The implicit signalling may be a DM-RS in the PRB-pairs configured as short-term ePDCCH resources that may be scrambled with a specific scrambling code which may be known to the eNB and/or the WTRU or UE. Therefore, a WTRU or UE may check the long-term ePDCCH resources with a specific scrambling code to figure out the short-term ePDCCH resources. Once the WTRU or UE finishes figuring out (e.g., determining) the short-term ePDCCH resources, WTRU or UE-specific search space may be defined with the short-term ePDCCH resources. Therefore, the WTRU or UE may monitors ePDCCHs within the WTRU or UE-specific search space. The short-term resource may be configured in a WTRU or UE-specific manner. A WTRU or UE may assume that PDSCH may not be transmitted in the PRB-pair configured for long-term ePDCCH resources, for example, even if the PRB-pairs may not be within short-term ePDCCH resources. The short-term resource may be configured in a cell-specific manner. A WTRU or UE may receive PDSCH in the PRB-pair configured for long-term ePDCCH resources, for example, if the PRB-pairs may not be within short-term ePDCCH resources.

Multiple ePDCCH resource sets may be provided or described herein and/or a subset of ePDCCH resource sets may be used in a subframe. The number of ePDCCH resource sets may be configurable by eNB. The number of ePDCCH resource sets may be fixed irrespective of the system configuration. A subset of ePDCCH resource set may be configured for a specific WTRU or UE as a WTRU or UE-specific search space. A subset of ePDCCH resource set for a specific WTRU or UE may be predefined as a function of C-RNTI and/or subframe number. For example, if $N_{ePDCCH}$ subsets of ePDCCH resource sets may be defined and one of the subsets of ePDCCH resource sets may be configured to a specific WTRU or UE, the following equation may be used to select which ePDCCH resource set may be used for the WTRU or UE. A subset of ePDCCH resource sets for a specific WTRU or UE may be defined as $k=n_{RNTI}$ mod $N_{ePDCCH}$. Table 8-3 shows an example of subset configurations when four ePDCCH resource sets may be defined. In the table, 'v' may indicate which set may be included in the subset. Additionally, $k=n_{RNTI}$ mod 3 may be used in Table 8-3.

TABLE 8-3

An example of multiple subsets of ePDCCH resource sets.

| ePDCCH resource sets (Set-n) | Subset-k | | |
|---|---|---|---|
| | k = 0 | k = 1 | k = 2 |
| Set-0 | v | v | v |
| Set-1 | v | — | — |
| Set-2 | — | v | — |
| Set-3 | — | — | v |

An ePDCCH resource set may include one or more PRB-pairs and/or the number of PRB-pairs per ePDCCH resource set may be fixed. For example, $N_{set}$ PRB-pairs may be grouped as an ePDCCH resource set, where the $N_{set}$ PRB-pairs may be consecutive or distributed over the system bandwidth.

Additionally, an ePDCCH resource set may be configured as a localized ePDCCH resource or a distributed ePDCCH resource. If an ePDCCH resource set may be defined as localized ePDCCH resource, eCCEs within the ePDCCH resource set may be defined as localized ePDCCH transmission (LeCCE). In one ePDCCH resource set, multiple LeCCEs may be defined. The REs for a LeCCE may be located within a PRB-pair. If an ePDCCH resource set may be defined as distributed ePDCCH resource, eCCEs within the ePDCCH resource set may be defined as distributed ePDCCH transmission (DeCCE). In an ePDCCH resource set, multiple DeCCEs may be defined. The REs for a DeCCE may be located over two or more number of PRB-pair. A DeCCE may include multiple eREGs, where an eREG may include multiple REs within a PRB-pair. The multiple eREGs for a DeCCE may be transmitted over multiple PRB-pairs within an ePDCCH resource set. The first ePDCCH resource set may be predefined as distributed ePDCCH resource and/or the other ePDCCH resource sets may be configured as one of localized and distributed ePDCCH resource.

The number of PRB-pairs per ePDCCH resource set may vary according to the system parameters. For example, the number of PRB-pairs per ePDCCH resource set may be defined as a function of the system bandwidth or the number of RBs (e.g., $N_{RB}^{DL}$) such as $N_{set}=f(N_{RB}^{DL})$. In this case, one or more of the following may apply: $N_{set}=f(N_{RB}^{DL})=\lceil N_{RB}^{DL}/N_s \rceil$, where $N_s$ may be a fixed number or eNB configured number; the function for the number of PRB-pairs per set may be different according to the ePDCCH transmissions such as localized and distributed ePDCCH; and/or a lookup table may be defined for $N_{set}$ according to $N_{RB}^{max,DL}$. The value of $N_{set}$ may be different from the Table 8-4 shown below.

TABLE 8-4

Number of PRB-pair ($N_{set}$) according to the system bandwidth.

| System Bandwidth ($N_{RB}^{max,DL}$) | $N_{set}$ |
| --- | --- |
| ≤10 | 2 |
| 11-26 | 4 |
| 27-63 | 6 |
| 64-110 | 8 |

In an embodiment, the fixed value of $N_{set}$ may be used for common search space, while multiple value of $N_{set}$ may be used for WTRU or UE-specific search space. The multiple value of $N_{set}$ for WTRU or UE-specific search space may be changed according to at least one of the system bandwidth, the subframe number and/or SFN number, and/or a configured parameter via broadcasting or higher layer signalling.

Among the multiple ePDCCH resource sets, a subset may also be selected explicitly (e.g., using one or more indication bit(s)). For example, one or more indication bit(s) may be transmitted in the PDCCH region in the same subframe. In this embodiment, at least one of a PCFICH in the PDCCH region or a DCI may be transmitted for indication bit transmission. The PCFICH in the PDCCH region may be used to indicate how many ePDCCH resource sets may be used. In this case, the number of OFDM symbols for the PDCCH may be defined as either following the same number indicated in PCFICH or configured via higher layer signalling. The DCI may be defined and/or transmitted in a common search space. The DCI may include at least one of a number of ePDCCH resource sets and/or a resource allocation index.

The one or more indication bit(s) may be transmitted in the same or previous subframe in the PDSCH region. In this case, an indication channel may be transmitted for indication transmission. The indication channel (e.g., ePCFICH) may be defined and/or transmitted in a specific location. The location for the indication channel may be a zero-power CSI-RS or a subset REs of zero-power CSI-RS. If zero-power CSI-RS location may be used, the subset of ePDCCH resource sets may be valid within the duty cycle. The indication channel may be defined in the first ePDCCH resource set. The indication channel may be transmitted over $N_{set}$ PRB-pairs, for example, when $N_{set}$ PRB-pairs may be used for the first ePDCCH resource set. The indication channel may be defined in the fixed location in the subframe and/or the location may be changed according to the cell-ID and/or subframe number. The indication channel may be transmitted in the subframe n−1 and/or the indication information may be applied in the subframe n.

Among the multiple ePDCCH resource sets, a subset may be selected implicitly. For example, a specific DM-RS scrambling sequence may be used for the subset of ePDCCH resource sets used for ePDCCH transmission in the subframe. A WTRU or UE may detect the ePDCCH resource sets used for ePDCCH transmission in the subframe, for example, by using the sequence scrambled to the DM-RS. Once a WTRU or UE finishes the ePDCCH resource set detection, the WTRU or UE may figure out the WTRU or UE-specific search space. The WTRU or UE may start blind detection within the WTRU or UE-specific search space.

Multiple ePDCCH resource sets, which may be interchangeably used as ePDCCH region, ePDCCH PRB set, and/or ePDCCH set, may be implemented. Each ePDCCH resource set may include a non-overlapped $N_{set}$ PRB-pair where the $N_{set}$ may have one or more values. In this embodiment, each ePDCCH resource set may be configured as ePDCCH localized transmission or ePDCCH distributed transmission. The $N_{set}$ may also, or alternatively, be configured via higher layer signalling, predefined as a function of system parameter(s), and/or defined as a combination of system parameters ad higher layer signalling.

A $K_{set}$ ePDCCH resource set may also be configured for a WTRU or UE where the $K_{set}$ may have two or more values. In this embodiment, the $N_{set}$ for each ePDCCH resource set may be used independently when $K_{set}$ ePDCCH resource sets may be configured, the $K_{set}$ may be configured via higher layer signalling, the $K_{set}$ may be indicated in broadcasting channel (e.g., MIB, SIB-x), and/or the $K_{set}$ may be different according to the SFN/subframe index.

When the $N_{set}$ for each ePDCCH resource set may be used independently, one or more of the following may apply: the $N_{set}$ may be larger for localized transmission so that frequency selective scheduling gain may be increased while the reasonable resource utilization may be provided; the $N_{set}$ may be larger for distributed transmission so that frequency diversity gain may be maximized; the $N_{set}$ may be defined as a function of the system bandwidth or other cell-specific parameters for at least one of ePDCCH transmissions (e.g., localized and distributed transmission), for example, the $N_{set}$ may be predefined for localized transmission according to the system bandwidth while $N_{set}$ may be configured for distributed transmission via higher layer signalling; and/or two $N_{set}$ may be configured such as $N_{set,1}$ and $N_{set,2}$ if $K_{set}$ may be larger than 1, and the $N_{set,1}$ may be used for the configured ePDCCH resource set(s) as a distributed transmission while $N_{set,2}$ may be used for all configured ePDCCH resource set(s) as a localized transmission.

The $K_{set}$ ePDCCH resource set may be configured as a single ePDCCH resource set or multiple ePDCCH resource sets. If a WTRU or UE may be configured with the multiple ePDCCH resource sets, the WTRU or UE may assume that $K_{set}=2$. In this embodiment, if a WTRU or UE may be configured with a single ePDCCH resource set, the ePDCCH resource set may be configured as localized or distributed ePDCCH transmission and/or the WTRU or UE may assume that the ePDCCH resource set may be configured as distributed transmission. If a WTRU or UE may be configured with multiple ePDCCH resource sets, at least one of ePDCCH resource set may be configured as distributed ePDCCH transmission; an ePDCCH resource set may be defined as primary ePDCCH resource set and the other ePDCCH resource set may be defined as secondary ePDCCH resource set; and/or the $N_{set}$ may be different according to the ePDCCH resource set. For example, the first set may have $N_{set}=4$ and the second set may have $N_{set}=2$.

In an embodiment, the ePDCCH resources may be configured and/or defined differently according to or based on the ePDCCH search space. For example, the ePDCCH common search space may be configured in a cell-specific manner and the WTRU or UE-specific search space may be configured in a WTRU or UE-specific manner.

The ePDCCH common search space resource may be configured via at least one of the following. In one embodiment, a minimum set of PRB pairs may be configured in a specific time and/or frequency location in a predefined manner. For example, 4 PRB-pairs or 6 PRB-pairs may be defined as a minimum set of PRB pairs for the common search space and the center 4 or 6 PRB-pairs in the downlink system bandwidth may be used for common search space.

Additionally, in a subframe including PSS/SSS and/or PBCH, the location of ePDCCH common search space may be located next to the center 6 PRB-pairs if the downlink system bandwidth may be larger than 6 PRB-pairs. In this embodiment, the 4 or 6 PRB-pairs may be equally divided and located in both sides of center 6 PRB-pairs.

The PRB pairs for the common search space may also be extended in a WTRU or UE-specific manner. In this embodiment, the minimum set of PRB pairs may be considered as the first ePDCCH common search space set and the WTRU or UE-specific common search space extension may be considered as the second EPDCCH common search space set. As such, two ePDCCH common search space sets may be configured and one of them may be configured in a cell-specific manner and the other may be configured in a WTRU or UE-specific manner. In such an embodiment, a subset of DCI formats that may be monitored in the common search space may be monitored in a cell-specific common search space and the others may be monitored in a WTRU or UE-specific common search space. For example, DCI formats 1A/1B/1C may be monitored in the cell-specific common search space and DCI formats 3/3A may be monitored in the WTRU or UE-specific common search space. Additionally, the WTRU or UE-specific common search space may be configured via higher layer signalling or signalled in a broadcasting channel. Furthermore, in an embodiment, two common search space resource sets may be configured and the first ePDCCH common search space resource set may be predefined in a fixed location while the second ePDCCH common search space resource set may be configured via broadcasting channels such as MIB or SIB-x.

The WTRU or UE-specific search space may be configured via at least one of the following. In an embodiment, a WTRU or UE-specific ePDCCH resource set may be defined as a set of a number of PRBs. For example, one of the {2, 4, 8} PRBs may be configured for a WTRU or UE-specific ePDCCH resource set via higher layer signalling. Additionally, a bitmap may be used to indicate the PRB-pairs configured for common search space. In an embodiment, up to two WTRU or UE-specific ePDCCH resource sets may be configured per WTRU or UE and the two WTRU or UE-specific ePDCCH resource sets may be overlapped partially or fully in PRB pairs.

Furthermore, the PRB pairs for a WTRU or UE-specific search space and the PRB pairs for a common search space may be overlapped. In this embodiment, one or more of following may apply. The second ePDCCH common search space resource set may be overlapped with a WTRU or UE-specific ePDCCH resource set where, for example, the second ePDCCH common search space set may be either a WTRU or UE-specific common search space or a cell-specific common search space. If two ePDCCH common search space resource sets may be configured, the two EPDCCH common search space resource sets may be fully or partially overlapped with each other.

Embodiments may be described herein for resource configuration for TDD in the embodiment of a single DL carrier. In frame structure 2, several UL-DL subframe configurations and associated HARQ-ACK and UL/DL grant may be defined, for example, in order to fully utilize UL/DL resources. Table 9 shows an exemplary UL-DL subframe configuration that may allow various uplink downlink traffic asymmetries according to the network environments.

TABLE 9

UL-DL subframe configuration

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 9, 'D' and 'U' denote downlink subframe and uplink subframe, respectively. 'S' denotes special subframe that may be used when the subframe configuration may be changed from downlink to uplink, e.g., as a guard time so that a WTRU or UE may prepare to transmit signals. The special subframe may comprise DwPTS, UpPTS, and GP where DwPTS and UpPTS periods may be a number of OFDM symbols for downlink and uplink transmissions, respectively. The rest of the times except for DwPTS and UpPTS may be considered as GP. Table 10 shows example special subframe configurations.

TABLE 10

Configuration of special subframe in normal CP
(lengths of DwPTS/GP/UpPTS)

| | Normal cyclic prefix in downlink | | | |
|---|---|---|---|---|
| | DwPTS | | UpPTS | |
| Special subframe configuration | # of DL OFDM symbols | | # of SC-FDMA symbols | Normal cyclic prefix in uplink |
| 0 | 3 | $6592 \cdot T_s$ | 1 | $2192 \cdot T_s$ |
| 1 | 9 | $19760 \cdot T_s$ | | |
| 2 | 10 | $21952 \cdot T_s$ | | |
| 3 | 11 | $24144 \cdot T_s$ | | |
| 4 | 12 | $26336 \cdot T_s$ | | |
| 5 | 3 | $6592 \cdot T_s$ | 2 | $4384 \cdot T_s$ |
| 6 | 9 | $19760 \cdot T_s$ | | |
| 7 | 10 | $21952 \cdot T_s$ | | |
| 8 | 11 | $24144 \cdot T_s$ | | |

Since an ePDCCH may be transmitted based on antenna ports 7~10, the ePDCCH may not be transmitted in a special subframe configuration. In such a case, a WTRU or UE behavior for PDCCH reception may be provided as described herein. For example, a WTRU or UE may assume that the ePDCCH may be limited to transmission in a normal downlink subframe. A WTRU or UE may assume that downlink control channel may be transmitted via legacy PDCCH in a special subframe irrespective of the PDCCH configuration. A WTRU or UE may assume to receive ePDCCH targeting special subframe n in downlink subframe n−k where k may be defined according to the UL-DL subframe configuration and k may be defined as the downlink subframe closest to the subframe n. If a WTRU or UE may be configured to receive ePDCCH, the WTRU or UE may skip blind decoding of ePDCCH in the special subframe. ePDCCH and legacy PDCCH reception may be configurable, for example, as shown in the exemplary TDD UL-DL subframe configuration in Table 11 where 'E' and 'L' denote ePDCCH and legacy PDCCH, respectively.

TABLE 11 legacy PDCCH (L)-ePDCCH (E) subframe configuration

| Legacy PDCCH-ePDCCH configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | E | L | — | — | — | E | L | — | — | — |
| 1 | 5 ms | E | E | — | — | — | E | E | — | — | — |
| 2 | 5 ms | E | L | — | — | E | E | L | — | — | E |
| 3 | 5 ms | E | E | — | — | E | E | E | — | — | E |
| 4 | 5 ms | E | L | — | E | E | E | L | — | E | E |
| 5 | 5 ms | E | E | — | E | E | E | E | — | E | E |
| 6 | 10 ms | E | L | — | — | — | E | E | E | E | E |
| 7 | 10 ms | E | E | — | — | — | E | E | E | E | E |
| 8 | 10 ms | E | L | — | — | E | E | E | E | E | E |
| 9 | 10 ms | E | E | — | — | E | E | E | E | E | E |
| 10 | 10 ms | E | L | — | E | E | E | E | E | E | E |
| 11 | 10 ms | E | E | — | E | E | E | E | E | E | E |
| 12 | 5 ms | E | L | — | — | — | E | L | — | — | E |
| 13 | 5 ms | E | E | — | — | — | E | E | — | — | E |
| 14 | | Reserved | | | | | | | | | |
| 15 | | Reserved | | | | | | | | | |

A WTRU or UE may assume that ePDCCH may or may not be transmitted and/or monitored in a specific special subframe based on one or more of the following. In a downlink normal cyclic prefix (CP) case, ePDCCH may be transmitted and/or monitored in the special subframe configuration {1, 2, 3, 4, 6, 7, 8} in Table 10 (e.g., and may not be transmitted and/or monitored in configurations 0 and 5, for example, for such TDD and/or downlink normal CP). The special subframe configuration in which ePDCCH may be transmitted may be predefined as other than {1, 2, 3, 4, 6, 7, 8}. For example, ePDCCH may be transmitted and/or monitored in a DwPTS comprising more than m OFDM symbols, where m may be 3, 8, 9, or 10. Additionally, if a special subframe configuration 0 or 5 may be used in a cell, a WTRU or UE behavior for PDCCH reception may be defined in one or more of the following ways: a WTRU or UE may assume that ePDCCH may not be transmitted and/or monitored in a special subframe (e.g., 0 or 5 which may not be included in the special subframe configuration {1, 2, 3, 4, 6, 7, 8} described above), otherwise, a WTRU or UE may monitor ePDCCH in a special subframe; a WTRU or UE may assume that ePDCCH targeting the special subframe n may be transmitted in subframe n−k, where k may be defined as the downlink subframe closest to the subframe n; a WTRU or UE may assume that PDCCH may be transmitted via legacy PDCCH in the special subframes; and/or a WTRU or UE may follow the configuration of ePDCCH and legacy PDCCH which may be predefined. If a special subframe configuration other than 0 and 5 may be used in a cell, a WTRU or UE may assume that ePDCCH may be transmitted in DwPTS. There may be a special subframe in which DwPTS may be equal to or longer than $N_{DwPTS}$ [OFDM symbol]. The $N_{DwPTS}$ may be configured by higher layers. The $N_{DwPTS}$ may be fixed as 9 (e.g., which may be equivalent to $19760 \cdot T_s$ for normal CP and $20480 \cdot T_s$ for extended CP).

Figure 17:
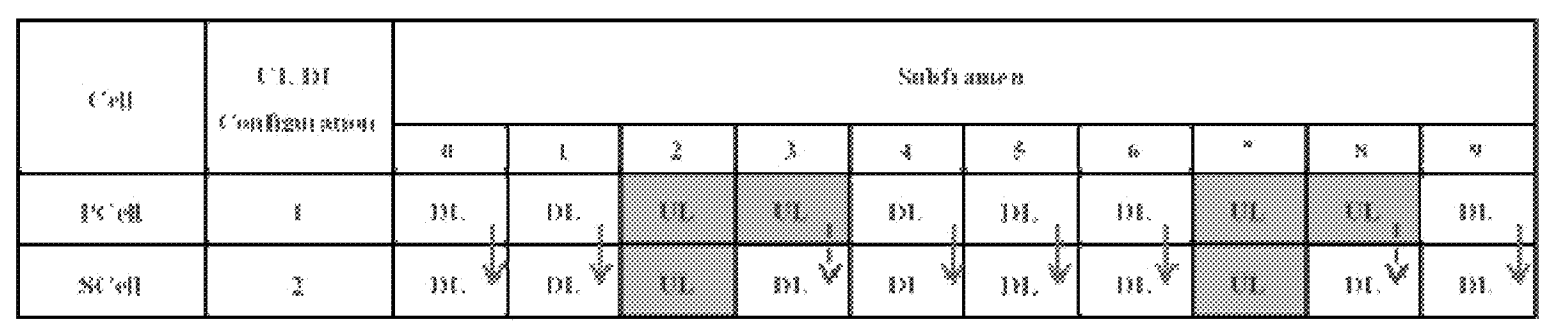

If multiple component carriers may be configured in TDD mode, each component carrier may have a different UL-DL subframe configuration. For example, PCell and SCell may be configured with UL-DL configuration 1 and 2, respectively, as shown in the FIG. 17. FIG. 17 illustrates an example embodiment of carrier aggregation with different TDD UL-DL configuration. In such a case, a downlink subframe for PCell may not be available in subframes 3 and 8, although a WTRU or UE may expect to receive PDSCH in SCell, which may result in scheduling restriction if cross carrier scheduling may be activated since a WTRU or UE may receive PDCCH in PCell. At least one of WTRU or UE behaviors described herein may be used when a cross carrier scheduling may be activated, which may resolve such issues. For example, a WTRU or UE may assume that the PDCCH may be transmitted in SCell if a normal downlink subframe may not be available in PCell in an SCell downlink subframe. A WTRU or UE may monitor ePDCCH in SCell for PDCCH reception regardless of the PDCCH configuration. A WTRU or UE may monitor the legacy PDCCH if the WTRU or UE may be configured to receive the legacy PDCCH in PCell. A WTRU or UE may monitor the legacy PDCCH or ePDCCH according to a subframe with a predefined PDCCH reception configuration. A WTRU or UE may assume that the PDCCH may be transmitted in SCell if a normal downlink subframe or special subframe may not available in PCell in an SCell downlink subframe. A WTRU or UE may continue to monitor PDCCH in a special subframe if the special subframe configuration may not be 0 or 5. If a special subframe configuration 0 or 5 may be used, a WTRU or UE may assume that PDCCH may be transmitted in SCell. If multiple SCells may be configured, the SCell locating lowest frequency may be considered as PCell for PDCCH reception.

Resource allocation (e.g., ePDCCH resource allocation) in a multiple carrier system (e.g. in multiple DL carriers) may be disclosed, provided, and/or used. In a multiple carrier system, the resources for ePDCCH may be defined in a PDSCH region and the ePDCCH resources may be multiplexed with PDSCH in an FDM manner. The ePDCCH resource may be configured in one or more of the following ways.

ePDCCH resources may be limited to configuration in the Primary cell (PCell) if cross-carrier scheduling may be activated. In such a case, a WTRU or UE may assume that an ePDCCH may be limited to transmission in PCell and the WTRU or UE may limit monitoring for ePDCCH reception to Pcell. ePDCCH resources may not be allowed in a Secondary cell (SCell). Additionally, ePDCCH resources in SCell may be considered as muted RBs from a WTRU or UE perspective such that the WTRU or UE rate-matches the RBs if a PDSCH may be scheduled in the RBs.

Additionally, ePDCCH resources may be configured in a single cell if cross-carrier scheduling may be activated. The cell (e.g., component carrier) that has ePDCCH resources may be configured by higher layer signalling. The cell (e.g., component carrier) that has ePDCCH resources may be predefined. For example, a broadcast channel (e.g., SIB-x) may indicate the cell. The component carrier that has the ePDCCH may be fixed or changed according to subframe and/or radio frame. If the component carrier having the ePDCCH may be changed, a WTRU or UE may implicitly derive which component carrier has the ePDCCH in a specific subframe and/or radio frame by using an SFN number.

ePDCCH resources may be defined in a subset of component carriers which may be equal to or smaller than the configured component carriers for a specific WTRU or UE. The subset of component carriers may be configured by higher layers. Additionally, the subset of component carriers may be predefined including, for example, component carrier number and center frequency. The subset of component carriers may also be dynamically changed from a subframe to another. The subset pattern may be predefined and/or tied with an SFN number.

In an embodiment, ePDCCH and legacy PDCCH may be configured at the same time. In such an embodiment, a subset of component carriers may be configured for ePDCCH while the other component carriers may be configured for legacy PDCCH. Therefore, a WTRU or UE may monitor the ePDCCH in the component carriers configured for ePDCCH and the legacy PDCCH in the other component carriers.

Figure 18:
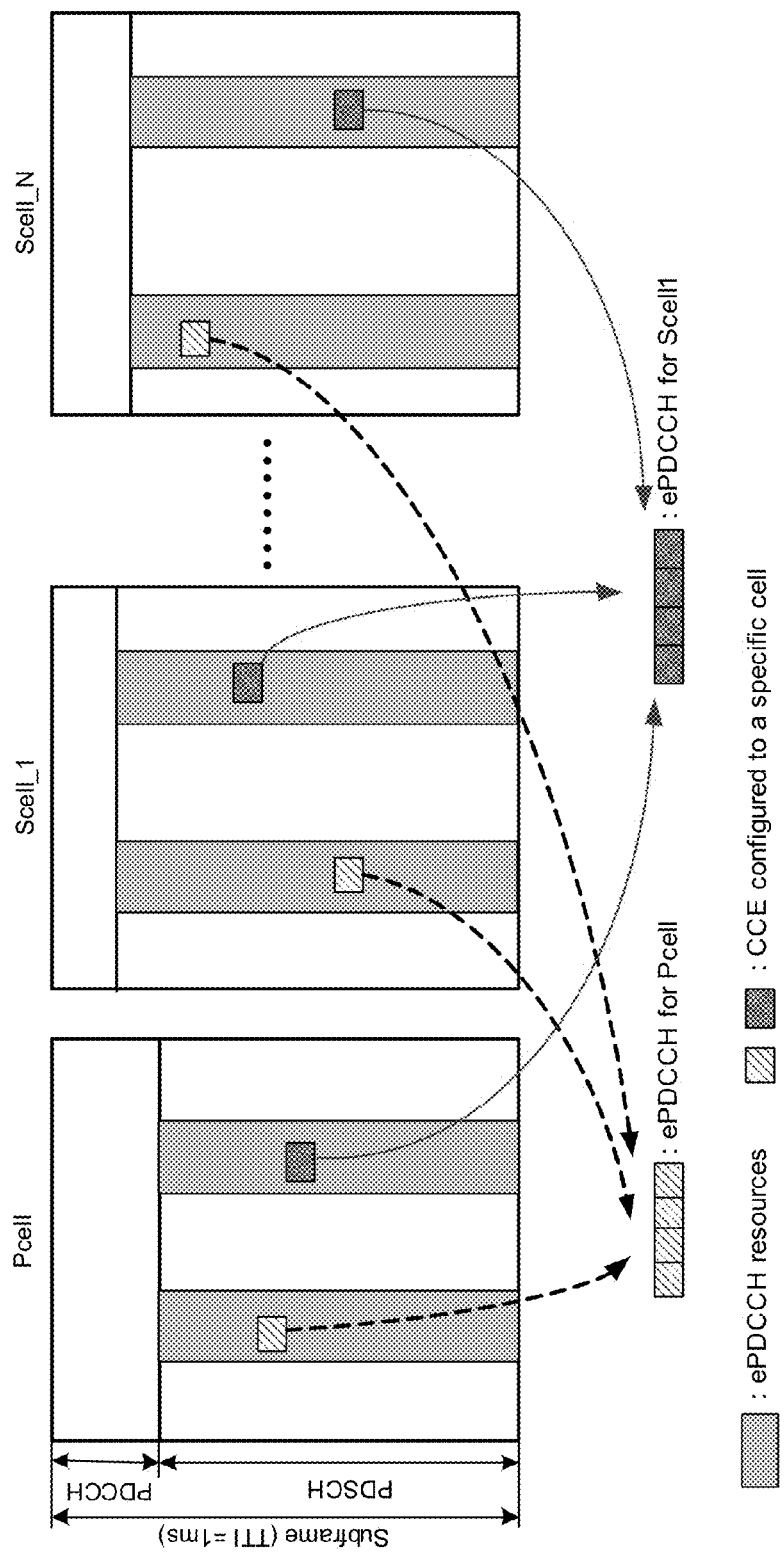
FIG. 18 illustrates an example embodiment of CCE aggregation across multiple carriers in distributed resource allocation.

An ePDCCH frequency diversity mode may be interchangeably defined and may not be limited to ePDCCH distributed transmission, ePDCCH frequency diversity scheme, ePDCCH distributed mode, and/or Mode-1. For an ePDCCH frequency diversity mode (e.g., distributed mode, Mode-1, etc.), the resources for an ePDCCH may be distributed across system frequency bandwidth to achieve frequency diversity gain. The ePDCCH resource for frequency diversity mode may be configured as described herein. For example, enhanced Control Channel Elements (eCCEs) and/or enhanced Resource Group Elements (eREGs) may be distributed to multiple downlink carriers (e.g., DL cells), where an ePDCCH may be transmitted by using {1, 2, 4, or 8} eCCEs and an eCCE may comprise $N_{eREGs}$. The size-N may be predefined. If a cross carrier scheduling may be activated, an ePDCCH may be distributed over the PCell, and an ePDCCH may be otherwise distributed across multiple component carriers (e.g., DL carrier). For eCCE aggregation, a WTRU or UE may aggregate eCCEs across multiple component carriers (e.g., DL carrier), as shown in FIG. 18 for instance. FIG. 18 illustrates an exemplary eCCE aggregation across multiple carriers in distributed resource allocation. For eCCE-to-eREG mapping, eREGs may be distributed across multiple carriers. ePDCCH Mode-1 may be configured within center 5 MHz (e.g., 25 PRBs) bandwidth.

The ePDCCH frequency selective mode may be interchangeably defined and not limited to ePDCCH localized transmission, ePDCCH frequency selective scheme, ePDCCH localized mode, and/or Mode-2. For ePDCCH frequency selective mode (e.g., localized mode, Mode-2, and the like), the resources for an ePDCCH may be located in one or two RBs according to the eCCE aggregation level to achieve frequency selection gain. The ePDCCH resource for frequency selective mode may be configured as described herein. For example, eCCEs may be located within the same PRB-pairs if multiple eCCEs may be aggregated. eREGs located within a same PRB-pair and/or neighbor PRB-pairs may be aggregated to form an eCCE. ePDCCH Mode-2 may be configured within center 5 MHz (e.g., 25 PRBs) bandwidth.

In a multiple component carrier system, the ePDCCH Mode-1 (e.g., ePDCCH frequency diversity mode) and/or the ePDCCH Mode-2 (e.g., ePDCCH frequency selective mode) may be configured as described herein. For example, a WTRU or UE may monitor ePDCCH Mode-2 in PCell and ePDCCH Mode-1 in other configured cells if cross-carrier scheduling may not be activated. A WTRU or UE may monitor ePDCCH Mode-1 and/or ePDCCH Mode-2 in PCell if cross-carrier scheduling may be activated. A subset of ePDCCH Mode-1 and/or ePDCCH Mode-2 resources may be defined as ePDCCH Mode-3 which may span to multiple PRBs in center frequency bandwidth.

An ePDCCH resource set may be defined within a cell such that the $N_{set}$ PRB-pairs for an ePDCCH resource set may be located within a cell. For example, the $K_{set}$ ePDCCH resource sets may also be located within a cell. As such, $N_{set}$ and/or $K_{set}$ may be defined per cell when multiple component carriers may be used. The cell may also be interchangeably used as component carrier, PCell, or SCell. In this case, at least one set among $K_{set}$ in the PCell may be defined as ePDCCH distributed transmission and/or $K_{set}$ may be defined as ePDCCH localized transmission or ePDCCH distributed transmission in an SCell.

Additionally, an ePDCCH resource set may be defined over multiple component carriers so that the $N_{set}$ PRB-pairs for an ePDCCH resource set may be located over multiple component carriers. In this case, when an ePDCCH resource set may be configured as distributed transmission, the $N_{set}$ PRB-pairs for an ePDCCH resource set may be located over multiple component carriers; and/or if an ePDCCH resource set may be configured as localized transmission, the $N_{set}$ PRB-pairs for the ePDCCH resource set may be located in the same cell.

An enhanced resource element group (eREG) may also be provided as described herein. A minimum resource unit for ePDCCH may be defined and/or called eREG (enhanced Resource Element Group). An eREG may be formed with a fixed number of REs. An eREG that may be formed with a variable number of REs where the number of REs may be different according to at least one of following factors: an eREG number; subframe number and/or subframe type (e.g., MBSFN subframe), CSI-RS configuration including zero-power CSI-RS; a PRS configuration; an existence of SSS/PSS and PBCH; and/or the like. An eREG may be formed with available REs in a given time/frequency resource grid such as N×M REs in PDSCH region not including one or more (e.g., each of or a subset) of following: zero-power CSI-RS and non-zero-power CSI-RS, SSS/PSS and/or PBCH, PRS, DM-RS, CRS, ePHICH, ePCFICH, and/or the like.

A time and/or frequency resource grid in PDSCH region (N×M REs) for eREG may be provided and defined in at least one of following manners: N and M indicates frequency and time RE granularity, respectively; N may be a fixed number between 1 and 12 (in an embodiment an exemplary fixed number for N may be one or two); N may be configurable by Broadcasting (e.g., MIB or SIB-x) and/or RRC configuration; N may be different in a subframe for localized transmission (ePDCCH Mode-1) and distributed transmission (ePDCCH Mode-2) (e.g., a small number of N may be used for distributed transmission ($N_{dist}$) and/or a large number of N maybe used for localized transmission ($N_{local}$) where $N_{local} > N_{dist}$); M may be defined as 14-$N_{PDCCH}$ in normal CP and 12-$N_{PDCCH}$ in extended CP, where $N_{mccH}$ may denote a number of OFDM symbols used for legacy PDCCH and indicated by PCFICH in the subframe; M maybe be defined as fixed number, such as 11 in normal CP and 9 in extended CP; M may be configurable by broadcasting (e.g., MIB or SIB-x) and/or RRC configuration; M may be different in a subframe for localized transmission (ePDCCH Mode-1) and distributed transmission (ePDCCH Mode-2) (e.g., a small number of M may be used for distributed transmission ($M_{dist}$) and a large number of M may be used for localized transmission ($M_{local}$) where $M_{local} > M_{dist}$).

In an embodiment, an eREG may be formed with a fixed or variable number of REGs where REG may be defined as four contiguous REs in PDSCH region not used for other purposes, but for ePDCCH as disclosed herein. For example, one eREG may include nine REGs, and by doing so, an eREG may be similar to a CCE (e.g., which may simplify the standardization evolution of terminology from PDCCH used).

Figure 19:
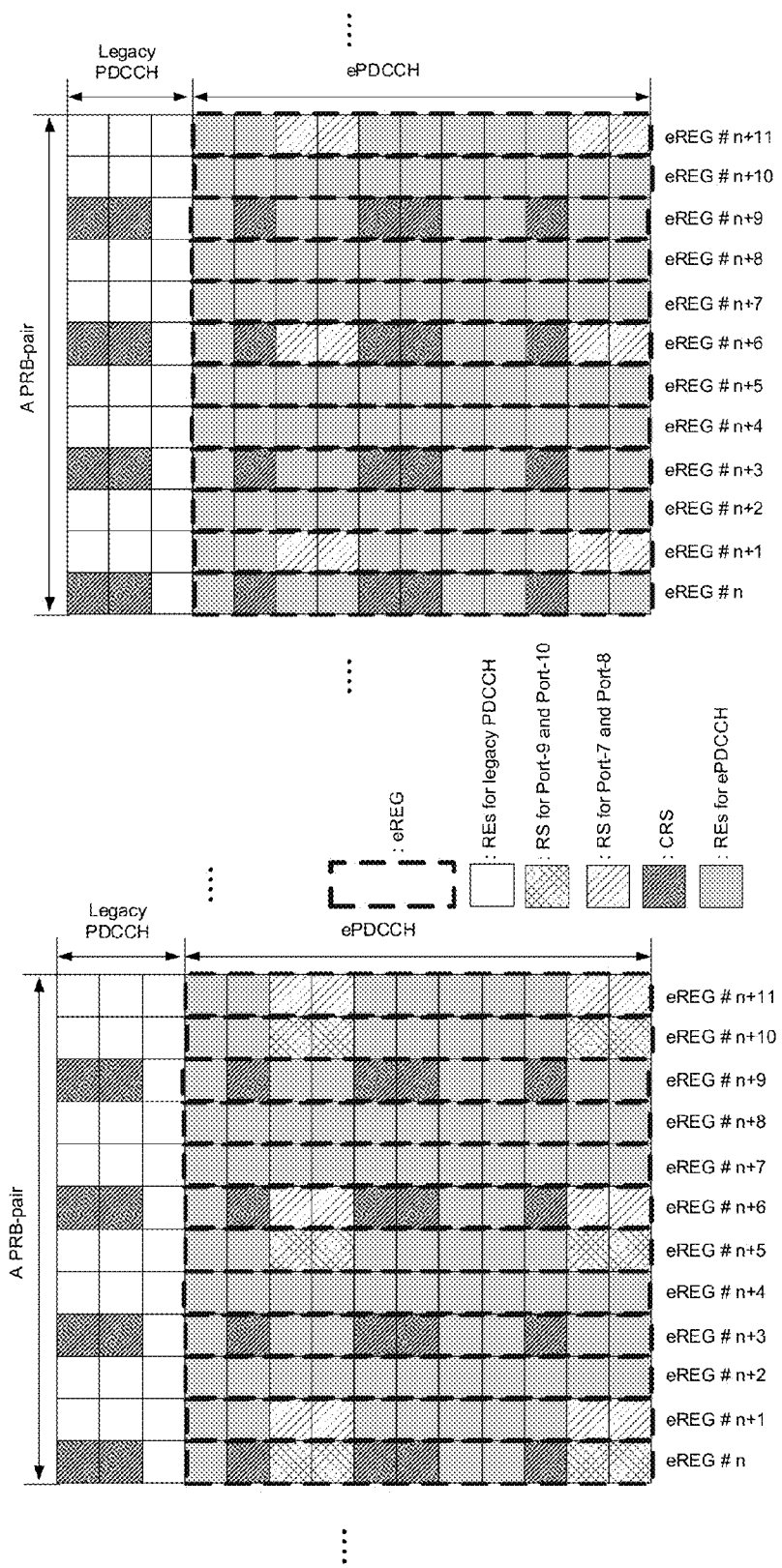
FIG. 19 illustrates an example embodiment of a PRB-pair that may be used for ePDCCH transmission based on the number of antenna ports (e.g., ports 7-10 and 7-8 respectively).

FIG. 19 shows an example embodiment of an eREG definition. For example, FIG. 19 illustrates a PRB-pair that may be used for ePDCCH transmission according to the number of antenna ports (e.g., ports 7-10 in left portion of FIG. 19 and port 7-8 in right portion of FIG. 19). As shown in FIG. 19, N=1 and M=11 may be used in a subframe not including CSI-RS and PSS/SSS. An eREG may span to both slots in a PRB-pair and the number of REs for eREGs may be different according to the eREG number due to the CRS and DM-RS. For example, the eREG #n may include 3REs while eREG #n+2 may include 11 REs (e.g., as shown in the left portion of FIG. 19) according to the existence of DM-RS and CRS. Also, fully FDM based eREG multiplexing may be used in order to utilize the power for unused eREGs flexibly. As an example, if eREG #n+7 may not be used the power may be reused to boost up eREG n+2 power.

In an embodiment, an eREG resource may be defined in an interleaved manner to randomize the RE location so that the channel estimation performance may be equalized regardless of the eREG number. Therefore, a WTRU or UE may receive an eREG based on the virtual eREG to physical eREG mapping rule.

A fixed number of eREG may be defined per PRB-pair configured as an ePDCCH resource. For example, 16 eREGs may be defined per PRB-pair, irrespective of the configuration of reference signal, subframe type, CP length, etc. The eREG may be defined in an interlaced manner so that the REs except in a PRB-pair may be cyclically allocated for the eREG 0~15 in a frequency first manner. When 16 eREGs may be available per PRB-pair, 16×$N_{set}$ eREGs may be available for an ePDCCH resource set having $N_{set}$ PRB-pairs.

In an embodiment, eREG subset blocking may be used so that a subset of eREGs in an ePDCCH resource set may be blocked and not used to form an eCCE. This may enable improved or better inter-cell interference coordination, since non-overlapped eREGs may be used between neighbor cells.

For the eREG subset blocking, a subset of eREGs among 16×$N_{set}$ may be indicated via higher layer signalling and the subset may not be counted as an eREG. Therefore, physical eREGs and virtual eREGs may be defined. The virtual eREGs may be used to form an eCCE. Therefore, the number of physical eREGs may be equal to or smaller than that of virtual eREGs. The subset of eREGs may be predefined as a form of eCCE, PRB-pair, and/or ePDCCH resource set. Thus, the indication may be based on the eCCE number, PRB-pair number, and/or ePDCCH resource set number. The subset of eREGs may be predefined as a table so that an index may correspond to a subset of eREGs. A bitmap may be used to indicate the subset of eREG which may be blocked.

The subset of eREGs for blocking may be defined as a function of one or more system parameters such as PCI, SFN number, and/or subframe number. In this embodiment, two or more subsets of eREGs may be predefined with indexes and/or the index of each subset may be configured as a function of at least one of system parameters. For example, four subsets may be defined with modulo $J_{sub}$ for the eREG #n so that $J_{sub}$ subsets may be defined. If $J_{sub}=4$, the subsets may be defined as: index-0: subset( )={eREGs satisfying that n mod 4=0}; index-1: subset1={eREGs satisfying that n mod 4=1}; index-2: subset2={eREGs satisfying that n mod 4=2}; and/or index-3: subset3={eREGs satisfying that n mod 4=3}. When the subset of eREGs for blocking may be defined as a function of one or more system parameters, the subset index may be implicitly indicated by at least one of the system parameters. For example, the subset index may be defined by modulo operation of cell-ID (e.g., index-i where i may be defined as Cell-ID mod 4).

The starting symbol of the ePDCCH may be configured as follows (e.g., according to or based on the ePDCCH search spaces). For example, in an embodiment, the starting symbol of the WTRU or UE-specific search space may be configured or defined according to the associated common search space. The associated common search space may imply the common search space monitored in a subframe together with the WTRU or UE-specific search space from a WTRU or UE. Additionally, there may be different types (e.g., two types) of associated common search spaces including, for example, a PDCCH common search space and an ePDCCH common search space.

According to an example embodiment, if a PDCCH common search space may be monitored in a subframe with ePDCCH WTRU or UE-specific search space, one or more of the following may apply and/or may be used or provided. The ePDCCH WTRU or UE-specific search space starting symbol may be configured according to the transmission mode configured for a WTRU or UE. For example, if a WTRU or UE may be configured with a legacy transmission mode (e.g., TM 1~9), the WTRU or UE may follow or use the CIF in PCFICH to figure out or determine the starting symbol for ePDCCH regardless of the DCI format. If the configured transmission mode may be a different transmission mode (e.g., TM-10 (a CoMP transmission mode)), a WTRU or UE may be informed and/or may receive via higher layer the ePDCCH starting symbol regardless of the DCI format. In an embodiment, the ePDCCH starting symbol may be dependent on the DCI format such that if DCI format 2D may be used, the WTRU or UE may follow or use the higher layer configured ePDCCH starting symbol, otherwise the WTRU or UE may follow or use the CIF in PCFICH.

Additionally, according to an example embodiment, if an ePDCCH common search space may be monitored in a subframe with an ePDCCH WTRU or UE-specific search space, one or more of following may apply and/or may be provided and/or used. For example, the ePDCCH WTRU or UE-specific search space starting symbol may be the same as the starting symbol for the ePDCCH common search space. Furthermore, the ePDCCH WTRU or UE-specific search space starting symbol may be configured as a function of CFI value in PCFICH and ePDCCH common search space starting symbol. The ePDCCH WTRU or UE-specific search space starting symbol may be independently configured via higher layer signalling irrespective of the ePDCCH common search space starting symbol. Additionally, in an embodiment, the ePDCCH WTRU or UE-specific search space starting symbol may be configured according to the transmission mode configured for a WTRU or UE. For example, based on the transmission mode and/or DCI format, a WTRU or UE may assume the same starting symbol of ePDCCH common search space or may follow or use the starting symbol value configured by higher layer signalling. In particular, according to an embodiment, if a WTRU or UE may be configured with a legacy transmission mode (e.g., TM1~9), the starting symbol for the WTRU or UE-specific search space may be the same as the starting symbol of the ePDCCH common search space in the subframe and if a WTRU or UE may be configured with another transmission mode (e.g., TM10 (a CoMP transmission mode)), the WTRU or UE may follow or use the starting symbol value configured via higher layer signalling.

The starting symbol of the ePDCCH common search space may further be configured or defined based on at least one of the following. According to an example embodiment, a WTRU or UE may implicitly detect the starting symbol of the ePDCCH common search space by decoding the PCFICH in each subframe. Additionally, a fixed starting symbol may be predefined by assuming that $N_{pdcch}$ OFDM symbols may be occupied for the legacy PDCCH. As such, the starting symbol for ePDCCH common search space may be $N_{pdcch}+1$. The number of OFDM symbols for PDCCH may also include $N_{pdcch}=0$. In a specific carrier type (e.g., a new carrier type in which CRS may not be transmitted in one or more subframes, for example, may not be transmitted in a subframe except for a subframe including PSS/SSS), a WTRU or UE may assume that the number of OFDM symbols for PDCCH may be $N_{pclech}=0$. In such an embodiment, the common search space starting symbol may be broadcasted in PBCH or SIB-x such that the starting symbol indicated in a broadcasting channel may be used for ePDCCH candidate demodulation in the ePDCCH common search space.

An enhanced control channel element (eCCE) may be described herein. Assuming for a given subframe i, an eCCE comprising a number of eREGs may be: $N_{eREGs}(i)$, and, for each eREG j, the number of available REs is $K_{REs}(i, j)$, the total number of available REs for one eCCE may be:

$$N_{eCCEs}(i) = \sum_{j=1}^{N_{eREGs}} K_{REs}(i, j).$$

A first category may be considered where the number of available REs for $j^{th}$ eREG (e.g., $K_{REs}(i, j)$) may vary due to some REs for other purposes such as reference signals, PDCCH, PSS/SSS, and the like and may result in changing the effective coding rate. One or more embodiments described herein may be used, for example, to keep a similar effective coding rate for a given DCI payload.

For example, the number of $N_{eREGs}$ may be fixed (e.g., $N_{eREGs}=4$) per eCCE, so that the starting point of eCCEs may be easily determined (e.g., the starting points of eCCEs may be the same). Since a fixed number of $N_{eREGs}$ per eCCE may be used, the available REs may be changed. To increase the coverage with the fixed $N_{eREGs}$ number per eCCE, one or more of the following may be used and/or applied. For example, transmission power per eCCE may be defined as a function of the available number of REs, where the reference number of REs per eCCE may be $N_{eCCE}$. For example, if $N_{eCCE}=36$ and the available number of REs may be $K_{RES}=18$ for a specific eCCE, the additional transmission power added from the original transmission power may be defined as $$P_{eCCE}[\text{dB}] = 10 \log_{10} \frac{N_{eCCE}}{K_{REs}}.$$

From predefined power boosting rules, a WTRU or UE may assume the power ratio between the reference signal and ePDCCH REs for its demodulation process. The fixed number of $N_{eREGs}$ may be separately defined according to the ePDCCH transmission type and/or search space type. For example, $N_{eREGs}=3$ may be used for localized transmission and $N_{eREGs}=4$ may be used for distributed transmission. A smaller $N_{eREGs}$ may be used for localized transmission since beamforming gain and/or frequency selective scheduling may be achieved for localized transmission. A distributed transmission may rely on frequency diversity gain with channel coding. A different value of $N_{eREGs}$ may be used for a common search space and WTRU or UE-specific search space. For example, $N_{eREGs}=6$ may be used for a common search space and N eREGs=4 may be used for a WTRU or UE-specific search space. The eCCE aggregation levels within ePDCCH search space may vary according to subframe, where the aggregation levels may be implicitly derived from the reference signal configuration for a specific subframe. The aggregation levels may be defined as a function of a positive integer number $N_{AL}$. For example, a search space for a WTRU or UE may be defined as $N_{AL}\cdot\{1, 2, 4, 8\}$. If $N_{AL}=2$ in a specific subframe, a WTRU or UE may need to monitor ePDCCH with the aggregation levels 2, e.g. $\{1, 2, 4, 8\}=\{2, 4, 8, 16\}$. $N_{AL}$ may be configured by a higher layer according to a subframe or defined implicitly according to the configuration of the subframe including reference signal, broadcast channels, and/or synchronization signals. $N_{AL}$ may be signalled in the legacy PDCCH (e.g., if it may be configured) or unused DCI bits carried on ePDCCH.

A variable number of $N_{eREGs}$ per eCCE may be used, for example, to keep a similar effective coding rate. Since the ePDCCH decoding candidate may be based on the eCCE level, the available number of REs for an eCCE may be changed if a different number of $N_{eREGs}$ may be mapped. If a larger number of $N_{eREGs}$ may be mapped per eCCE, the effective coding rate may be lower so that channel coding gain may be increased as a result. That is, a larger number of $N_{eREGs}$ may be mapped if the available number of REs gets smaller per eCCE in a specific subframe due to the puncturing of ePDCCH REs. The variable number of $N_{eREGs}$ may be defined as described herein. For example, $N_{eREGs}$ may be configured by an eNB and may be informed to a WTRU or UE via a broadcasting channel(s) and/or higher layer signal(s). $N_{eREGs}$ may be configured independently per subframe with a duty cycle. For example, 10 ms and 40 ms duty cycles may be used. Two or more number of $N_{eREGs}$ may be defined and one of them may be selected according to the CSI-RS and ZP-CSI-RS configuration. In an example, $N_{eREGs}^0$ and $N_{eREGs}^1$ may be predefined and one of them may be selected in the following manner: $N_{eREGs}^0$ may be used if no CSI-RS and ZP-CSI-RS may be configured; and $N_{eREGs}^1$ may be used if CSI-RS and/or ZP-CSI-RS may be configured.

Since the number of REs for eREGs may be variable, the number of REs for eCCE could be also variable. An eCCE may be defined differently according to ePDCCH transmission mode (i.e., distributed transmission and localized transmission). For example, $N_{eREGs}=4$ may be used for localized transmission and $N_{eREGs}=2$ may be used for distributed transmission. In an embodiment, the $N_{eREGs}$ may be configurable by eNB via broadcasting (MIB or SIB-x) and/or higher layer signalling.

In another embodiment, the $N_{eREGs}$ may be different according to the subframe as described herein. The $N_{eREGs}$ value may be changed if a subframe includes CSI-RS and/or zero-power CSI-RS. For example, $N_{eREGs}=4$ may be used in the subframe not including CSI-RS and/or zero-power CSI-RS and $N_{eREGs}=6$ may be used in the subframe including CSI-RS and/or zero-power CSI-RS. The $N_{eREGs}$ value may be different according to the reference signal overhead including zero-power CSI-RS such that the $N_{eREGs}$ value may become larger if reference signal overhead goes higher. For example, $N_{eREGs}=4$, if reference signal overhead may be less than 15% within PDSCH region in a subframe; $N_{eREGs}=5$, if reference signal overhead may be between 15% and 20% within PDSCH region in a subframe; $N_{eREGs}=6$, if reference signal overhead may be between 20% and 30% within PDSCH region in a subframe; $N_{eREGs}=5$, if reference signal overhead may be larger than 30% within PDSCH region in a subframe, the reference signal overhead may be defined as "number of PDSCH REs/number of reference signals," and the like. In an embodiment, the eREG and eCCE may be the same in a specific ePDCCH transmission mode such as localized transmission of ePDCCH.

Another category may be considered where the number of $N_{eREGs}(i)$ may be fixed per eCCE, for example, so that the starting point of eCCEs may be the same. To maintain an effective coding rate for a DCI payload, the number of available REs for a jth eREG (e.g., $K_{RES}(i,j)$) may be fixed for each eREG by transmitting ePDCCH on those REs for other purposes such as reference signals, PDCCH, and/or PSS/SSS, and applying special pre-coding or mutual orthogonal patterns to both ePDCCH and non-ePDCCH. At the receiver side after de-precoding by the WTRU or UE, ePDCCH may be separated and the similar effective coding rate for a given DCI payload may be maintained.

When assuming the number of $N_{eREGs}(i)$ may vary per eCCE, to maintain the similar effective coding rate for a given DCI payload, instead of making the number of available REs for $j^{th}$ eREG (e.g., $K_{RES}(i,j)$) to be fixed for part of eREGs, e.g., as described above, at the receiver side (e.g., after de-precoding by the WTRU or UE) ePDCCH may be separated and the similar effective coding rate for a DCI payload may be maintained. The number of eREGs used to for transmitting ePDCCH and non-ePDCCH may adapt so that $$N_{eCCEs}(i) = \sum_{j=1}^{N_{eREGs}(i)} K_{RES}(i, j)$$

may be kept for each CCE.

Additionally, eCCE definition may be different according to ePDCCH search spaces. In such an embodiment, the eCCE may be defined respectively for the WTRU or UE-specific search space and the common search space in following manner. For example, an eCCE definition for a WTRU or UE-specific search space may satisfy one or more of following properties. 16 eREGs may be defined per PRB-pair irrespective of the CP-length and subframe type. 4 or 8 eREGs may be grouped to form an eCCE according to the CP-length and subframe type. 4 eREGs may be grouped to form an eCCE for a normal CP with a normal subframe and/or a normal CP with special subframe configurations {3, 4, 8}. In an embodiment, 8 eREGs may be grouped to form an eCCE in for a normal CP with special subframe configurations {2, 6, 7, 9}, an extended CP with normal subframe, and/or an extended CP with special subframe configurations {1, 2, 3, 5, 6}. Furthermore, 4 or 8 eREGs may be grouped to form an eCCE according to the CP-length, subframe type and/or common search space type. For example, in such an embodiment, if a WTRU or UE may monitor a PDCCH common search space in a subframe, the number of eREGs per eCCE for a WTRU or UE-specific search space may be 8 while the number of eREGs per eCCE for a WTRU or UE specific search space may be 4 if an ePDCCH common search space may be monitored together with ePDCCH WTRU or UE-specific search space.

Additionally, an eCCE definition for common search space may satisfy one or more of following properties. In an embodiment, 16 eREGs may be defined per PRB-pair irrespective of the CP-length and subframe type. 4 or 8 eREGs may also be grouped as the same the WTRU or UE-specific search space. Furthermore, 4 or 8 eREGs may be grouped to form an eCCE according to the number of available REs (e.g., $n_{ePDCCH}$). In such an embodiment, the number of available REs may be counted in each subframe within a PRB-pair that may not include PSS/SSS and/or PBCH. Additionally, if $n_{ePPCCH}$ may be smaller than a threshold predefined (e.g., 104), 8 eREGs may be grouped to form an eCCE, otherwise 4 eREGs may be used and/or grouped together.

Resource mapping may be provided, which may include eREG-to-eCCE mapping. For example, an eCCE may be formed with one or more eREGs and the group of eREGs may be differently formed according to the ePDCCH transmission modes (e.g., ePDCCH Mode-1 and ePDCCH Mode-2).

Figure 20:
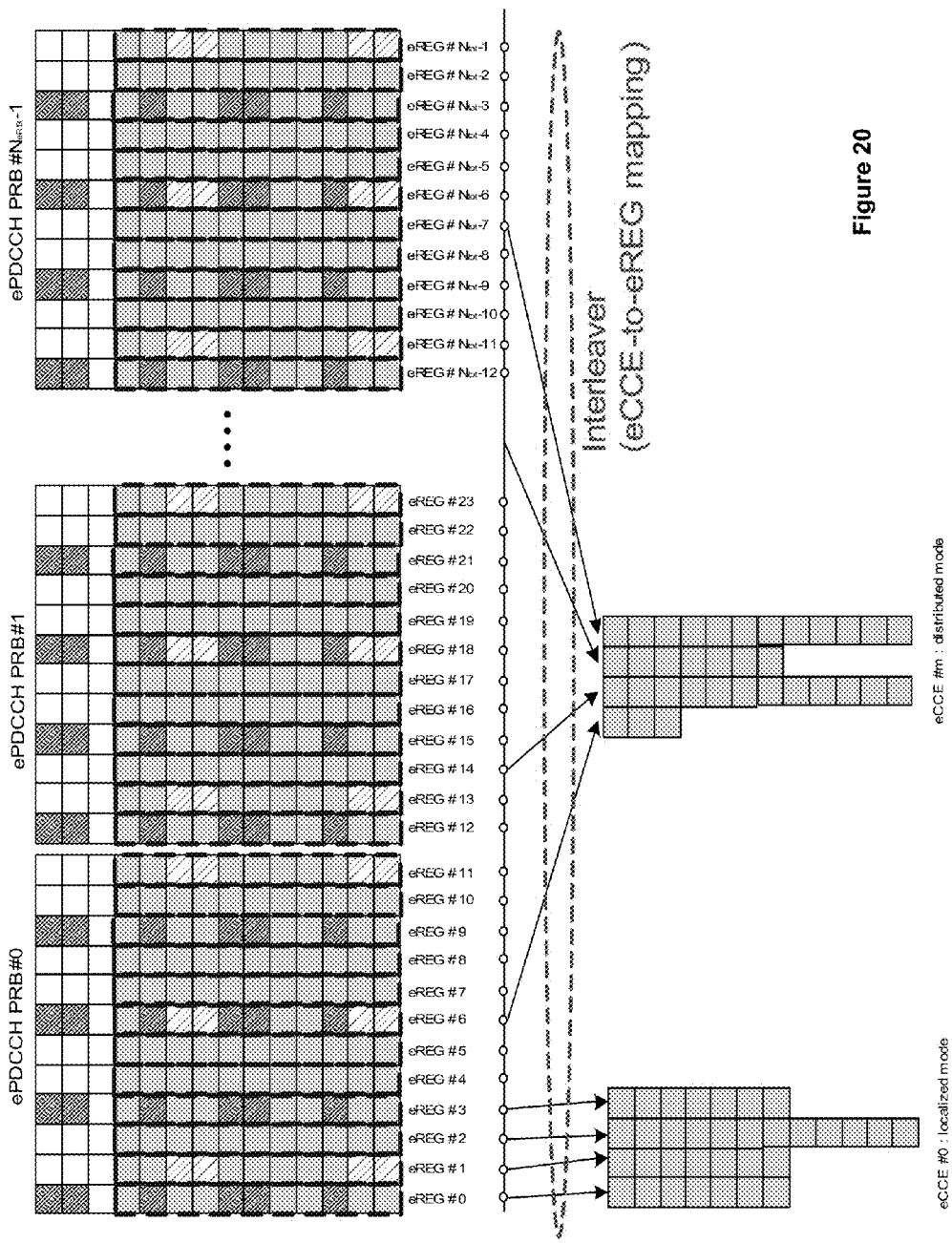
FIG. 20 illustrates an example embodiment of an eCCE-to-EREG mapping in ePDCCH based on localized and/or distributed allocation.

FIG. 20 illustrates an example embodiment of eCCE-to-eREG mapping in ePDCCH according to localized and distributed allocation (e.g., if port-7 and port-8 may be used). For example, the eREG may be defined as shown in FIG. 20 where N=1 and M=14-$N_{PDCCH}$ may be used. The eREG number may also be defined as at least one of following: increasing order from lowest frequency within ePDCCH PRBs (0~$N_{tot}(k)-1$), where $N_{tot}(k)$ may denote the number of eREGs in a subframe k and $N_{tot}=N_{eRB} \times M_{REG}$ and the $M_{REG}$ may denote the number eREGs in a PRB-pair and $M_{REG}$=12 as shown in FIG. 20; decreasing order from lowest frequency within ePDCCH PRBs (0~$N_{tot}$(k)−1); random number generation within (0~$N_{tot}$(k)−1) and virtual eREG and physical eREG mapping may be defined; eREG number may be (f, r) where f and r may denote subcarrier index within a PRB-pair and ePDCCH PRB number respectively, the eREG #13 may be expressed as eREG (1, 1), the range off may be 0~11, or may be 0~$N_{eRB}$−1, and eREG #=r·12+f.

For eCCE-to-eREG mapping in shared PRB, at least one of the following methods (e.g., contiguous allocation (Mapping-1), interleaved allocation (Mapping-2), hybrid allocation (Mapping-3), and/or the like) may be used. In contiguous allocation (Mapping-1), $N_{eREGs}$ contiguous eREGs may be aggregated for eCCE definition, therefore the eCCE numbers may be allocated as eCCE #n=eREGs#{n·$N_{eREGs}$, . . . , (n+1)·$N_{eREGs}$−1}. For example, if $N_{eREGs}$=4 and n=0, the eCCE #0=eREGs#{0,1,2,3}. In such an embodiment, the total number of eCCEs ($M_{eCCE}$) may be defined as $$M_{eCCE} = \left\lfloor \frac{N_{tot}}{N_{eREGs}} \right\rfloor.$$

Figure 21:
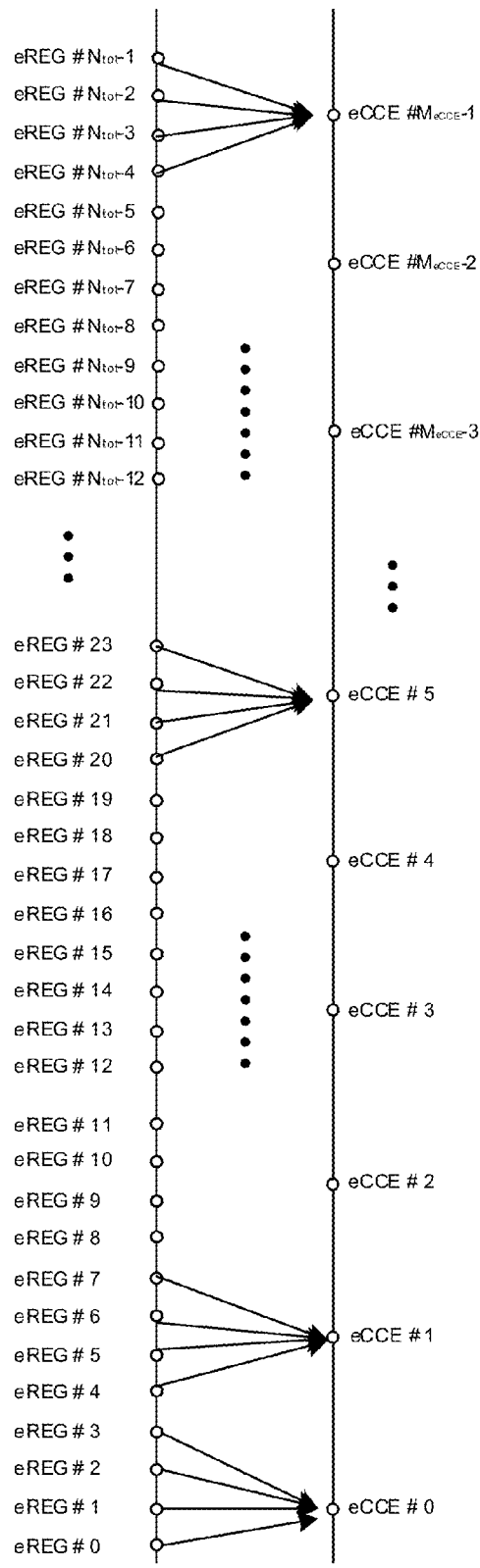
FIG. 21 illustrates an example embodiment of an eCCE-to-eREG mapping with contiguous allocation.

FIG. 21 shows such an example (e.g., FIG. 21 illustrates an example embodiment of eCCE-to-eREG mapping with contiguous allocation).

In an interleaved allocation (e.g., Mapping-2), $N_{eREGs}$ interleaved eREGs may be aggregated for eCCE definition, therefore the eCCE numbers may be allocated as eCCE #n=eREGs#{π(n·$N_{eREGs}$), . . . , π((n+1)·$N_{eREGs}$−1)} where π(·) denotes interleaved sequence from 0 to $M_{eCCE}$−1. The interleaved sequence π(·) may be generated by $N_{eREGs}$× $M_{eCCE}$ block interleaver. If $N_{eREGs}$=4 and $M_{eccE}$=9, 4×9 block interleaver may be defined as shown in the FIG. 22 (e.g., FIG. 22 illustrates an example of a block interleaver). In the block interleaver, the interleaved sequence may be generated by writing a sequence in row first and read in column first. As such, the interleaved sequence from block interleaver illustrated in FIG. 22 may be π=0, 9, 18, 27, 1, 10, 19, 28, . . . , 8, 17, 26, 35, which may be expressed as $$\pi(n) = (n \cdot M_{eCCE}) \bmod N_{tot} + \left\lfloor \frac{n \cdot M_{eCCE}}{N_{tot}} \right\rfloor, n = 0, \ldots, N_{tot} - 1.$$

The interleaved sequence π(·) may be generated by length-$N_{tot}$ random sequence where the random sequence may be predefined and both WTRU or UE and eNB may know the sequence. A column permutation may be used, e.g., in order to further randomize the permutation sequence.

Figure 23:
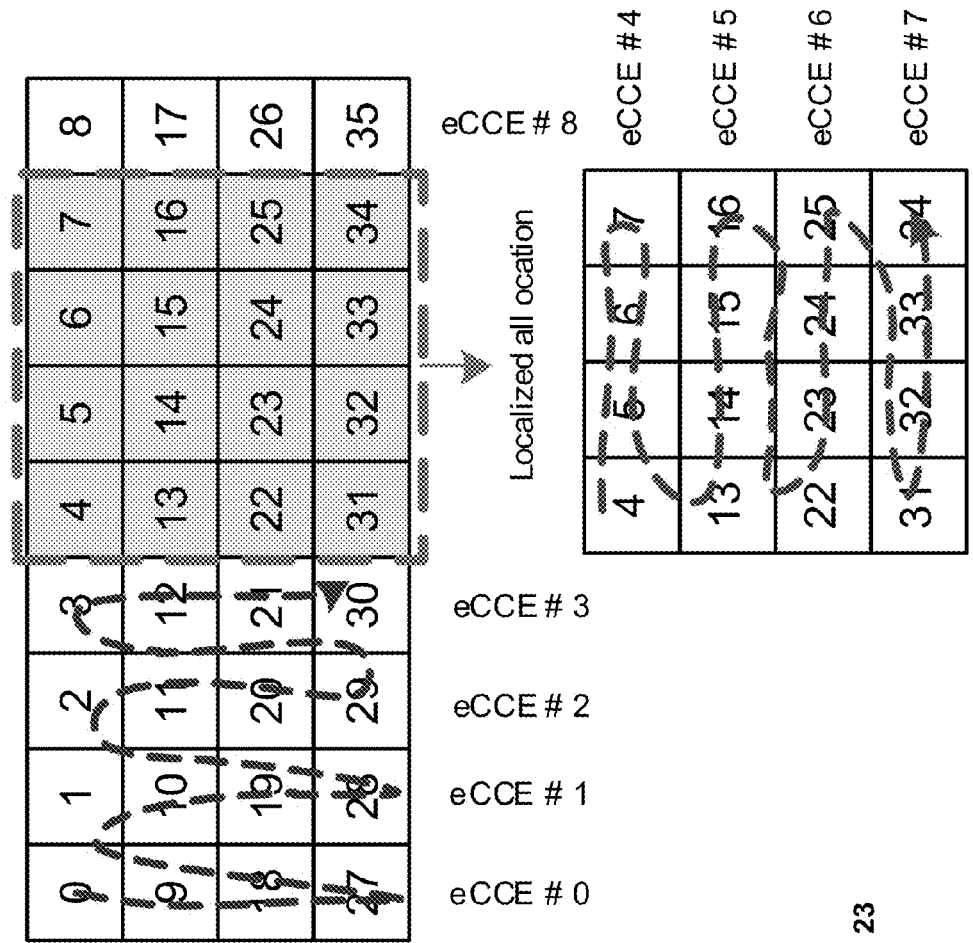
FIG. 23 illustrates an example embodiment of a hybrid allocation by using a block interleaver.
Figure 24:
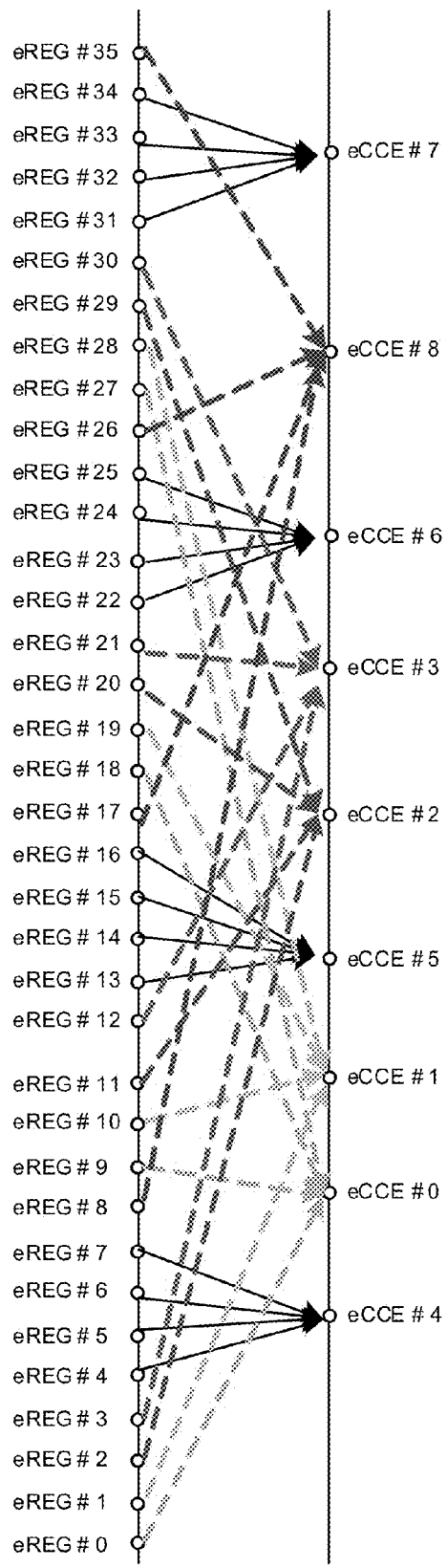
FIG. 24 illustrates an example embodiment of a co-existence of localized and/or distributed eCCEs.

In hybrid allocation (Mapping-3), a subset of contiguous sequences may be reserved for localized transmission and the other eREGs may be used for distributed allocation. For example, a subset of columns in a block interleaver may be reserved for localized transmission, as shown in FIG. 23 (e.g., FIG. 23 illustrates hybrid allocation by using block interleaver), where eCCE#{4, 5, 6, 7} may be used for localized transmission and the other eCCEs may be distributed allocation. To generate localized eCCEs, $N_{eREGs}$ contiguous eCCEs may be used. From this operation, $N_{eREGs}$ contiguous distributed allocation based eCCEs may become localized $N_{eREGs}$ eCCEs. To generate both localized and distributed eCCEs, an eNB may define $M_{eCCE}$ distributed eCCEs, and reserve $N_{eREGs}$ contiguous or closed eCCEs for localized eCCEs. A column permutation may be used for distributed allocation part to further randomize the permutation sequence. From the hybrid allocation shown in FIG. 23, the eCCEs may be defined as shown in FIG. 24. FIG. 24 illustrates an example embodiment of a co-existence of localized and distributed eCCEs.

For eCCE-to-eREG mapping in separate PRB, eREGs may be independently defined for localized and distributed transmissions. For example, LeREGs (localized eREGs) may be defined from 0~N−1, DeREGs (distributed eREGs) may be defined from 0~K−1, and for LeREGs, contiguous allocation (e.g., Mapping-1) may be used and/or interleaved allocation (e.g., Mapping-2) may be used for DeREGs. For eCCE-to-eREG mapping in separate PRB, eREG may be defined for the limited case of distributed transmission and eCCE may become a minimum resource unit for localized transmission.

The eCCE-to-eREG configuration may be at least one of following: the eCCE allocation (e.g., Mapping-1, Mapping-2, or Mapping-3) may be predefined, the mapping method may be different according to the subframe index and/or SFN, the mapping method may be configurable by higher layer signalling, the mapping method may be different according to the ePDCCH PRB-pairs, and/or the like. According to an example embodiment, if $N_{eRB}$ may be available for ePDCCH transmission, a subset of $N_{eRB}$ may use the Mapping-1 and other ePDCCH PRB-pairs (e.g., the rest of ePDCCH PRB-pairs) may use the Mapping-2. In this embodiment, $N_{eRB}$ may be separately defined for each mapping method.

If 16 eREGs may be available per PRB-pair and one eCCE may be defined by grouping of four eREGs, 4 eCCEs may be defined per PRB-pair for ePDCCH localized transmission since the eCCE may be defined within a PRB-pair for localized transmission. In an embodiment, among 16 eREGs, consecutive 4 eREGs may be grouped to form a localized eCCE. The eCCE-to-eREG mapping rule may be the same in each PRB-pair configured as ePDCCH resource. The consecutive 4 eREGs within a PRB pair with the same starting points irrespective of the cell may be used. For example, the eREG-to-eCCE mapping rule may be the following for each cell: eCCE(n)={eREG(k), eREG(k+1), eREG(k+2), eREG(k+3)}; eCCE(n+1)={eREG(k+4), eREG (k+5), eREG(k+6), eREG(k+7)}; eCCE(n+2)={eREG(k+8), eREG(k+9), eREG(k+10), eREG(k+11)}; and/or eCCE(n+ 3)={eREG(k+12), eREG(k+13), eREG(k+14), eREG(k+ 15)}. The consecutive 4 eREGs within a PRB pair with different starting points may be used. The starting point of the eREG may be defined as a configuration via higher layer signaling or a function of at least one of the system parameters such as physical cell ID and subframe/SFN number. In the following example, the offset may be configured via higher layer signaling or defined as a function of at least one of the system parameters. In an example, eCCE(n)={eREG ((k+i+offset)mod 16), i=0, 1, 2, 3}; eCCE(n+1)={eREG((k+ 4+i+offset)mod 16), i=0, 1, 2, 3}; eCCE(n+2)={eREG((k+ 8+i+offset)mod 16), i=0, 1, 2, 3}; and/or eCCE(n+3)= {eREG((k+12+i+offset)mod 16), i=0, 1, 2, 3}.

Additionally, in an embodiment, among 16 eREGs, mutually exclusive 4 eREGs may be grouped to form an eCCE so that 4 eCCEs may be defined per PRB-pair and each eCCE may include mutually exclusive 4 eREGs. The mutually exclusive 4 eREGs may be selected by using one or more embodiments described herein to form an eCCE. For example, an interleaved mapping may be used for eREG-to-eCCE mapping. eREG-to-eCCE mapping may be based on block interleaver (e.g., interlaced mapping). The followings may be examples of the eREG-to-eCCE mapping: eCCE(n)={eREG(k), eREG(k+4), eREG(k+8), eREG(k+12)1; eCCE(n+1)=feREG(k+1), eREG(k+5), eREG(k+9), eREG(k+13)}; eCCE(n+2)={eREG(k+2), eREG(k+6), eREG(k+10), eREG(k+14)}; and/or eCCE(n+3)={eREG(k+3), eREG(k+7), eREG(k+11), eREG(k+15)}. An interleaved mapping may be used for eREG-to-eCCE mapping based on random interleaver. The interleaved sequence may be predefined or configured via higher layer signaling. If the interleaved sequence per eCCE in a PRB-pair may be defined as $\pi_1=\{0,4,8,12\}$, $\pi_2=\{1,5,9,13\}$, $\pi_3=\{2,6,10,14\}$, and $\pi_4=\{3,7,11,15\}$, where $\pi_j$, $_{j=}0, 1, 2, 3$ may be used to form eCCE (n+j), eCCE(n+j)={eREG(k+$\pi_j$(1)), eREG(k+$\pi_j$(2)), eREG(k+$\pi_j$(3)), eREG(k+$\pi_j$(4))}. The interleaved sequence may be defined as a function of at least one of system parameters, including a physical cell ID, a subframe, and/or an SFN number.

Figure 25:
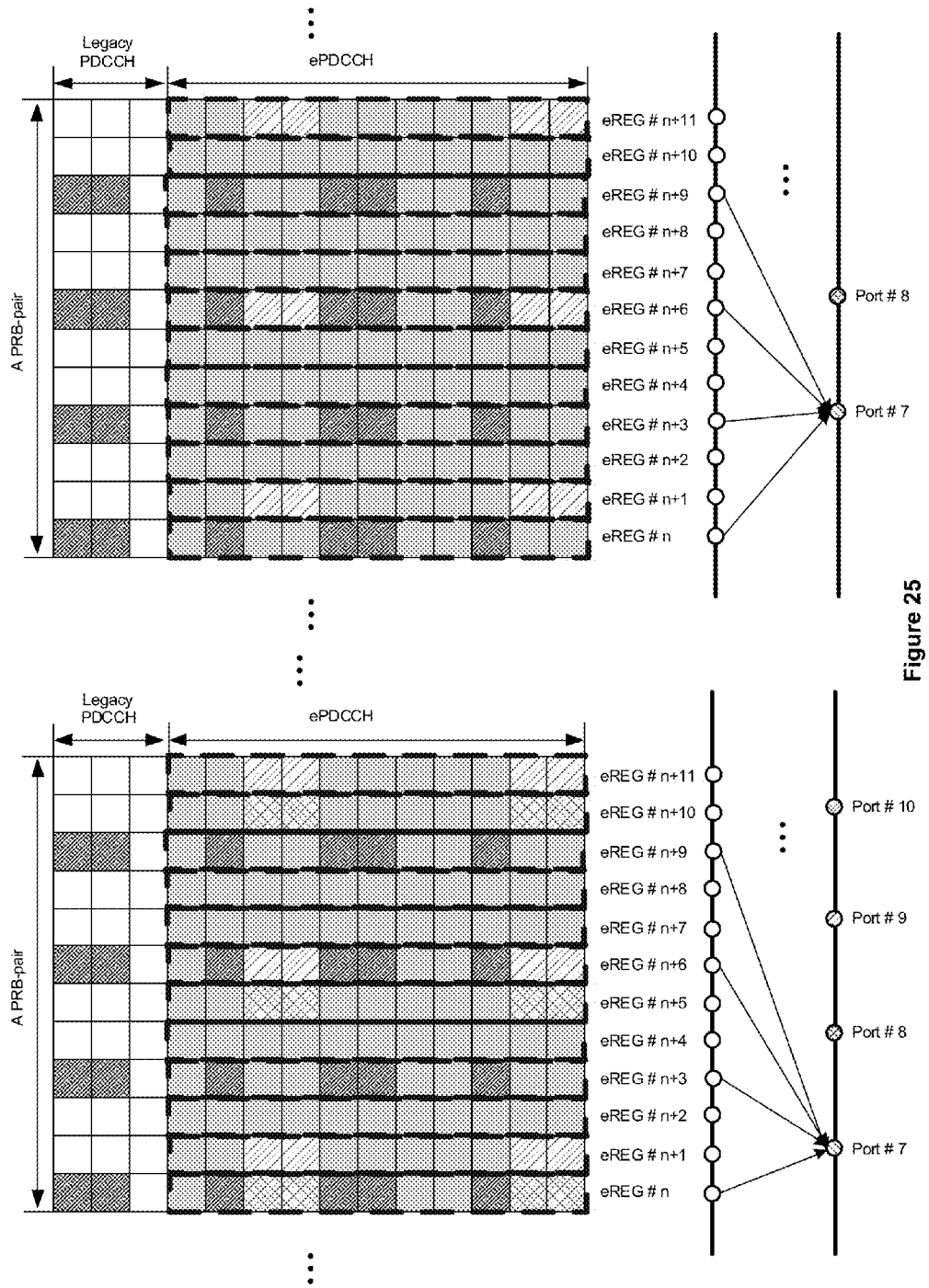
FIG. 25 illustrates an example embodiment of an antenna port mapping for eREG and eCCE.

Antenna port mapping may also be provided and/or used. For example, the antenna ports {7, 8, 9, 10} or a subset of them may be used for ePDCCH transmission and the antenna ports {107, 108, 109, 110} may be used interchangeably with the antenna ports {7, 8, 9, 10} as the time and/or frequency location with orthogonal cover code may be the same. In an embodiment, since the antenna ports 7-10 may be used for eREG and/or eCCE demodulation, the antenna port mapping may be defined according to the eREG/eCCE locations. FIG. 25 illustrates an example embodiment of antenna port mapping for eREG/eCCE. As shown in FIG. 25, the eREG/eCCE may be mapped onto antenna ports. FIG. 25 also shows that the number of antenna ports available may be different according to the configuration.

The available number of antenna ports ($N_{port}$) may be defined as described herein. The $N_{port}$ may be semi-statically configured for the subframes and the ePDCCH PRB-pairs. Therefore, a WTRU or UE may assume that ePDCCH may not be transmitted in the RE position for the antenna ports within $N_{port}$. For example, if $N_{port}=4$, 24 RE positions in a PRB-pair in FIG. 25 may be reserved and ePDCCH may not be transmitted in those RE positions. If $N_{port}=2$ then 12 RE positions may be reserved and ePDCCH may be transmitted in the RE positions for Port-9 and Port-10. The $N_{port}$ may be predefined as four so that a WTRU or UE may assume that ePDCCH may not be transmitted in the RE positions for four antenna ports. The $N_{port}$ may be different according to the ePDCCH PRB-pair number. For example, $N_{port}=2$ may be used in the ePDCCH PRB #0 and $N_{port}=4$ may be used in the ePDCCH PRB #1. The $N_{port}$ may be configured differently according to the ePDCCH PRB-pair with ePDCCH transmission mode. If ePDCCH PRB #{0, 1, 2} may be used for localized transmission, the $N_{port}=4$ may be used for those ePDCCH PRBs and $N_{port}=2$ may be used for the ePDCCH PRBs for distributed transmission or vice versa. The $N_{port}$ may also be separately configurable for each ePDCCH PRB-pair and/or ePDCCH transmission mode.

Additionally, an antenna port may be allocated for eREG/eCCE based on or according to at least one of following. A WTRU or UE may assume that an eREGs/eCCE associated with the WTRU or UE in a "same PRB-pair" may be transmitted on the same antenna port. For example, if eREGs/eCCEs #{n, n+1, n+2, n+3} may be used for a WTRU or UE, the WTRU or UE may assume that the eREGs may be transmitted in one antenna port (e.g., Port-7). The antenna port may be semi-statically configured via higher layer signalling. In such an embodiment, the antenna port may be the same for the WTRU or UE across each of the ePDCCH PRB-pairs. The antenna port may be defined as the lowest eREG/eCCE index in the same PRB-pair. For example, if eREGs/eCCEs #{n, n+3, n+6, n+9} may be used for a WTRU or UE, the antenna port for eREG/eCCE #{n} may be used for other eREGs/eCCEs. The antenna port may be defined as a function of C-RNTI. For example, modulo-4 or 2 of the C-RNTI may indicate the allocated antenna port for the WTRU or UE. The antenna port may be the same for the WTRU or UE across the ePDCCH PRB-pairs in such an embodiment. If the modulo-4 operation may be used, a WTRU or UE may assume that one of the antenna ports 7~10 may be used for the WTRU or UE, otherwise one of the antenna ports 7~8 may be used. The antenna port may be defined as a function of C-RNTI with a CDM group and the CDM group may be configured by higher layer. For example, a WTRU or UE may be configured by higher layer to monitor ePDCCH within a CDM group 2 in which Port-9 and Port-10 may be available and the C-RNTI for the WTRU or UE may indicate to use Port-9 after modulo-2 operation. As such, the C-RNTI may indicate which orthogonal cover code may be used between [+1 +1] and [+1 −1] within a CDM group and an eNB may choose a CDM group. The antenna port may be defined as a function of C-RNTI and PRB-pair index. For example, modulo 4 or 2 of (C-RNTI+PRB index) may indicate the allocated antenna port for the WTRU or UE.

A WTRU or UE may assume that eREGs/eCCEs associated with the WTRU or UE in a "precoding resource granularity (PRG)" may be transmitted on the same antenna port. For example, if a WTRU or UE demodulates multiple eREGs in a PRG the WTRU or UE may assume that the same antenna port may be used for the eREGs in the PRG. The WTRU or UE may assume that the same precoder may be used for the antenna port within PRG. The PRG size may be different according to the system bandwidth. Table 12 shows an example embodiment of the PRG size for ePDCCH.

TABLE 12

| PRG size for ePDCCH | |
|---|---|
| System Bandwidth ($N_{RB}^{DL}$) | PRG size (P') |
| ≤10 | 1 |
| 11-26 | 2 |
| 27-63 | 3 |
| 64-110 | 2 |

The PRB size may be 1 for system bandwidth candidate and a WTRU or UE may assume that each of the antenna ports in the PRB size use the same precoder, for example, such that the channels across antenna ports may be interpolated. For example, if antenna ports 7 and 9 within a PRG size may be used for ePDCCH demodulation at a WTRU or UE receiver, the WTRU or UE may assume that antenna ports 7 and 9 may be transmitted in the same virtual antenna port so that the estimated channels from port 7 and 9 may be interpolated. The antenna port may be defined as a lowest eREG/eCCE index within a PRG. For example, if eREGs/eCCEs #{n, n+8, n+16, n+24} may be used for a WTRU or UE, the antenna port for eREG/eCCE #{n} may be used for other eREGs/eCCEs. The antenna port may further be defined as a function of C-RNTI. For example, modulo 4 or 2 of the C-RNTI may indicate the allocated antenna port for the WTRU or UE. In an embodiment, the antenna port may be the same for the WTRU or UE across ePDCCH PRB-pairs in this case as well. Additionally, the antenna port may be defined as a function of C-RNTI and PRG index. For example, modulo 4 or 2 of (C-RNTI+PRG index) may indicate the allocated antenna port for the WTRU or UE.

A WTRU or UE may also assume that eREGs/eCCEs associated with the WTRU or UE in a same PRB-pair may be transmitted on different antenna ports and the antenna ports for each eREG/eCCE may be defined based on or according to at least one of following methods herein. For example, an eREG/eCCE location may be one-to-one mapped onto an antenna port according to the available number of antenna ports. If four antenna ports may be available in the PRB-pair, the eREGs #{n, n+1, n+2} may be mapped onto Port-7, eREGs #{n+3, n+4, n+5} may be mapped onto Port-8, eREGs #{n+6, n+7, n+8} may be mapped onto Port-9, and the rest may be mapped on to Port-10. If two ports may be available, eREGs #{n, n+1, n+2, . . . , n+5} may be mapped on to Port-7 and the other eREGs may be mapped on to Port-8. The associated antenna port number may be defined according to the eREG/eCCE location and aggregation level for a WTRU or UE. For example, eREGs #{n, n+1, n+2} may be mapped onto Port-7 and eREGs #{n+3, n+4, n+5} may be mapped onto Port-8 if three REGs may be demodulated together. If eREGs #{n, n+1, n+2, n+3, n+4, n+5} may be demodulated together, the Port-7 may be used and Port-8 may not be the antenna port for eREGs {n+3, n+4, n+5} (e.g., anymore). An eREG/eCCE location may be one-to-one mapped onto an antenna port according to the available number of antenna ports. The association rule between eREG/eCCE and antenna ports may be configured by an eNB. For example, if four antenna ports may be available in the PRB-pair, the eREGs/eCCE #{n, n+1, n+2} may be mapped onto Port-7, and eREGs/eCCE #{n+3, n+4, n+5} may be mapped onto Port-8 for a WTRU or UE. For another WTRU or UE, the eREG/eCCE #{n, n+1, n+2} may be mapped onto Port-8, and eREG/eCCE #{n+3, n+4, n+6} may be mapped onto Port-7.

The association rule may be configured according to at least one of following embodiments. For example, an eNB may configure the association rule via WTRU or UE-specific higher layer signaling. The association rule may be configured as a function of RNTI (e.g., C-RNTI) so that a WTRU or UE may implicitly obtain the association rule. In such a case, there may be a different association rule according to RNTI type, e.g., even for a single WTRU or UE. In an example, a DCI associated with a C-RNTI may use association rule 1 and another DCI associated with an SPS-RNTI may use association rule 2. A modulo operation may be used to define an association rule such that the number of an association rule (e.g., n_association) may be used for a modulo operation as a function of RNTI. The association rule for a DCI associated with a specific RNTI may be defined as association rule number=(RNTI) modulo n_association. The association rule may be configured as a function of RNTI in combination with other parameters, which may include one or more of a Cell-ID, subframe number, and/or SFN. The association rule may also be fixed for a common search space and configurable for a WTRU or UE-specific search space.

In an embodiment, a WTRU or UE may assume that a single antenna port configured via higher layer signaling may be associated with each eREG/eCCE in localized transmission. A predefined one-to-one mapping between eREG/eCCE to antenna port may be used for distributed transmission.

Resource element (RE) mapping (e.g., puncturing and/or rate-matching) may be provided and/or used as described herein. For example, modulated symbols of a DCI after channel coding may be mapped onto ePDCCH REs. Since the ePDCCH REs may be located in an RE location, the mapping rule may be defined in a coding chain perspective. In a coding chain aspect, RE mapping rules may include puncturing and/or rate-matching, as disclosed herein. Puncturing and/or rate-matching may be provided as follows.

Coded bits $(c_1, \ldots, c_N)$ may be an output of a channel encoder with a DCI payload as an input, where the channel encoder may be a channel code, such as a turbo code, convolutional code, reed-muller code, etc. The coded bits may include a CRC attachment, for example, 16 bits masked with RNTI. Modulated symbols $(x_1, \ldots, x_M)$ may be an output of a mapper such that the coded bits may be modulated to a modulation scheme such as BPSK, QPSK, 16QAM, 64QAM, and the like. According to the modulation scheme, the modulated symbol sequence M may be equal to or smaller than N. In RE mapping, the modulated symbols $x_1, \ldots, x_M$ may be mapped to ePDCCH REs, for example, in a frequency first or time first manner where puncturing may imply or may provide that if a RE in ePDCCH may be occupied for another signal, the modulated symbol for the RE may not be transmitted. For example, if $x_k$, k≤M may be mapped on a specific ePDCCH RE according to the mapping rule and the ePDCCH RE may be occupied for another purpose, $x_k$ may not be transmitted and the next mapping may be started from $x_{k+1}$. Rate-matching may imply or may provide that the next mapping to the available RE not used for another purpose may be started from $x_k$ in the same situation. As an example, if there may be six modulated symbols $\{x_1, x_2, x_3, x_4, x_5, x_6\}$ to be transmitted and the ePDCCH REs for $x_2$ and $x_4$ may be occupied for other purpose, $\{x_1, x_3, x_5, x_6\}$ may be transmitted if a puncturing scheme may be used and $\{x_1, x_2, x_3, x_4\}$ may be transmitted if rate-matching may be used.

Since the puncturing scheme may lose systematic bits if a convolutional and/or turbo code may be used, the decoding performance, in an embodiment, may be worse than a rate-matching scheme if coding rate may be high. Puncturing may provide robustness if the occupied REs information may not be synched between eNB and the WTRU or UE. Channel decoding may fail if occupied RE information may not be synched between eNB and WTRU or UE for a rate-matching scheme. The puncturing and rate-matching rules based on a purpose of occupied RE may be provided and/or used.

In an embodiment, the rate-matching scheme may be used for the REs occupied and configured in cell-specific or group-specific manner and the puncturing scheme may be used for the REs occupied and configured in WTRU or UE-specific manner. In an example for rate-matching, the REs may be occupied by PDCCH (or PDCCH region), CRS (cell-specific reference signal), ePDCCH DM-RS, PRS, PSS/SSS (primary synchronization signal/secondary synchronization signal), and/or PBCH. For puncturing, the REs may be occupied by CSI-RS, zero-power CSI-RS. In an example for rate-matching, the REs may be occupied by CRS, PRS, PSS/SSS, and/or PBCH. For puncturing, the REs may be occupied by ePDCCH DM-RS, CSI-RS, and/or zero-power CSI-RS.

The rate-matching and puncturing rules may be defined according to the search space. For example, common search space may use puncturing scheme and WTRU or UE-specific search space may use rate-matching scheme so that the common search space may become more robust to the error of occupied RE information, and vice-versa. In an example for rate-matching, each RE may be occupied by other signals in WTRU or UE-specific search space. For puncturing, each RE may be occupied by other signals in common search space. Additionally, in an example for rate-matching, each RE may be occupied by other signals in common search space. For puncturing, each RE may be occupied by other signals in WTRU or UE-specific search space.

According to an example embodiment, the rate-matching and puncturing rules may be defined according to the ePDCCH transmission scheme or technique such as localized and/or distributed transmission. For example, rate-matching may apply for each RE occupied by other signals in the eCCEs for localized transmission and puncturing may apply for each RE occupied by other signals in the eCCEs for distributed transmission, or vice-versa.

The rate-matching and puncturing rules may also be defined according to semi-static signals and dynamic signals. In an example for rate-matching, the REs may be occupied by fixed cell-specific signals including CRS, PSS/SSS, and/or PBCH. For puncturing, the REs may be occupied by semi-static or dynamic configuration including PDCCH, CSI-RS, DM-RS, and/or PRS. In an example for rate-matching, the REs may be occupied by semi-static or dynamic configuration including PDCCH, CSI-RS, DM-RS, and/or PRS. For puncturing, the REs may be occupied by fixed cell-specific signals including CRS, PSS/SSS, and/or PBCH.

In an embodiment, the rate-matching and puncturing rules may also be defined according to the ePDCCH search spaces. For example, the rate-matching and puncturing rules may be defined differently if the search space may be a WTRU or UE-specific search space or common search space (e.g., different rate-matching and/or puncturing rules may be applied for a WTRU or UE-specific search space than for a common search space). For the WTRU or UE-specific search space, the REs may be configured as ePDCCH WTRU or UE-specific search space resources where the REs that may collide with PDCCH, CSI-RS, zero-power CSI-RS, and DM-RS may be rate-matched around.

For the common search space, one or more of the followings may apply. For example (e.g., for the REs configured as ePDCCH common search space resources), the REs located in the CRS position may be rate-matched around. In such an embodiment, the number of CRS port may be fixed as four irrespective of the number of CRS port detected in PBCH. As such, a WTRU or UE may assume that the REs located in the CRS ports 0-3 may be rate-matched around when demodulating ePDCCH common search space. Additionally, in such an embodiment, a WTRU or UE may follow and/or use the number of CRS ports detected in PBCH for rate-matching of the REs located in the CRS ports.

Additionally, for the common search space where the REs may be configured as ePDCCH common search space resources, the REs located in the CSI-RS and zero-power CSI-RS may be punctured. As such, if a WTRU or UE may be configured with CSI-RS and/or zero-power CSI-RS, the REs in those locations may be punctured.

In an example embodiment, for the common search space and the PDCCH, if a WTRU or UE may monitor a PDCCH common search space together with an ePDCCH common search space, the WTRU or UE may rate-match around for the REs located in the PDCCH locations. Otherwise, the WTRU or UE may rate-match around for the REs located in the OFDM symbols below the ePDCCH common search space starting symbols.

According to an embodiment, a search space design may be provided and/or used as described herein. For example, a search space for a single DL carrier may be disclosed. A WTRU or UE may monitor ePDCCHs via blind decoding such that multiple blind decoding attempts may be used per subframe. The candidates for blind decoding attempts from a WTRU or UE point of view may be hereafter called a search space. At least one of two types of search space may be defined for ePDCCH, such as WTRU or UE-specific search space (USS) and common search space (CSS). The common search space in ePDCCH may carry DCIs related to a group of UEs and/or the UEs in a cell such as broadcasting/multi-casting, paging, group power control, etc. The WTRU or UE-specific search space may carry DCIs for unicast traffic for uplink and/or downlink.

From a WTRU or UE perspective, there may be at least two search spaces and the location for search spaces may be defined using at least one of following configurations. In a configuration (e.g., configuration 1), both USS and CSS may be provided or used in legacy PDCCH and a WTRU or UE may monitor USS and CSS. In such a configuration, a WTRU or UE may monitor USS and/or CSS in the legacy PDCCH region. This configuration may be the same as, or similar to, the Release 8 PDCCH configuration. In an additional configuration (e.g., configuration 2), both USS and CSS may be provided or used in ePDCCH and a WTRU or UE may monitor USS and CSS (e.g., a WTRU or UE may monitor USS and/or CSS in the ePDCCH region). In yet another configuration (e.g., configuration 3), USS in legacy PDCCH may be provided or used and CSS in ePDCCH may be provided or used (e.g., a WTRU or UE may monitor CSS in legacy PDCCH region and/or USS in ePDCCH region). Additionally, in a configuration (e.g., configuration 4), USS in ePDCCH may be provided or used and CSS in legacy PDCCH may be provided or used where, for example, a WTRU or UE may monitor CSS in a legacy PDCCH region and USS in an ePDCCH region. Additionally (e.g., in configuration 4), the CSS may be shared with legacy UEs. In this case, the CCEs from 0 to 15 may be used as CSS in a legacy PDCCH region. In configuration 4, the CSS may be defined differently. For example, the CCEs from 16 to 31 in legacy PDCCH may be used as CSS for the WTRU or UE configured with ePDCCH for USS. In another example configuration (e.g., configuration 5), USS in ePDCCH may be provided or used and CSS may be split into legacy PDCCH and ePDCCH. According to an additional configuration (e.g., configuration 6), USS may be split into legacy PDCCH and ePDCCH and CSS in ePDCCH may be provided or used. Also, in a configuration (e.g., configuration 7), both USS and CSS may be split into legacy PDCCH and ePDCCH. In configuration 8, USS may be split into legacy PDCCH and ePDCCH, and CSS in legacy PDCCH may be provided or used.

The search space configuration may be defined based on or according to at least one of following. A single configuration may be predefined and the details of configuration information may be broadcasted in MIB and/or SIB-X. A configuration may be predefined such that a WTRU or UE may receive the configuration in broadcasting information at least one of MIB or SIBs. A configuration may be RRC-configured such that a WTRU or UE may be requested to change the search space according to the RRC signalling. A configuration may also be changed according to the SFN and/or subframe number such that a WTRU or UE may implicitly know the configuration in each subframe (e.g., the per subframe configuration information may be informed by broadcasting or RRC signalling and/or the per subframe configuration information may be predefined (e.g., subframe #0 and #5)).

An eCCE aggregation level may be defined as the same as legacy PDCCH such that the aggregation levels {1, 2, 4, 8} may defined and the number of blind decoding attempts in total may be 44 without uplink multi-antenna transmission (e.g., DCI format 4). The number of REs for an eCCE may be variable unlike CCE in legacy PDCCH, the coding rate for ePDCCH according to the aggregation level may vary, thus resulting in ePDCCH coverage variation.

Additional aggregation levels may be added to the previous aggregation levels {1, 2, 4, 8} for ePDCCH for finer ePDCCH link adaptation as shown in the Table 13. For WTRU or UE-specific search space, the aggregation levels {3, 5, 6, 7} may be added, and {6} may be added for common search space for example.

TABLE 13 ePDCCH candidates monitored by a WTRU or UE.

| Type | Search space $S_k^{(L)}$ Aggregation level L | Size [in eCCEs] | Number of ePDCCH candidates $M^{(L)}$ |
|---|---|---|---|
| WTRU or UE-specific | 1 | 6 | 6 |
| | 2 | 12 | 6 |
| | 3 | 18 | 6 |
| | 4 | 8 | 2 |
| | 5 | 10 | 2 |
| | 6 | 12 | 2 |
| | 7 | 14 | 2 |
| | 8 | 16 | 2 |
| Common | 4 | 16 | 4 |
| | 6 | 16 | 4 |
| | 8 | 16 | 2 |

*Either WTRU or UE-specific search space or Common search space may be defined for ePDCCH Although the number of aggregation levels may be increased, the number of blind decoding attempts may be kept as before in order not to increase WTRU or UE receiver complexity. To keep the number of blind decoding attempts, a subset of aggregation levels may be monitored in a subframe.

TABLE 14 multiple subsets of ePDCCH candidates monitored by a WTRU or UE.

| Type | Search space $S_k^{(L)}$ Aggregation level L | Size [in eCCEs] | Number of ePDCCH candidates $M^{(L)}$ | | | |
|---|---|---|---|---|---|---|
| | | | Subset 1 | Subset 2 | Subset 3 | Subset 4 |
| WTRU or UE-specific | 1 | 6 | 6 | | | 6 |
| | 2 | 12 | 6 | 6 | 6 | |
| | 3 | 18 | | | 6 | |
| | 4 | 8 | 2 | 2 | 2 | 2 |
| | 5 | 10 | | | | |
| | 6 | 12 | | | | |
| | 7 | 14 | | | | |
| | 8 | 16 | 2 | 2 | 2 | 2 |
| | 16 | 32 | | 2 | | 2 |
| Common | 4 | 16 | 4 | | | 4 |
| | 6 | 16 | | | 4 | |
| | 8 | 16 | 2 | 2 | 2 | 2 |
| | 16 | 32 | | 2 | | 2 |

Additionally, a WTRU or UE may monitor a subset of aggregation levels according to the subset of ePDCCH candidates shown in the Table 14. The subset for ePDCCH monitoring may be configured based on or according to at least one of followings: the subset of ePDCCH aggregation level may be configured by broadcasting and/or higher layer signalling; reference signal overhead within ePDCCH resource may implicitly configure the subset; the subset may be configured differently according to the ePDCCH transmission mode (e.g., Mode-1 and Mode-2); the subset may be configured differently according to the ePDCCH PRB number; and/or the like.

The number of ePDCCH candidates per aggregation level may be different according to DCI format, ePDCCH resource set, and/or subframe. For example, if aggregation level 1 may be more frequently used for DCI format 0/1A, the larger number of ePDCCH candidates for aggregation level 1 may be used as compared with that for aggregation level 2. The larger number of ePDCCH candidates may be used for DCI format 2C as compared with that for aggregation level 1.

Table 14-1 shows an example of DCI format dependent ePDCCH candidate set in which the number of ePDCCH candidates according to the aggregation level may be different if different DCI format may be used.

TABLE 14-1

DCI format dependent ePDCCH candidate set

| Type | Search space $S_k^{(L)}$ Aggregation level L | Size [in eCCEs] | Number of ePDCCH candidates $M^{(L)}$ | |
|---|---|---|---|---|
| | | | DCI format 0/1A | DCI format 2C |
| WTRU or UE-specific | 1 | 6 | 8 | 4 |
| | 2 | 12 | 4 | 8 |
| | 4 | 8 | 2 | 2 |
| | 8 | 16 | 2 | 2 |
| Common | 4 | 16 | 4 | 4 |
| | 8 | 16 | 2 | 2 |

A WTRU or UE may attempt to decode 8 ePDCCH candidates with aggregation level-1 when the WTRU or UE may monitor DCI format 0/1A. If the WTRU or UE may monitor DCI format 2C, the WTRU or UE may attempt to decode 4 ePDCCH candidates.

The number of ePDCCH candidates in each aggregation level may be different according to the DCI format in the WTRU or UE-specific search space. Additionally, in an embodiment, the common search space may have the same number of ePDCCH candidates in each aggregation level, irrespective of the DCI format, for example.

The number of ePDCCH candidates according to the aggregation levels {1, 2, 4, 8} may be configured via broadcasting and/or higher layer signalling. In a cell, the ePDCCH candidates may be configured as {6, 6, 2, 2} (e.g., the same with legacy PDCCH), while another cell may configure {2, 10, 2, 2} as the ePDCCH candidates, for example. The ePDCCH candidates for aggregation levels may be configured independently according to the DCI format, or a group of DCI formats. To reduce the signalling overhead, multiple sets of ePDCCH candidates for aggregation levels may be defined with indication bits, as illustrated in Table 14-2 for example.

TABLE 14-2 ePDCCH candidates for aggregation levels.

| Type | Search space $S_k^{(L)}$ Aggregation level L | Number of ePDCCH candidates $M^{(L)}$ | | | |
|---|---|---|---|---|---|
| | | Set 0 (00) | Set 1 (01) | Set 2 (10) | Set 3 (11) |
| WTRU or UE-specific | 1 | 8 | 4 | 8 | 16 |
| | 2 | 4 | 8 | 8 | 0 |
| | 4 | 2 | 2 | 0 | 0 |
| | 8 | 2 | 2 | 0 | 0 |
| Common | 4 | — | — | — | — |
| | 8 | — | — | — | — |

In embodiments, among the sets for ePDCCH candidates, one or more set(s) may have the same number of ePDCCH candidates as legacy PDCCH, such as {6, 6, 2, 2} for WTRU or UE-specific search space and/or {4, 2} for common search space, for example. One or more of the sets may have no ePDCCH candidates for common search space. In this case, a WTRU or UE may monitor PDCCH candidates as a common search space. One or more of the sets may include a subset of aggregation level that may not have the candidate. For example, {8, 8, 0, 0} may be used so that aggregation level 4 and 8 may not be supported in the search space in this case. The total number of blind decoding attempts may be kept the same.

ePDCCH candidate definitions may also be provided and/or used as described herein. A WTRU or UE may be configured to monitor ePDCCH in common and/or WTRU or UE-specific search space. In an embodiment, the ePDCCH candidates the WTRU or UE may monitor in a subframe may be defined according to the ePDCCH transmission type.

The ePDCCH candidates for WTRU or UE-specific search space may be defined as follows for ePDCCH localized and/or distributed transmissions, where $N_{eCCE,p,k}$ may denote the total eCCE number that may be available for ePDCCH resource set p. The WTRU or UE-specific search space $S_{p,k}^{(L)}$ for ePDCCH resource set p may be defined as $L \cdot \{(Y_{p,k}+m') \bmod \lfloor N_{eCCE,p,k}/L \rfloor\}+i$ where $i=0, \ldots, L-1$, $m'=m+M_p^{(L)} \cdot n_{CI}$, and $m=0, \ldots, M_p^{(L)}-1$. The $M_p^{(L)}$ may denote the number of ePDCCH candidates for the aggregation level L in ePDCCH resource set p. $Y_{p,k}$, which may be a hashing function for ePDCCH resource set p, may be defined by $Y_{p,k}=(A \cdot Y_{k-1}) \bmod D$ where $Y_{p,-1}=n_{RNTI} \neq 0$, A=3982i, D=65537 and $k=\lfloor n_s/2 \rfloor$.

Additionally, the ePDCCH candidates for localized ePDCCH resource sets may be defined with an offset value ($K_{offset}$) to distribute ePDCCH candidates over multiple PRB pairs as much as possible. The same ePDCCH WTRU or UE-specific search space equation may be used for both localized and distributed ePDCCH. In this embodiment, as an example, the WTRU or UE specific search space $S_{p,k}^{(L)}$ for the ePDCCH resource set p configured with localized ePDCCH may be defined as $L \cdot \{(Y_{p,k}+m'+K_{offset,p}) \bmod \lfloor N_{eCCE,p,k}/L \rfloor\}+i$. The $K_{offset,p}$ for ePDCCH resource set p, may be configured via higher layer signalling in a WTRU or UE-specific manner. The $K_{offset,p}$ may be defined as a function of at least one of the following parameters: the aggregation level (L); ePDCCH candidate index (m'); the number of total available eCCE $N_{eCCE,k}$; and/or the number of ePDCCH resource sets $K_{set}$.

In another example, the offset according to the ePDCCH candidate number and aggregation level may be expressed as $L \cdot \{(Y_{p,k}+K_{offset,p}(m')) \bmod \lfloor N_{eccE,p,k}/L \rfloor\}+i$ where the offset ($K_{offset,p}$) may be defined as a function of the ePDCCH candidate number (m'). Example embodiments of the definitions of $K_{offset,p}$ may be as follows. In such example embodiments (e.g., example equations), m' and m may be used interchangeably.

According to an example embodiment, $$K_{offset,p}(m') = \left\lfloor \frac{m' \cdot N_{eCCE,p,k}}{L \cdot M_p^{(L)}} \right\rfloor$$

may be used if multiple ePDCCH resource sets may be used. In such an embodiment, the offsets for ePDCCH resource set p may be defined as $$K_{offset,p}(m') = \left\lfloor \frac{m' \cdot N_{eCCE,k,p}}{L \cdot M_p^{(L)}} \right\rfloor$$

where $N_{eCCE,k,p}$ and $M_p^{(L)}$ may be ePDCCH resource set specific.

In another example embodiment, $$K_{offset,p}(m') = \left\lfloor \frac{m' \cdot N_{eCCE,p,k}}{L \cdot M_p^{(L)}} \right\rfloor + \Delta_{offset,p}$$

may be used where the $\Delta_{offset,p}$ may denote an offset value for ePDCCH resource set p. For example, the first ePDCCH resource set may have a zero offset value (i.e. $\Delta_{offset,p=0}=0$) and the second ePDCCH resource set may have a predefined value (e.g., $\Delta_{offset,p=1}=3$). In additional embodiments, the $\Delta_{offset,p}$ for the second set may be defined at least one of following: the $\Delta_{offset,p}$ may be configured via higher layer signalling, $\Delta_{offset,p}$ may be implicitly configured as a function of aggregation level and/or the number of PRBs configured for the ePDCCH resource set (i.e. the number of eCCEs $N_{eCCE,k,p}$), and/or the $\Delta_{offset,p}$ may be configured as a function of subframe number and/or aggregation level.

In another example, the offset (e.g., according to the ePDCCH candidate number and aggregation level) may be expressed as $L \cdot \{(Y_{p,k}+K_{offset,p}(m')+\Delta_{offset,p} \bmod \lfloor N_{eCCE,p,k}/L \rfloor\}+i$ where the offset($K_{offset,p}$) may be defined as a function of the ePDCCH candidate number. In this embodiment, the offset may be defined as $$K_{offset,p}(m') = \left\lfloor \frac{m' \cdot N_{eCCE,p,k}}{L \cdot M_p^{(L)}} \right\rfloor.$$

Additionally, the ePDCCH resource set specific offset value $\Delta_{offset,p}$ may be defined as at least one of following: the $\Delta_{offset,p=0}=0$ for the first ePDCCH resource set and $\Delta_{offset,p=1}=\lambda$ for the second ePDCCH resource set where the $\lambda$ may be a predefined positive integer number (e.g., $\lambda=3$), the $\Delta_{offset,p}$ may be configured via higher layer signalling, the $\Delta_{offset,p}$ may be implicitly configured as a function of aggregation level and the number of PRBs configured for the ePDCCH resource set, and/or the $\Delta_{offset,p}$ may be configured as a function of subframe number and/or aggregation level.

According to an additional example, $$K_{offset,p}(m') = \left\lfloor \frac{m \cdot N_{eCCE,p,k}}{L \cdot M_p^{(L)}} \right\rfloor + \Phi_{offset} \cdot n_{CI}$$

may be used (e.g., for the offset may be defined) where the $\Phi_{offset}$ may be an offset value for a cross-carrier scheduling and $n_u$ may be carrier indicator field value. The $\Phi_{offset}$ may have a different number according to the ePDCCH resource set and in that case $\Phi_{offset}$ may be replaced by $\Phi_{offset,p}$. Furthermore, $$K_{offset,p}(m') = \left\lfloor \frac{m \cdot N_{eCCE,p,k}}{L \cdot M_p^{(L)}} + \Phi_{offset} \cdot n_{CI} \right\rfloor$$

may be used. The $\Phi_{offset}$ (e.g., in such an embodiment) may be defined at least one of following: $\Phi_{offset}$ may be a predefined value and $n_{CI}$ may be carrier indicator field value, $\Phi_{offset}$ may be configured via higher layer signalling, $\Phi_{offset}$ may be implicitly configured as a function of an aggregation level and the number of PRBs configured for the ePDCCH resource set, $\Phi_{offset}$ may be configured as a function of subframe number, carrier indicator value and/or aggregation level, and/or $\Phi_{offset}$ may be defined as $M_p^{(L)}$ where $M_p^{(L)}$ may be a number of the ePDCCH candidates for the aggregation level L in ePDCCH resource set p.

In another example, $$K_{offset,p}(m') = \left\lfloor \frac{m \cdot N_{eCCE,p,k}}{L \cdot M_p^{(L)}} \right\rfloor + \Phi_{offset} \cdot \Delta_{offset,p}$$

may be used where the $\Phi_{offset}$ may be an offset value for a cross-carrier scheduling, $\Delta_{offset,p}$ may be an offset for EPDCCH resource set p, and $n_{CI}$ may be carrier indicator field value. Alternatively, $$K_{offset,p}(m') = \left\lfloor \frac{m \cdot N_{eCCE,p,k}}{L \cdot M_p^{(L)}} + \Phi_{offset} \cdot n_{CI} \right\rfloor + \Delta_{offset,p}$$

may be used. The $\Phi_{offset}$ and $\Delta_{offset,p}$ (e.g., in such an embodiment) may be defined as least one of the following: $\Phi_{offset}$ may be a predefined value and $\Delta_{offset,p}$ may be configured as a function of an ePDCCH resource set index, $\Phi_{offset}$ may be a predefined value and $\Delta_{offset,p}$ may be configured as a function of an aggregation level, carrier indicator value and/or aggregation levels, and/or both $\Phi_{offset}$ and $\Delta_{offset,p}$ may be configured by higher layer signalling In another example, the $K_{offset}$ may be predefined as a table. The table 14-3 shows an example of the definition of offset value according to the aggregation level. The exact offset value may be different. The exact offset value may be changed according to the system configuration and/or ePDCCH resource set configuration.

TABLE 14-3

$K_{offset}$ according to the aggregation levels.

| | | \multicolumn{6}{c}{m'} | | | | | |
|---|---|---|---|---|---|---|---|
| | | 0 | 1 | 2 | 3 | 4 | 5 |
| Aggregation level: L | 1 | 0 | 8 | 16 | 24 | 32 | — |
| | 2 | 0 | 8 | 16 | 24 | 32 | — |
| | 4 | 0 | 4 | 8 | — | — | — |
| | 8 | 0 | 4 | 8 | — | — | — |

Alternatively, a hash function may not be used for localized ePDCCH transmission and the ePDCCH candidates for the localized ePDCCH resource set may be defined with at least one of the following properties: the WTRU or UE-specific search space $S_k^{(L)}$ may be defined as $L \cdot \{(\tau+m') \bmod \lfloor N_{eCCE,k}/L \rfloor\} + i$ where $i=0, \ldots, L-1$, $m'=m+M^{(L)} \cdot n_{CI}$, and $m=0, \ldots, M^{(L)}-1$; $\tau$ may be defined as fixed value in a predefined manner or configured via higher layer signalling in a WTRU or UE-specific manner; and/or $\tau$ may be defined as a function of WTRU or UE-ID. For example, $\tau$=nRNTI.

A search space may include multiple ePDCCH resource sets. The multiple ePDCCH resource set may have a number of PRB-pairs that may be used and/or the number may be fixed regardless of the system bandwidth, cell-ID, and/or subframe number or variable according to system bandwidth, cell-ID, and/or subframe number. The same number of eCCEs may be available in ePDCCH resource sets. The number of eCCEs available in ePDCCH resource set may be fixed regardless of the system bandwidth, cell-ID, and/or subframe number. The number of eCCEs available in ePDCCH resource set may be variable according to the system bandwidth, cell-ID, and/or subframe number. The number of eCCEs available in ePDCCH resource set may be tied to the number of PRB-pairs for the ePDCCH resource set such as integer multiples of the number of PRB-pairs for the ePDCCH resource set. (e.g., 2 or 4 eCCEs per PRB pair may be used with 2× the number of PRB-pair.). Additionally, the number of eCCEs available in ePDCCH resource set may be changed according to the configuration.

In another embodiment, the available number of eCCE may be different according to ePDCCH resource sets. For example, the number of eCCE in an ePDCCH resource set may be defined as a function of the number of PRB-pairs configured for the ePDCCH resource set (e.g., $N_{est}$) and at least one of system configurations including CP length, subframe type, duplex mode (TDD or FDD), and/or carrier type (e.g., legacy carrier or other carrier type). In this case, given that the same $N_{est}$ number and CP-length may be used for an ePDCCH resource set, the larger number of available eCCEs may be defined in a non-legacy carrier type as compared with that for legacy carrier where the non-legacy carrier type may imply that a carrier not having legacy downlink control channels and CRS in the downlink subframes (e.g., PDCCH, PHICH, and PCFICH).

A subset of ePDCCH resource sets among the multiple ePDCCH resource sets or configured ePDCCH resource sets may be used for a WTRU or UE-specific search space. For example, if $K_{set}$=3 ePDCCH resource sets may be defined, two ePDCCH resource sets (e.g., set 1 and 2) may be used as an ePDCCH resource for a specific WTRU or UE. The multiple ePDCCH resource sets may have at least one of the following properties According to an example embodiment, $K_{set}$ ePDCCH resource sets may be defined and each ePDCCH resource set may include a same number of eCCEs (e.g., 16 eCCEs). The number of eCCEs may be fixed or variable according to the system parameter(s). The eCCE index may be defined from 0 to the total number of eCCEs in the given number of ePDCCH resource sets. For example, if three ePDCCH resource sets may be defined (e.g., $K_{set}$=3) and each ePDCCH resource set may include 16 eCCEs, the eCCE index may be defined as (eCCE#0, . . . , eCCE#15) for the first ePDCCH resource set, and (eCCE#16, . . . , eCCE #31) and (eCCE#32, . . . , eCCE#47) for the second and the third ePDCCH resource set, respectively. The total number of eCCEs $N_{eccE}$ may be $K_{set} \cdot K_{eCCE}$ where $K_{eCCE}$ may denote the number of eCCEs in an ePDCCH resource set, $N_{eCCE}=K_{set} \cdot K_{eCCE}$. The total number of eCCEs in a subframe k may be indicated by $N_{eCCE,k}$. In an embodiment, the WTRU or UE-specific search space $S_k^{(L)}$ may be defined as $L \cdot \{(Y_k+m') \mod \lfloor N_{eCCE,k}/L \rfloor\}+i$, where $i=0, \ldots, L-1$, $m'=m+M^{(L)} \cdot n_{CI}$, and $m=0, \ldots, M_{(L)}-1$. $Y_k$ may be defined by $Y_k=(A \cdot Y_{k-1}) \mod D$, where $Y_{-1}=n_{RNTI} \neq 0$, $A=39827$, $D=65537$ and $k=\lfloor n_s/2 \rfloor$.

The eCCE index may also be defined per ePDCCH resource set. For example, if three ePDCCH sets may be defined (e.g., $K_{set}=3$) and each ePDCCH resource set includes 16 eCCEs, the eCCE index may be defined as (eCCE#0, ..., eCCE#$K_{eCCE}-1$) for the first, second, and/or third ePDCCH resource sets. A WTRU or UE-specific search space may be defined per ePDCCH resource set and the $N_{eCCE,k}=K_{eCCE,k}$. In this case, one or more of the following may apply. For example, the WTRU or UE specific search space may be defined per ePDCCH resource sets. The ePDCCH candidates for an aggregation level may be split to two or more number of ePDCCH resource sets. The ePDCCH resource sets may be used for the WTRU or UE-specific search spaces. A subset of ePDCCH resource sets may be used for a specific WTRU or UE-specific search space. In an embodiment, The subset may be different according to the $n_{RNTI}$.

Table 14-4 shows an example that two ePDCCH resource sets (e.g., n=0 and 1) may be used for a WTRU or UE-specific search space and the ePDCCH candidates may be split to two ePDCCH resource sets evenly.

TABLE 14-4 ePDCCH candidates for aggregation levels

| Type | Search space $S_{k,n}^{(L)}$ Aggregation level L | Number of ePDCCH candidates $M^{(L)}$ | |
|---|---|---|---|
| | | n = 0 | n = 1 |
| WTRU or UE-specific | 1 | 3 | 3 |
| | 2 | 3 | 3 |
| | 4 | 1 | 1 |
| | 8 | 1 | 1 |

The WTRU or UE specific search space $S_{k,p}^{(L)}$ for the ePDCCH resource set p may be defined as $L \cdot \{(Y_{p,k}+m') \mod \lfloor N_{eCCE,p,k}/L \rfloor\}+i$ or $L \cdot \{(Y_{p,k}+K_{offset,p}(m')) \mod \lfloor N_{eCCE,p,k}/L \rfloor\}+i$. The $Y_{p,k}$ may be defined per ePDCCH resource set and may have a different number according to the ePDCCH resource set index p in the same subframe. The A may be defined with a different number according to the ePDCCH resource set index. In example embodiments, $Y_{p,k}$ may be defined as a function of $n_{RNTI}$, subframe number, and/or the ePDCCH resource set index p. Additionally, $Y_{p,k}$ may be defined by $Y_{p,k}=(A_p \cdot Y_{p,k-1}) \mod D$, where $Y_{p,-1}=n_{RNTI} \neq 0$, $D=65537$ and $k=\lfloor n_s/2 \rfloor$. $A_p$ may be defined as a prime number and when $A_{p=0}=39827$, the 0-th set may be the first ePDCCH resource set. $A_p$, p>0 may be a prime number smaller or larger than 39827. For example, $A_{p=0}=39827$ and $A_{p=1}=39829$.

Additionally, $Y_{p,k}$ may be defined by $Y_{p,k}=(A \cdot Y_{p,k-1}+\Delta_{offset,p}) \mod D$ where the $\Delta_{offset\_p}$ may be an offset for ePDCCH resource set p. In such an embodiment, the $\Delta_{offset,p}$ may be defined as at least one of following: a higher layer configured value; a predefined number may be used for the ePDCCH resource set specific offset, for example, the $\Delta_{offset,p=0}=0$ and the $\Delta_{offset,p=1}=\lambda$ where $\lambda$ may be a predefined number (e.g., 3) and/or the offset may be randomly generated (e.g., the $\Delta_{offset,p=0}=0$ and/or the $\Delta_{offset,p=1}=\lambda$ where $\lambda$ may be generated as a function of a subframe number and/or a WTRU or UE-ID (e.g., C-RNTI)) and/or the offset may be defined as a function of one or more of the following: an ePDCCH resource type (e.g., distributed or localized), the number of PRBs, an aggregation level, an ePDCCH candidate number, and/or a number of eCCEs.

According to an example embodiment, $Y_{p,k}$ may also be defined by $Y_{p,k}=(A_p \cdot Y_{p,k-1}+\Delta_{offset,p}) \mod D$ where the $\Delta_{offset,p}$ may be an ePDCCH resource set specific offset.

The WTRU or UE-specific search space may be defined over multiple ePDCCH resource sets and the location of ePDCCH candidates for blind detection may be defined as a function of ePDCCH resource set number and eCCE number.

Additionally, an eCCE index may be defined per one or more ePDCCH resource set(s), and associated ePDCCH resource sets may be different according to the ePDCCH transmission type and/or eCCE aggregation levels. In this case, one or more of followings may be applied. For example, eCCE index may be defined per ePDCCH resource set in at least one of following cases: low eCCE aggregation level may be used, such as 1 and/or 2; and/or ePDCCH resource set may be configured as a distributed transmission. eCCE index may be defined over two or more configured ePDCCH resource sets in at least one of following cases: high eCCE aggregation level may be used, for example, 8 or higher; and/or ePDCCH resource set may be configured as a localized transmission. One or more subsets of the ePDCCH resource sets may be indicated from an indication channel (e.g., enhanced PCFICH) in each subframe.

For multiple ePDCCH resource sets, each ePDCCH resource set may be independently configured as either localized or distributed transmission. If multiple ePDCCH resource sets may be configured for a WTRU or UE, a subset of the configured ePDCCH resource sets may be configured to a localized transmission, and the rest of ePDCCH resource sets may be configured for the distributed transmission: the ePDCCH candidates may be defined in a different manner for localized and distributed ePDCCH resource sets; a different hash function may be used for localized and distributed ePDCCH resource sets; and/or $K_{set}$ ePDCCH resource sets may be defined and each ePDCCH resource set may have a different number of eCCEs (e.g., 16 eCCEs for the primary set and 32 eCCEs for the secondary set).

When the ePDCCH candidates may be defined in a different manner for localized and distributed ePDCCH resource sets one or more of the following may apply and/or may be used: a hash function ($Y_k$) may be used for distributed ePDCCH resource set; an offset value $K_{offset}$ may be used for localized ePDCCH resource set; and ePDCCH resource set dependent hash function may be used for distributed ePDCCH resource sets. When a different hash function may be used for localized and distributed ePDCCH resource sets, the legacy hash function may be used for distributed ePDCCH resource set while another hash function may be defined for localized ePDCCH resource set.

Embodiments for antenna port mapping based on search spaces may also be provided and/or used as described herein. For example, the same, or similar, ePDCCH candidates in WTRU or UE-specific search space may have a different antenna port and/or scrambling ID whereas a common search space may have the same antenna ports and/or scrambling ID. In such embodiments, if a WTRU or UE-specific search space may be defined as {eCCE#n, eCCE#n+k}, a WTRU or UE behavior to monitor ePDCCH may include one or more of the following. An antenna port for an eCCE within WTRU or UE-specific search space may be configured in a WTRU or UE-specific manner. For example, a WTRU or UE may demodulate eCCE#n with antenna port-7 and another WTRU or UE may demodulate the eCCE#n with antenna port-8. The antenna configuration may be informed to a WTRU or UE via higher layer signaling or may be implicitly derived from the RNTI. An antenna port for an eCCE within a WTRU or UE-specific search space may be blindly decoded within a WTRU or UE-specific search space. For example, a WTRU or UE-specific search space may include an eCCE#n with antenna port-7 and eCCE#n with antenna port-9. The WTRU or UE may also demodulate (e.g., repeatedly demodulate) the same resource (eCCE#n) with antenna port-7 and antenna port-9.

According to additional embodiments, a DM-RS scrambling sequence may be provided and/or used. For example, for the demodulation of the ePDCCH, antenna ports {7, 8, 9, 10} may be used for the channel estimation, equivalently {107, 108, 109, 110} may be used. In this case, the DM-RS sequence for the antenna ports may be defined as:

$$r(m) = \frac{1}{\sqrt{2}}(1 - 2 \cdot c(2m)) + j\frac{1}{\sqrt{2}}(1 - 2 \cdot (2m + 1)),$$

$$m = \begin{cases} 0, 1, \ldots, 12N_{RB}^{max,DL} - 1 \text{ for normal } CP \\ 0, 1, \ldots, 16N_{RB}^{max,DL} - 1 \text{ for extended } CP, \end{cases}$$

where the sequence initialization $c_{init}$ may be defined as $$c_{init} = (\lfloor n_s/2 \rfloor + 1) \cdot (2n_{ID}^{EPDCCH} + 1) \cdot 2^{16} + n_{SCID}^{EPDCCH},$$

where $(n_{ID}^{EPDCCH}, n_{SCID}^{EPDCCH})$ and $(X_{ID}, n_{SCID})$ may be used interchangeably. For the $c_{init}$ definition, one or more of followings may apply: a different scrambling sequence may be used for the same ePDCCH resource and/or a single scrambling sequence may be used for the ePDCCH resources in a cell.

In an embodiment, a different scrambling sequence may be used for the same ePDCCH resource (e.g., PRB-pairs) according to the WTRU or UE and/or blind decoding attempt, for example, so that a multi-user multiplexing gain may be increased. As an example, a WTRU or UE may demodulate eCCE#n with a scrambling sequence and another WTRU or UE may demodulate eCCE#n with another scrambling sequence where the scrambling sequence may be associated with a demodulation reference signal (e.g., an antenna port). As another example, a WTRU or UE may demodulate eCCE#n with scrambling sequence A and B. The scrambling sequence candidates may be defined as follows: the scrambling sequence candidates may be defined with $n_{SCID}$ and/or $X_{ID}$; the scrambling sequence candidates may be defined as $\{n_{SCID}=0, n_{SCID}=1\}$; and/or scrambling sequence candidates may be defined as $\{(X_1, n_{SCID}=0), (X_2, n_{SCID}=0), (X_1, n_{SCID}=1), (X_2, n_{SCID}=1)\}$ where $X_1$ and $X_2$ may be a different number defined within the range of 0~ number of cell ID.

A single scrambling sequence may also be used for the ePDCCH resources in a cell so that a cell specific parameter may be used for $X_{ID}$ and a fixed number may be used for $n_{SCID}$. The $X_{ID}$ may be defined as the physical cell ID or configured by higher layer signaling. The $n_{SCID}$ may be fixed as either 0 or 1.

If multiple ePDCCH resource sets may be defined, the scrambling sequence may be used per ePDCCH resource set or across ePDCCH resource sets. For example, the scrambling sequence may be defined per ePDCCH resource set. Additionally, the $X_{ID}$ may be defined per ePDCCH resource set so that multiple scrambling sequence may be used without a dynamic indication. In such an embodiment, when ePDCCH resource sets may be configured, the associated $X_{ID}$ for each ePDCCH resource set may also be configured. In this case, the $n_{SCID}$ may be fixed as either 0 or 1. Two $X_{ID}$ may be configured via higher layer and each ePDCCH resource set may use one of the $X_{ID}$ according to the configuration. A fixed predefined $X_{ID}$ may be used for ePDCCH candidates in common search space so that a WTRU or UE may demodulate ePDCCH candidates within common search space. Higher layer configured $X_{ID}$ may be used for ePDCCH candidates in WTRU or UE-specific search space and the $X_{ID}$ may be different according to the ePDCCH resource set or the same for the ePDCCH resource sets. If two or more of $X_{ID}$ may be used with multiple ePDCCH resource sets, a PDSCH associated with an ePDCCH may be received in the subframe in at least one of following manner: a WTRU or UE may use the same $X_{ID}$ used in the associated ePDCCH for PDSCH demodulation; and/or regardless of the $X_{ID}$ used in the associated ePDCCH, a WTRU or UE may use the $X_{ID}$ indicated by $n_{SCID}$ in the associated DCI. If $n_{SCID}=0$, then $X_1$ may be used. Otherwise, $X_2$ may be used. If the WTRU or UE may use the same $X_{ID}$ used in the associated ePDCCH for PDSCH demodulation, the scrambling sequence may be aligned between PDSCH and the associated ePDCCH such that the collaborative multi-point transmission (CoMP) operation may be applied for ePDCCH.

The use of $X_{ID}$ may be dependent on the configured transmission mode for PDSCH. For example, if a WTRU or UE may be configured with non-CoMP operation, a single $X_{ID}$ may be used for the ePDCCH resource sets, and the $X_{ID}$ may be defined as physical cell ID. However, if a WTRU or UE may be configured with CoMP operation, two or more $X_{ID}$ may be used and each of the ePDCCH resource sets may be configured with an $X_{ID}$ independently. As such, $X_{ID}$ may or may not be the same for ePDCCH resource sets.

In an additional embodiment, the DM-RS sequence may be defined differently according to or based on the ePDCCH search spaces. For example, according to the ePDCCH search space, one or more of following may apply and/or may be used and/or provided. In an embodiment, a WTRU or UE-specific DM-RS sequence may be configured for the WTRU or UE-specific search space and cell-specific DM-RS sequence may be used for the common search space. The sequence initialization $c_{init}$ for a WTRU or UE-specific search space may be defined as $c_{init}=(\lfloor n_s/2 \rfloor+1) \cdot (2n_{ID}^{EPDCCH}+1) \cdot 2^{16}+n_{SCID}^{EPDCCH}$ where $n_{ID}^{EPDCCH}$ may be configured via higher layer per ePDCCH resource set and $n_{SCID}^{EPDCCH}$ may be a fixed number (e.g., 0, 1, or 2). For the ePDCCH common search space, $n_{IF}^{EPDCCH}$ may be defined as a function of the physical cell-ID and $n_{SCID}^{EPDCCH}$ may be a fixed number (e.g., 0, 1, or 2). For example, $n_{ID}^{EPDCCH}$ may be or may be equal to the physical cell ID.

In another embodiment, both a WTRU or UE-specific search space and common search space may be configured with either a WTRU or UE-specific DM-RS sequence or a cell-specific DM-RS sequence.

Additionally, in an embodiment, if multiple (e.g., two) ePDCCH resource sets may be configured for the ePDCCH WTRU or UE-specific search space and an (e.g., one) ePDCCH resource set may be used for the ePDCCH common search space, one or more of following may apply and/or may be used and/or provided. For example, the sequence initialization $c_{init}$ for a WTRU or UE-specific search space may be defined in a WTRU or UE-specific manner for each ePDCCH resource sets if the ePDCCH WTRU or UE-specific resources may not be overlapped with ePDCCH common search space resources. In such an embodiment, the sequence initialization $c_{init}$ for a WTRU or UE-specific search space may be defined as $c_{init}=(\lfloor n_s/2 \rfloor+1) \cdot 2^{16}+n_{SCID}^{EPDCCH}$ where $n_{ID}^{EPDCCH}$ may be configured via the higher layer per ePDCCH resource set and $n_{SCID}^{EPDCCH}$ may be a fixed number (e.g., 0, 1, or 2).

For an ePDCCH WTRU or UE-specific search space resource set that may be fully and/or partially overlapped with an ePDCCH common search space resource, the sequence initialization $c_{init}$ for a WTRU or UE-specific search space may be defined as the same as the ePDCCH common search space DM-RS sequence initialization. In such an embodiment, if the ePDCCH common search may use a cell-specific DM-RS sequence, the WTRU or UE-specific DM-RS sequence for the ePDCCH resource set overlapped with common search space may use the cell-specific DM-RS sequence. Additionally, in such an embodiment, the sequence initialization $c_{init}$ for a WTRU or UE-specific search space if the WTRU or UE-specific search space may not be overlapped with ePDCCH common search space may be defined as $c_{init}=(\lfloor n_s/2 \rfloor+1) \cdot (2n_{ID}^{EPDCCH}+1) \cdot 2^{16}+n_{SCID}^{EPDCCH}$ where $n_{ID}^{EPDCCH}$ may be configured via higher layer per ePDCCH resource set and $n_{SCID}^{EPDCCH}$ may be a fixed number (e.g., 0, 1, or 2).

Additionally, in an example embodiment, the sequence initialization $c_{init}$ for a WTRU or UE-specific search space if the WTRU or UE-specific search space may be overlapped with ePDCCH common search space may be defined as $c_{init}=(\lfloor n_s/2 \rfloor+1) \cdot (2n_{ID}^{EPDCCH}+1) \cdot 2^{16}+n_{SCID}^{EPDCCH}$ may be defined as a function of the physical cell-ID and $n_{SCID}^{EPDCCH}$ may be a fixed number (e.g., 0, 1, or 2). For example, $n_{ID}^{EPDCCH}$ may be or may be equal to the physical cell ID.

Search space design (e.g., in CA or for multiple DL carriers) may be provided as described herein. For example, a search space associated with multiple DL carriers may be implemented. In ePDCCH resources, a common search space and WTRU or UE-specific search space may be defined. The search spaces may be defined in a multiple carrier system in one or more of the following ways.

Figure 26:
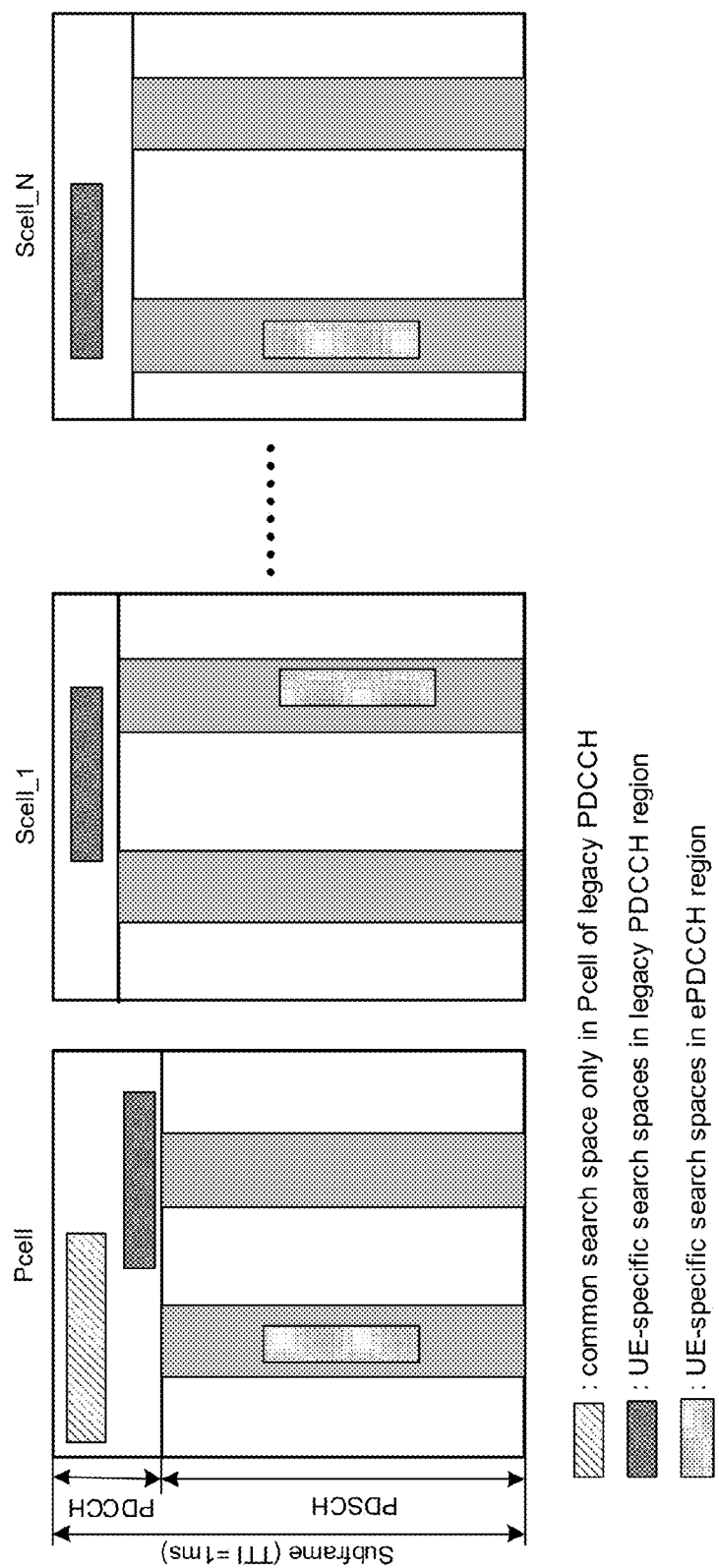
FIG. 26 illustrates an example embodiment of a common search space definition in a legacy PDCCH region in a PCell.

A common search space may be limited to being defined in PCell and/or WTRU or UE-specific search spaces may be defined in multiple component carriers. A WTRU or UE may limit monitoring of a common search space to PCell and WTRU or UE-specific search space in a corresponding PCell/SCell. In common search space, a carrier indication field (CIF) may indicate the corresponding component carrier in DCI format. The component carer in which ePDCCH may be received in a WTRU or UE-specific search space may be considered as a corresponding component carrier. FIG. 26 illustrates an exemplary common search space definition, which may be limited to legacy PDCCH region in PCell, for example. A WTRU or UE-specific search space that may be defined in PCell and common search spaces may be defined in multiple component carriers.

Common search space may also be defined in PCell and a WTRU or UE-specific search space may be defined in at least one of SCells. The common search space may be defined in legacy PDCCH in PCell and/or a WTRU or UE-specific search space may be defined in ePDCCH in at least one of SCells.

In an embodiment, a PCell may be independently defined for legacy PDCCH and/or ePDCCH. In this case, if there may be Cell-0, Cell-1, and Cell-2, Cell-0 may be configured as PCell for legacy PDCCH and/or Cell-2 may be configured as PCell for ePDCCH. PCell for ePDCCH may be defined with an offset for the PCell of legacy PDCCH.

Both WTRU or UE-specific search space and common search space may be limited to being defined in PCell. Additionally, both WTRU or UE-specific search space and common search space may be defined in multiple component carriers.

According to an example embodiment, two ePDCCH modes may be defined and/or used such as ePDCCH frequency diversity mode (e.g., ePDCCH Mode-1) and ePDCCH frequency selective mode (e.g., ePDCCH Mode-2), for example. Additionally, the ePDCCH Mode-1 may achieve frequency diversity gain so that a common search space may be limited to being defined by ePDCCH Mode-1.

In embodiments, a WTRU or UE-specific search space may be defined in one or more of the following ways. A WTRU or UE-specific search space may be defined by either ePDCCH Mode-1 or ePDCCH Mode-2. An ePDCCH mode for a WTRU or UE-specific search space may be configured by RRC signalling so that a WTRU or UE may limit its monitoring to either ePDCCH Mode-1 or ePDCCH Mode-2 according to the configuration. Additionally, an ePDCCH Mode for WTRU or UE-specific search space may be configured according to SFN so that a WTRU or UE may know which ePDCCH Mode may be defined in the subframe from the SFN number. In another example embodiment, an ePDCCH Mode for WTRU or UE-specific search space may be configured according to component carrier. For example, ePDCCH Mode-1 may be configured in PCell and ePDCCH Mode-2 may be configured for Secondary cell (SCell). The WTRU or UE may monitor an ePDCCH in PCell with ePDCCH Mode-1 and ePDCCH Mode-2 for SCell. The ePDCCH Mode for each component carrier may be configured by higher layer signalling.

Furthermore, ePDCCH Mode-1 and ePDCCH Mode-2 may be defined in the same subframe. For blind decoding, a WTRU or UE may decode half in ePDCCH Mode-1 and another half in ePDCCH Mode-2. The portion of the ePDCCH Mode that the WTRU or UE may blindly decode may be different according to subframe and/or configured by eNB. Table 15 shows an example where $M_1^{(L)}$ and $M_2^{(L)}$ may denote a number of ePDCCH candidates for ePDCCH Mode-1 and Mode-2, respectively. A WTRU or UE may monitor one ePDCCH Mode configured by an eNB via higher layer signalling.

TABLE 15 ePDCCH candidates monitored by a WTRU or UE.

| Type | Search space $S_k^{(L)}$ | | Number of ePDCCH candidates | |
|---|---|---|---|---|
| | Aggregation level L | Size [in CCEs] | $M_1^{(L)}$ | $M_2^{(L)}$ |
| WTRU or UE-specific | 1 | 6 | 3 | 3 |
| | 2 | 12 | 3 | 3 |
| | 4 | 8 | 1 | 1 |
| | 8 | 16 | 1 | 1 |
| Common | 4 | 16 | 4 | |
| | 8 | 16 | 2 | |

If cross-carrier scheduling may be activated, PDCCH may be limited to transmitting in PCell such that a WTRU or UE may monitor PCell in the limited case to receive PDCCHs. As ePDCCH may be defined, a WTRU or UE behaviour may be defined in one or more of the following ways when cross-carrier scheduling may be activated. Legacy PDCCH and/or ePDCCH may be limited to being transmitted in PCell according to the PDCCH configuration. If an eNB may configure legacy PDCCH for a WTRU or UE, the WTRU or UE may be limited to monitoring legacy PDCCH in PCell. Otherwise, the WTRU or UE may monitor ePDCCH in PCell. A WTRU or UE may assume that each PDCCH may be transmitted in PCell.

Additionally, a PCell may be defined independently for legacy PDCCH and ePDCCH such as PCell_pdcch and PCell_epdcch where PCell_pdcch and PCell_epdcch denote the PCell for legacy PDCCH and ePDCCH respectively. A WTRU or UE may monitor PCell_epdcch for the set of component carriers configured for ePDCCH and PCell_pdcch for the other component carriers configured for legacy PDCCH. The PCell_pdcch and PCell_ePDCCH may be the same component carrier.

Interference randomization may also be provided and/or used as disclosed herein. For example, a frequency location of ePDCCH may be changed from one subframe to another to randomize interference between ePDCCHs from multiple cells.

For such an interference randomization, a WTRU or UE may use various behaviours. For example, WTRU or UE behaviour to monitor ePDCCH may be defined as follows. If cross-carrier scheduling may be activated, a WTRU or UE may monitor ePDCCH in a specific cell in subframe and the index specific cell may be implicitly derived from SFN number and/or radio frame. If cross-carrier scheduling may not be activated, a WTRU or UE may monitor ePDCCH in each of the configured component carriers; however, the ePDCCH resource may be changed from one subframe to another within a cell according to a SFN number and/or radio frame.

According to an example embodiment, WTRU or UE receiver processing may be used and/or provided. For example, a PDSCH decoding processing time relaxation may be provided. In such an embodiment, FDD (e.g., with a frame structure 1) and/or TDD (e.g., with a frame structure 2) may be provided and/or used. For example, a TBS may be defined by the ($I_{TBS}$, $N_{PRB}$) (e.g., as shown in section 7.1.7.2.1 of 3GPP TS 36.213 "Physical Layer Procedures", V10.1.0, 2011-03) and the transport block size may get larger as the number of ($I_{TBS}$, $N_{PRB}$) becomes larger where $0 \leq I_{TBS} \leq 26$ and $1 \leq N_{PRB} \leq 110$. Since ePDCCH may be transmitted in the PDSCH region, a WTRU or UE receiver may lose decoding processing time for HARQ-ACK transmission which may be used to be transmitted in the uplink subframe n+4 upon receive PDSCH in the downlink subframe n. A timing advance ($T_{TA}$) may reduce PDSCH decoding processing time as it may transmit uplink signal $T_{TA}$ earlier where $0 \leq T_{TA} \leq 0.67$ [ms]. Since larger transport block size may use more PDSCH processing time, the larger TBS may be restricted in the case that $T_{TA}$ value may be relatively large and ePDCCH may be used. TBS restriction may be used according to one or more of the following.

In an example method, TBS restriction may be used as follows (e.g., according to one or more of the following). For example, $I_{TBS}^{Max}$ and $N_{PRB}^{Max}$ may be defined if $I_{TBS}^{Max} \leq I_{TBS}$ and $N_{PRB}^{Max} \leq N_{PRB}$ where the $I_{TBS}^{Max}$ and $N_{PRB}^{Max}$ may denote the maximum number for TBS index and number of PRBs restricted. As such, a WTRU or UE may assume that a TBS larger than ($I_{TBS}^{Max}$, $N_{PRB}^{Max}$) may not be transmitted for the WTRU or UE. The $I_{TBS}^{Max}$ and $N_{PRB}^{Max}$ may be defined in a WTRU or UE-specific manner as a function WTRU or UE-specific timing advance value ($T_{TA}$). The maximum TBS ($N_{TBS}^{Max}$) may also be expressed as $N_{TBS}^{Max} = \Delta(I_{TBS}^{Max}, N_{PRB}^{Max})$ where $\Delta$ may be a TBS table.

Additionally, the $I_{TBS}^{Max}$, $N_{PRB}^{Max}$ may be defined as a function of timing advance value with at least one of following equations: $I_{TBS}^{Max} = \lfloor I_{TBS} \times (1 - \gamma \cdot T_{TA}) \rfloor$ or $\lceil I_{TBS} \times (1 - \gamma \cdot T_{TA}) \rceil$, where the $\gamma$ may be weighting factor; and/or $N_{PRB}^{Max} = \lfloor N_{PRB} \times (1 - \delta \cdot T_{TA}) \rfloor$ or $\lceil N_{PRB} \times (1 - \delta \cdot T_{TA}) \rceil$ where the $\delta$ may be weighting factor.

The $I_{TBS}^{Max}$, $N_{PRB}^{Max}$ may further be defined as a function of a timing advance value with at least one of following equations: $I_{TBS}^{Max} = I_{TBS} - \lfloor \gamma \cdot T_{TA} \rfloor$ or $I_{TBS} - \lceil \gamma \cdot T_{TA} \rceil$, where the $\gamma$ may be weighting factor; and/or $N_{PRB}^{Max} = N_{PRB} - \lfloor \delta \cdot T_{TA} \rfloor$ or $N_{PRB} - \lceil \delta \cdot T_{TA} \rceil$, where the $\delta$ may be weighting factor.

In embodiments, the $N_{TBS}^{Max}$ may be defined as a function of the timing advance value with at least one of following equations: $N_{TBS}^{Max} = \lfloor N_{TBS} \times (1 - \epsilon \cdot T_{TA}) \rfloor$ or $\lceil N_{TBS} \times (1 - \epsilon \cdot T_{TA}) \rceil$, where $N_{TBS}$ may denote the largest TBS size without restriction and $\epsilon$ may be a weighting factor; and/or $N_{TBS}^{Max} = N_{TBS} - \lfloor \epsilon \cdot T_{TA} \rfloor$ or $N_{TBS} - \lceil \epsilon \cdot T_{TA} \rceil$.

The weighting factors $\gamma$, $\delta$, $\epsilon$ that may be used as shown above may have following characteristics: the weighting factors may be changed according to WTRU or UE class/category and/or the weighting factors may be different according to transmission mode. Additionally, a maximum TBS $N_{TBS}^{Max}$ may be defined as a function of $T_{TA}$ and WTRU or UE class/category. For example, for WTRU or UE category-1, TBS restriction may not be used irrespective of the timing advance value.

In another example methods, a H-ARQ timing may be implemented (e.g., to allow additional decoding processing time). In a H-ARQ operation, a WTRU or UE may be requested to transmit HARQ-ACK in subframe n+k if the WTRU or UE may have received PDSCH in subframe n. In such an embodiment, k may be set to 4 in a FDD system and k may be predefined in a TDD system based on, for example, the UL-DL configuration and/or subframe number. Additionally, in such an embodiment, WTRU or UE behavior may be defined as follows (e.g., when a WTRU or UE may have received ePDCCH and a corresponding PDSCH in subframe n). A WTRU or UE may transmit HARQ-ACK in subframe n+1. In such an embodiment, the variable/may be set to k if a single component carrier may be activated. Additionally, the variable/may be set to a positive integer number larger than 4 if multiple component carriers may be activated. The variable l may also be configured to a number within a set of candidates, for example, {4, 6, 8, 10}, via higher layer signaling when multiple component carriers may activated. If a single component carrier may be activated, l may be set to k.

In an additional example method, an ePDCCH and a corresponding PDSCH may be transmitted in a different subframe such that a WTRU or UE may monitor ePDCCH in subframe n−i and may expect to receive a corresponding PDSCH in subframe n. In this case, a WTRU or UE behavior for a HARQ-ACK transmission may include one or more of the following.

For example, the variable i may be either '0' or a positive integer and may be configured by higher layer signaling. In an embodiment, the variable i may be set to '1' in an FDD system. A WTRU or UE may transmit HARQ-ACK in subframe n−k irrespective of the subframe number for ePDCCH reception. The ePDCCH may be limited to transmission in subframe n−i in the case where multiple component carriers may be activated. Otherwise, ePDCCH and the corresponding PDSCH may be transmitted in the same subframe.

The ePDCCH may also be transmitted in subframe n−i if a timing advance ($T_{TA}$) for the WTRU or UE may be larger than a threshold (α). For $T_{TA}>α$, a WTRU or UE may expect to receive a corresponding PDSCH in subframe n when the WTRU or UE may receive ePDCCH in subframe n−i. For $T_{TA}≤α$, a WTRU or UE may receive (e.g., may expect to receive) the ePDCCH and a corresponding PDSCH in the same subframe (e.g., α=0.17 ms).

Additionally, the ePDCCH may be transmitted in subframe n−i if the number of available downlink PRBs (e.g., associated with the system bandwidth) may be larger than the $N_{PRB}$. The $N_{PRB}$ may be a threshold and, in an example embodiment, $N_{PRB}$=50. The ePDCCH may further be transmitted in subframe n−i for category 5 UEs.

One or more combinations of the above-disclosed embodiments may also be implemented. For example, the ePDCCH may be transmitted in subframe n−i if multiple component carriers may be activated and timing advance ($T_{TA}$) for the WTRU or UE may be larger than threshold. The ePDCCH may be transmitted in subframe n−i if the timing advance ($T_{TA}$) for the WTRU or UE may be larger than threshold and the WTRU or UE category may be 5. The ePDCCH may be transmitted in subframe n−i if the timing advance ($T_{TA}$) for the WTRU or UE may be larger than threshold and the number of available downlink PRBs (e.g., the system bandwidth) may be larger than $N_{PRB}$.

TDD (e.g., frame structure 2) implementations may also be provided and/or used as described herein. For example, in TDD, the HARQ-ACK timing may be defined according to or based on a UL-DL configuration and/or subframe number, for example, since the uplink subframe may not be available in n+4 once a WTRU or UE may receive a PDSCH in subframe n. Table 16 shows example embodiments of HARQ-ACK timing relations by defining k such that a WTRU or UE may transmit HARQ-ACK in uplink subframe n+k upon detection of a PDSCH in downlink subframe n.

TABLE 16 k for TDD configurations 0-6

Subframe n
The WTRU or UE may upon detection of a PDSCH in downlink subframe n transmit HARQ-ACK response in UL subframe n + k

| TDD UL-DL configuration | 0 | 1 | 2 | 3 | 4 | 5 | 6 | 7 | 8 | 9 |
|---|---|---|---|---|---|---|---|---|---|---|
| 0 | 4 | 6 | U | U | U | 4 | 6 | U | U | U |
| 1 | 7 | 6 | U | U | 4 | 7 | 6 | U | U | 4 |
| 2 | 7 | 6 | U | 4 | 8 | 7 | 6 | U | 4 | 8 |
| 3 | 4 | 11 | U | U | U | 7 | 6 | 6 | 5 | 5 |
| 4 | 12 | 11 | U | U | 8 | 7 | 7 | 6 | 5 | 4 |
| 5 | 12 | 11 | U | 9 | 8 | 7 | 6 | 5 | 4 | 13 |
| 6 | 7 | 7 | U | U | U | 7 | 7 | U | U | 5 |

In an embodiment, the TBS restriction may apply to the subframe with k, which may be equal to or less than K where the K value may be predefined or configurable by higher layer signaling. As an example, if K may equal to 4, the TBS restriction may be applied for subframes 0 and 5 in UL-DL configuration 0 in Table 16 and it may be applied for subframe 4 in UL-DL configuration 1. In another example, if K may be equal to 5, the TBS restriction may be applied in one or more of the following subframes: Subframe {0, 5} in configuration 0; Subframe {4, 9} in configuration 1; Subframe {3, 8} in configuration 2; Subframe {0} in configuration 3; Subframe {8, 9} in configuration 4; Subframe {7, 8} in configuration 5; and/or Subframe {9} in configuration 6.

According to an additional embodiment, the TBS restriction may applied to the subframe in which the HARQ-ACK timing may be larger than K and a WTRU or UE may have $T_{TA}>α$. Furthermore, from a WTRU or UE PDSCH decoding procedure perspective, a WTRU or UE may assume that the largest TBS restriction may not be applied if HARQ-ACK timing k may be larger than K (e.g., 4) in a subframe. As such, different WTRU or UE behaviors may be defined. For example, if a WTRU or UE may receive a TBS within a restricted TBS in the subframe where the HARQ-ACK timing k may be equal to or smaller than K, the WTRU or UE may assume that such a reception may be an error and may report DTX or NACK in the subframe n+k. If a WTRU or UE may receive a TBS within a restricted TBS in the subframe where the HARQ-ACK timing k maybe larger than K, the WTRU or UE may start to decode the PDSCH and report HARQ-ACK in the subframe n+k. For TDD and FDD, the TBS restriction may apply in the downlink subframe if a WTRU or UE may report HARQ-ACK 4 ms after reception of PDSCH in the subframe.

Embodiments may be described herein for feedback processing time relaxation (e.g., using FDD (e.g., Frame Structure 1) and TDD (e.g., Frame Structure 2)). As described above, aperiodic CSI feedback may be provided and/or used. If aperiodic CSI reporting may be triggered in the downlink subframe n, a WTRU or UE may report CSI in the uplink subframe n+4. Since CSI calculation may use additional processing time, when aperiodic CSI reporting may be triggered by ePDCCH in a downlink subframe n, a WTRU or UE behavior may include at least one of following.

A WTRU or UE may drop CSI feedback if a PDSCH may be transmitted for the WTRU or UE in the same subframe. In this case, the dropping condition may be further restricted with at least one of following: the TBS for the PDSCH in the subframe n being larger than a predefined threshold; the aperiodic CSI feedback mode using subband CQI and/or rank; the timing advance $T_{TA}$ being larger than a predefined threshold; the CSI-RS associated with the aperiodic CSI feedback being transmitted in the same subframe; the system bandwidth $N_{PRB}$ being larger than a predefined threshold (e.g., 50); and/or the like.

In an embodiment, a WTRU or UE may not assume that aperiodic CSI reporting may triggered in the subframe n via ePDCCH if a PDSCH may be transmitted in the same subframe. Such a condition may be further restricted with at least one of following: the TBS for the PDSCH in the subframe n being larger than a predefined threshold; the aperiodic CSI feedback mode using subband CQI and/or rank; the timing advance $T_{TA}$ being larger than a predefined threshold; the CSI-RS associated with the aperiodic CSI feedback being transmitted in the same subframe; the system bandwidth $N_{PRB}$ being larger than a predefined threshold (e.g., 50); and/or the like.

Additionally, if a CSI request field in DCI format 0 and 4 may trigger aperiodic CSI reporting in subframe n, a WTRU or UE may feedback CSI in subframe n+4 in an FDD system. This WTRU or UE behavior may be provided, in an embodiment, if a WTRU or UE may receive a legacy PDCCH.

According to example embodiments, if a WTRU or UE may receive ePDCCH for aperiodic CSI reporting in a multiple carrier system, the WTRU or UE behavior may include one or more of the following. A WTRU or UE may report CSI feedback in subframe n+j where: j may be set to 4 if a single component carrier may be activated; j may be set to 5 regardless of the number of configured component carriers (cells); j may be configured by higher layers and j may be used when multiple component carriers may be configured; j may be defined according to the cell such that j may be set to 4 for PCell and j may be set to 5 for SCell and the reporting time for PCell and SCells may be separated in the time domain; and/or j may be set to larger than 4 when a WTRU or UE may be configured according to at least one of: a timing advance ($T_{TA}$) for the WTRU or UE that may be larger than a threshold, aperiodic reporting triggering bits that may indicate to report CSI for multiple component carriers, and/or if a configured PUSCH reporting mode may be based on subband precoding matrix indicator (PMI) reporting.

As such, WTRU or UE processing (e.g., WTRU or UE decoding processing) time relaxation in multiple carriers may be provided as described herein. In such embodiments, a timing relations for HARQ-ACK transmission and/or aperiodic CSI feedback may be redefined when ePDCCH may be used, for example, in a multiple carrier system. Additionally, PDSCH decoding processing may be provided.

Uplink control channel allocation with ePDCCH may further be described herein. For example, PUCCH resource mapping for a single DL carrier may be provided. In such an embodiment, PUCCH resources corresponding to DL assignment messages received in an ePDCCH may be configured as a function of RRC signaling that may be indicated to one or more WTRU(s) or UEs.

When ePDCCH reception may be enabled or configured for a WTRU or UE, at least one or a set of candidate PUCCH resources may be assigned or indicated to a WTRU or UE. The PUCCH resources may be indicated or signaled to one or more WTRU or UE using per-WTRU specific signaling or per-UE specific signaling, or they may be indicated or signaled to WTRUs or UEs in a cell-specific manner. A WTRU or UE following reception of a DL assignment message on ePDCCH in a DL subframe may determine the corresponding PUCCH resource in an UL subframe as a function of the allowed or pre-configured PUCCH resources.

In another embodiment, the assigned ePDCCH resources may correspond to a set of pre-determined or configured PUCCH resources. A WTRU or UE receiving an assignment of ePDCCH resources for decoding of DL control information may obtain a corresponding PUCCH resource or a set of allowable PUCCH resources as a function of a pre-determined mapping relationship or table. For example, the WTRU or UE may transmit the PUCCH resource on an assigned single PUCCH resource, or in case that more than one PUCCH resources may be configured, assigned, or indicated, it may transmit the PUCCH on a resource selected from a set where the determination of the specific PUCCH resource may be subject to at least one second determining parameter such as a signaled value part of that DCI (e.g., ARI in TPC field for Release 10), or one or more values that may be derived as a function of a transmission setting like the DL assignment message mapping to the ePDCCH resources (e.g., value associated with antenna port number for DMRS for MU-MIMO). For a small or well-dimensioned number of WTRUs or UEs decoding an ePDCCH, explicit configuration of corresponding PUCCH resources may be under control of the network and may provide flexibility to pool PUCCH resources while avoiding the introduction of protocol handling in conjunction with legacy WTRU's decoding a PDCCH.

Additionally, PUCCH resources corresponding to DL assignment messages received in an ePDCCH may be derived through a dynamic resource allocation mechanism technique as a function of one or more transmission setting(s) of at least one DL signal received through an ePDCCH. PUCCH resources that may be derived using a CCE index $n_{CCE}$ on PDCCH may be extended to by CCE number definitions for ePDCCH transmissions. In such an embodiment, PUCCH resource collision between legacy PDCCH and ePDCCH may be avoided while re-using similar PUCCH resource allocation principles, such as when legacy WTRUs or UEs and ePDCCH WTRUs or UE may be supported on a serving cell, for example.

PUCCH resource allocation with a single ePDCCH resource set may also be provided and/or used. For example, PUCCH resources for a single ePDCCH set may be defined as described herein. In an embodiment, if either eCCE and/or eREG units in an ePDCCH may be defined similar to a legacy PDCCH, the corresponding PUCCH resource may be defined or derived as $n_{PUCCH}^{(1,p0)}=n_{eCCE}+N_{CCE}^{PDCCH}+N_{PUCCH}^{(1)}$, for antenna port p0, and the PUCCH resource for antenna port p1 may be derived by $n_{PUCCH}^{(1,p1)}=n_{eCCE}+N_{CCE}^{PDCCH}+1+N_{PUCCH}^{(1)}$ where $n_{CCE}$ may be the number of the first CCE (e.g., lowest eCCE index) used for transmission of the corresponding PDCCH in the region of ePDCCH, $N_{CCE}^{PDCCH}$ may be the total number of CCEs in the control region for the legacy PDCCH, and $N_{PUCCH}^{(1)}$ may be configured by higher layers. In this case, one or more of the following may be applied. $N_{CCE}^{PDCCH}$ may be computed dynamically based on the detection of PCFICH (e.g., the detection of the number of OFDM symbols) and the system bandwidth. $N_{CCE}^{PDCCH}$ may be set to a predefined offset value, for example, the largest CCE number of the largest system bandwidth, and may be combined with $N_{PUCCH}^{(1)}$ such that $N_{ePUCCH}^{(1)}=N_{PUCCH}^{(1)}+N_{CCE}^{PDCCH}$ may be configured by higher layers. $N_{ePUCCH}^{(1)}=N_{PUCCH}^{(1)}+N_{CCE}^{PDCCH}$ may be configured by higher layer signalling such that the resource allocation may be based on $n_{PUCCH}^{(1,p0)}=n_{eCCE}+N_{ePUCCH}^{(1)}$ and $n_{PUCCH}^{(1,p1)}=n_{eCCE}+N_{ePUCCH}^{(1)}+1$. In this case, at least one of following may be applied: $N_{PUCCH}^{(1)}$ may be configured by higher layers and/or commonly used for PDCCH and ePDCCH (e.g., in this case $N_{CCE}^{PDCCH}$ may be configured by higher layer); and/or $N_{ePUCCH}^{(1)}$ may be configured by higher layer signalling without a separate indication of $N_{CCE}^{PDCCH}$.

Additionally, in an embodiment, the PUCCH resource may be independent of $n_{eCCE}$ such that $n_{PUCCH}^{(1,p0)}=N_{ePUCCH}^{(1)}$ and $N_{ePUCCH}^{(1)}$ may be configurable by higher layers. For a transmission mode that may support one or more (e.g., up to two) antenna ports, the PUCCH resource $n_{PUCCH}^{(1,p1)}$ may be given by $n_{PUCCH}^{(1,p1)}=N_{ePUCCH}^{(1)}+1$. If a WTRU or UE may be configured with MU-MIMO transmission, another determining parameter $n_{MU}$ may be used for the corresponding PUCCH resource, for example, in addition to $n_{eCCE}$ as follows: $n_{PUCCH}^{(1,p0)}=n_{eCCE}+N_{CCE}^{PDCCH}+N_{PUCCH}^{(1)}+n_{MU}$ for antenna port p0 and $n_{PUCCH}^{(1,p1)}=n_{eCCE}+N_{CCE}^{PDCCH}+1+N_{PUCCH}^{(1)}+n_{MU}$ for antenna port p1. In such an embodiment, $n_{MU}$ may be determined as at least one of following: a parameter that may be associated with an antenna port for UE-specific DMRS; a parameter similar to ARI (ACK/NACK Resource Indicator) configured by high layer signalling; and/or a predetermined parameter.

In another example, PUCCH resources corresponding to DL assignments that may be received in an ePDCCH may be derived as a function of a CCE number. For example, a first or pre-determined CCE or equivalent mapping unit in an ordered sequence may be obtained from decoding a DL assignment message that may be mapped in a time and/or frequency resource grid.

Additionally, the sequence of mapping units such as eCCEs or eREGs that may be chosen to dynamically derive or determine the PUCCH resource selection in the WTRU or UE decoding ePDCCH may or may not be in a relationship with the CCE sequence and starting CCE indices that may be used in conjunction with dynamic PUCCH resource allocation used when decoding PDCCH. A WTRU or UE decoding ePDCCH determining its PUCCH resource may compute the UL transmission setting both from a first dynamically computed transmission setting such as a starting (e)CCE or equivalent and one or more pre-configured or signalled parameters as described herein.

According to an example embodiment, PUCCH resources that may be used in conjunction with PDCCH (e.g., if present) and ePDCCH may be segmented or aggregated for WTRUs assigned to decode one of these by the network. In a setup, PUCCH resources may be pooled, for example, UL RBs for a legacy WTRU's or UE's decoding of PDCCH and a WTRU's or UE's decoding of ePDCCH. In some additional embodiments (e.g., when trying to achieve spatial multiplexing gains), segregated UL resources may be chosen for a WTRU's decoding of legacy PDCCH versus those that may decode ePDCCH.

In the foregoing examples, when introducing (e)CCE and/or (e)REG units, groups or units of REs may not imply or know that they may be the same as the CCEs that include 9 REGs or REGs that include 4 REs used on a PDCCH. Additionally, an ordered sequence of mapping units corresponding to the time and/or frequency resource allocation for one or more ePDCCH(s) may be equivalent in the described embodiments. In an embodiment, PUCCH resources for a WTRU's or UE's decoding of at least one ePDCCH and which may be configured to receive more than one DL serving cell may be derived through RRC signalling to one or more WTRUs or UEs.

Embodiments may also be described herein for PUCCH resource allocation with multiple ePDCCH resource sets. For example, if either eCCE or eREG units in an ePDCCH set may be defined similarly to a legacy PDCCH, the corresponding PUCCH resources for a UE may be derived as $n_{PUCCH}^{(1,p0)} = n_{eCCE} + N_{eCCE\_Offset}^{(ePDCCH\_Set)} + N_{PUCCH}^{(1)}$, for antenna p0 and/or the PUCCH resource for antenna port p1 may be derived by $n_{PUCCH}^{(1,p1)} = n_{eCCE} + N_{eCCE\_Offset}^{(ePDCCH\_Set)} + 1 + N_{PUCCH}^{(1)}$ where $n_{eCCE}$ may be the number of the first eCCE (e.g., the lowest eCCE index that may be used to construct the PDCCH) that may be used for transmission of the corresponding PDCCH in the region of an ePDCCH set configured for a UE, $N_{eCCE\_Offset}^{(ePDCCH\_Set)}$ may be the PUCCH resource offset for an ePDCCH set, and/or $N_{PUCCH}^{(1)}$ may be configured by higher layers. In this embodiment, one or more of following may apply: $N_{eCCE\_Offset}^{(ePDCCH\_Set)}$ may be computed dynamically based on the detection of PCFICH (e.g., the detection of the number of OFDM symbols) and the system bandwidth; $N_{eCCE\_Offset}^{(ePDCCH\_Set)}$ may be set to a pre-defined offset value, for example, the largest CCE number of the largest system bandwidth, and/or be combined with $N_{PUCCH}^{(1)}$ so that $N_{ePUCCH}^{(1)} = N_{PUCCH}^{(1)} + N_{eCCE\_Offset}^{(ePDCCH\_Set)}$ may be configured by higher layers; and/or $N_{ePUCCH}^{(1)} = N_{PUCCH}^{(1)} + N_{eCCE\_Offset}^{(ePDCCH\_Set)}$ may be configured by higher layer signalling, resulting resource allocation may be based on $n_{PUCCH}^{(1,p0)} = n_{eCCE} + N_{ePUCCH}^{(1)}$ and $n_{PUCCH}^{(1,p1)} = n_{eCCE} + N_{ePUCCH}^{(1)} + 1$. In this last embodiment, at least one of following may be applied: $N_{PUCCH}^{(1)}$ may be configured by higher layers and/or used for PDCCH and ePDCCH (e.g., in this case $N_{eCCE\_Offset}^{(ePDCCH\_Set)}$ may be configured by higher layers); $N_{ePUCCH}^{(1)}$ may be configured by higher layer signalling without a separate indication of $N_{CCE}^{PDCCH}$; and/or $N_{ePUCCH}^{(1)}$ may be configured per set independently, which may be defined as $N_{ePUCCH}^{(1),ePDCCH\_Set}$.

Multiple $N_{ePUCCH}^{(1),k}$ where k=0, 1, ..., K−1 may also be configured and/or indicated via dynamic signalling. For example, the PUCCH resource allocation based on ePDCCH may be defined as $n_{PUCCH}^{(1,p0)} = n_{eCCE} + N_{ePUCCH}^{(1),k}$. In this case, one or more of followings may apply. The k may be indicated dynamically by a DCI associated with PDSCH transmission in the subframe. For example, a bit field may indicate the value of k so that a UE may derive the PUCCH resource. Additionally, ARI in a DCI may be reused to indicate k. A Scrambling ID (e.g., nSCID) for the DCI may also implicitly indicate k. The K may be the same as the number of ePDCCH resource sets that may be configured and/or each k may be one-to-one mapped with the configured ePDCCH resource set. The K may also be defined as 2 or 4 and/or, if a single ePDCCH resource set may be configured, K=1.

In an alternative or additional embodiment, $N_{eCCE\_Offset}^{(ePDCCH\_Set)}$ may be combined with $N_{PUCCH}^{(1)}$ where, for example, $N_{ePUCCH}^{(1)} = N_{PUCCH}^{(1)} + N_{CCE}^{PDCCH}$, and $N_{ePUCCH}^{(1)}$ may be signalled dynamically and/or configured semi-statically or by higher layers. If a WTRU or UE may be configured with a MU-MIMO transmission, another (e.g., second) determining parameter $n_{mu}$ may be used for the corresponding PUCCH resource in addition to $n_{eCCE}$ as follows: $n_{PUCCH}^{(1,p0)} = n_{eCCE} + N_{eCCE\_Offset}^{(ePDCCH\_Set)} + N_{PUCCH}^{(1)} + n_{MU}$ for antenna port p0 and $n_{PUCCH}^{(1,p1)} = n_{eCCE} + N_{eCCE\_Offset}^{(ePDCCH\_Set)} + 1 + N_{PUCCH}^{(1)} + n_{MU}$ for antenna port p1 where $n_{MU}$ may be determined as at least one of following: parameter associated with antenna port for UE-specific DMRS; parameter similar to ARI configured by high layer signalling; and/or parameter predetermined.

PUCCH resource mapping for multiple DL carriers may also be provided and/or used as described herein. For example, when ePDCCH reception may be enabled or configured for a WTRU or UE and a WTRU or UE may be configured to receive more than one DL serving cell, the PUCCH resource corresponding to a first DL assignment message received on a first ePDCCH may be derived by the WTRU or UE as a function of a second DL assignment message received on a second DL control channel.

Additionally, in an embodiment, a WTRU or UE may decode a legacy PDCCH on a Primary (DL) serving cell while decoding ePDCCH on a Secondary (DL) serving cell. The PUCCH resource to be used may be determined by the WTRU or UE as a function of the DL assignment message received on the Primary serving cell. In the case of 2 DL serving cells, the derived PUCCH format 1 with channel selection resources may be obtained from the DL assignment message on the Primary Cell. In the case of PUCCH format 3, the WTRU or UE may select a PUCCH resource from the set of pre-configured RRC signalled parameters through use of a signalled resource selector, e.g., ARI carried in the DL assignment message on (e)PDCCH on a Secondary serving cell.

The WTRU or UE may also decode ePDCCH on both the Primary and a Secondary serving cell. In such an embodiment, the PUCCH resource to be used may be determined by the WTRU or UE as a function of a first ePDCCH, and may be used to transmit UL control information like A/N corresponding to one or more received DL assignments on these ePDCCHs. In the case of 2 DL serving cells, the derived PUCCH format 1 with channel selection resources may be obtained from the DL assignment message on the Primary Cell.

Embodiments may also be described herein for PUCCH resource allocation with a single ePDCCH resource set. For example, if eCCE and/or eREG units in an ePDCCH may be defined similar to a legacy PDCCH, the corresponding PUCCH resource may be defined or derived as $n_{PUCCH,j}^{(1)} = n_{eCCE} + N_{CCE}^{PDCCH} + N_{PUCCH}^{(1)}$, and for a transmission mode that supports up to two transport blocks, the PUCCH resource $n_{PUCCH,j+1}^{(1)}$ may be defined or derived by $n_{PUCCH,j+1}^{(1)} = n_{eCCE} + N_{CCE}^{PDCCH} + 1 + N_{PUCCH}^{(1)}$ where $n_{eCCE}$ may be the number of the first eCCE (e.g., the lowest eCCE index used to construct the PDCCH) used for transmission of the corresponding PDCCH in the region of ePDCCH, $N_{CCE}^{PDDCH}$ may be the total number of CCEs in the control region for the legacy PDCCH and $N_{PUCCH}^{(1)}$ may be configured by higher layers. $N_{CCE}^{PDCCH}$ may be computed dynamically based on the detection of PCFICH (e.g., the detection of the number of OFDM symbols) and the system bandwidth. $N_{CCE}^{PDCCH}$ may be set to a predefined offset value, for example the largest CCE number of the largest system bandwidth, and may be combined with $N_{PUCCH}^{(1)}$ so that $N_{ePUCCH}^{(1)} + N_{CCE}^{PDCCH}$ may be configured by higher layers.

In embodiment, the PUCCH resource may be independent of $n_{eCCE}$ such that $n_{PUCCH,j}^{(1)} = N_{ePUCCH}^{(1)}$ and $N_{ePUCCH}^{(1)}$ may be configurable by higher layers. For a transmission mode that supports up to two transport blocks, the PUCCH resource $n_{PUCCH,j+1}^{(1)}$ may be given by $n_{PUCCH,j+1}^{(1)} = N_{ePUCCH}^{(1)} + 1$.

Additionally, if a WTRU or UE may be configured with MU-MIMO transmission, the corresponding PUCCH resources may be derived as $n_{PUCCH,j}^{(1)} = n_{eCCE} + N_{CCE}^{PDCCH} + N_{PUCCH}^{(1)} + n_{MU}$, and for transmission mode that supports multiple (e.g., up to two) transport blocks, the PUCCH resource $n_{PUCCH,j+1}^{(1)}$ may be derived by $n_{PUCCH,j+1}^{(1)} = n_{eCCE} + N_{CCE}^{PDCCH} + 1 + N_{PUCCH}^{(1)} + n_{MU}$ where $n_{MU}$ MU where $n_{MU}$ may be determined as at least one of following: a parameter that may be associated with antenna port for UE-specific DMRS; a parameter that may be similar to ARI configured by high layer signaling; a parameter that may be similar to ARI carried in TPC field of the DL assignment message on (e)PDCCH on a secondary serving cell (e.g., as for Rel-10); and/or a predetermined parameter.

In PUCCH resource allocation with multiple ePDCCH resource sets, the PUCCH resources for multiple ePDCCH sets may be defined as follows. If either eCCE or eREG units in an ePDCCH set may be defined similarly to a legacy PDCCH, the corresponding PUCCH resources for a UE may be derived as $n_{PUCCH,j}^{(1)} = n_{eCCE} + N_{eCCE\_Offset}^{(ePDCCH\_Set)} + N_{PUCCH}^{(1)}$, and for transmission mode that supports up to two transport blocks, the PUCCH resource $n_{PUCCH,j+1}^{(1)}$ may be derived by $n_{PUCCH,j+1}^{(1)} = n_{eCCE} + N_{eCCE\_Offset}^{(ePDCCH\_Set)} + 1 + N_{PUCCH}^{(1)}$ where $n_{eCCE}$ may be the number of the first eCCE (e.g., the lowest eCCE index used to construct the PDCCH) used for transmission of the corresponding PDCCH in the region of an ePDCCH set configured for a UE, $N_{eCCE\_Offset}^{(ePDCCH\_Set)}$ may be the PUCCH resource offset for an ePDCCH set, and $N_{PUCCH}^{(1)}$ may be configured by higher layers. $N_{eCCE\_Offset}^{(ePDCCH\_Set)}$ may be signalled dynamically or configured semi-statically. $N_{eCCE\_Offset}^{(ePDCCH\_Set)}$ may be combined with $N_{PUCCH}^{(1)}$, i.e. $N_{ePUCCH}^{(1)} = N_{PUCCH}^{(1)} + N_{CCE}^{PDCCH}$, and $N_{ePUCCH}^{(1)}$ may be signalled dynamically, or configured semi-statically or by higher layers. If a WTRU or UE may be configured with a MU-MIMO transmission, the corresponding PUCCH resources may be derived as $n_{PUCCH,j}^{(1)} = n_{eCCE} + N_{eCCE\_Offset}^{(ePDCCH\_Set)} + N_{PUCCH}^{(1)} + n_{MU}$, and for transmission mode that supports up to two transport blocks, the PUCCH resource $n_{PUCCH,j+1}^{(1)}$ may be derived by $n_{PUCCH,j+1}^{(1)} = n_{eCCE} + N_{eCCE\_Offset}^{(ePDCCH\_Set)} + 1 + N_{PUCCH}^{(1)} + n_{MU}$ where $n_{MU}$ may be determined as at least one of following: a parameter associated with antenna port for UE-specific DMRS; a parameter similar to ARI configured by high layer signaling; a parameter similar to ARI carried in TPC field of the DL assignment message on (e)PDCCH on a Secondary serving cell (e.g., as for Rel-10); and/or a predetermined parameter.

In the case of PUCCH format 3, the WTRU or UE may select a PUCCH resource from the set of pre-configured RRC signalled parameters through use of a signalled resource selector, for example, an ARI carried in the DL assignment message on (e)PDCCH via a Secondary serving cell.

Based on the foregoing, in the single carrier case for the use of explicitly configured, or implicitly derived PUCCH resources, or both of them in a combination, PUCCH format 3 may be used for the case of multiple DL serving cells, e.g., carrier aggregation with a Primary DL serving cell and at least one Secondary cell.

A PDSCH transmission mode associated with ePDCCH may further be provided and/or used described herein. For example, for a PDSCH transmission, several transmission modes may be available in a system to support various channel/system environments such as closed-loop spatial multiplexing mode, open-loop spatial multiplexing mode, transmit diversity, and/or single antenna port mode. The transmission mode may be configured via higher layer signaling, for example, so that an eNB scheduler may choose an adequate transmission mode for PDSCH transmission. Table 3 shows the transmission modes supported in LTE/LTE-A. The transmission modes using antenna port 7-10 for the PDSCH demodulation may use the ePDCCH. If a WTRU or UE may be configured with a specific transmission mode, such as transmission mode 2, which may use CRS for the PDSCH demodulation, the WTRU or UE may monitor legacy PDCCH for the PDSCH reception. If a WTRU or UE may be configured to monitor ePDCCH while the configured transmission mode for PDSCH may be 2 (e.g., transmit diversity mode), the WTRU or UE may monitor legacy PDCCH to receive DCI associated with PDSCH in the subframes. If a WTRU or UE may be configured to monitor ePDCCH while the configured transmission mode for PDSCH may be 9, the WTRU or UE may monitor ePDCCH to receive DCI in WTRU or UE-specific search space in the subframes configured for ePDCCH reception.

Additionally, ePDCCH may be used irrespective of the transmission mode configured for PDSCH transmission. For example, the transmission modes or CQI reporting modes configured for the WTRU or UE may be implicitly tied with a type of ePDCCH transmission. According to the configured transmission mode, the supportable ePDCCH transmission type may be different. For example, if a WTRU or UE may be configured with open-loop transmission modes such as transmit diversity (e.g., TM mode-2) or open-loop spatial multiplexing mode (e.g., TM mode-3), the WTRU or UE may assume that ePDCCH resource sets configured for the WTRU or UE may be used as distributed transmission. The open-loop transmission modes for PDSCH may be associated with ePDCCH distributed transmission. The closed transmission modes for PDSCH may be associated with ePDCCH localized transmission. According to the configured CQI reporting modes, the supportable ePDCCH transmission type may be different. For example, if a WTRU or UE may be configured with a reporting mode which uses PMI and CQI report, the WTRU or UE may assume that the ePDCCH resource sets configured for the WTRU or UE may be used as localized transmission. If a WTRU or UE may be configured with wideband CQI reporting in PUSCH reporting mode, the WTRU or UE may assume that the ePDCCH resource sets configured for the WTRU or UE may be for distributed transmission. Otherwise, the WTRU or UE may assume that the ePDCCH resource sets configured for the WTRU or UE may be for localized transmission or both. If a WTRU or UE may be configured for CoMP transmission mode, the WTRU or UE may also assume that the ePDCCH resource sets configured for the WTRU or UE may be defined as localized transmission.

Systems and/or methods may be provided herein for ePDCCH reception. For example, a WTRU or UE may be configured with ePDCCH or legacy PDCCH and the WTRU or UE behavior to receive the ePDCCH may be as follows. A WTRU or UE may receive ePDCCH configuration information in broadcast information. For example, MIB or SIBs may include an ePDCCH configuration so that a WTRU or UE may know the ePDCCH resources before RACH procedures. To receive broadcast information such as SIBs, a WTRU or UE may decode SI-RNTI in legacy PDCCH. A WTRU or UE may be configured to receive legacy PDCCH and/or ePDCCH during RACH procedures. For contention-based RACH procedures, a WTRU or UE may receive PDCCH configuration information in either msg2 or msg4, which may be transmitted from an eNB. For non-contention-based RACH procedures, a WTRU or UE may receive PDCCH configuration information in handover/mobility information or msg2 which may be transmitted from eNB. When a WTRU or UE may be configured to a specific PDCCH type, the WTRU or UE may blind decode DCIs in the configured PDCCH region (e.g., legacy PDCCH or ePDCCH). When a WTRU or UE may be configured to a specific PDCCH type, the WTRU or UE may blind decode a common search space in a legacy PDCCH region and a WTRU or UE-specific search space in an ePDCCH region.

In embodiments, systems and/or methods for PDCCH fallback transmission may also be disclosed. For example, as an ePDCCH may be defined additionally on top of a legacy PDCCH, an eNB may configure a legacy PDCCH or ePDCCH in a WTRU or UE-specific manner to utilize PDCCH resources. If the PDCCH resources may be configured by higher layer signaling, there may be an ambiguity period in which the eNB may not know whether the WTRU or UE may be monitoring the legacy PDCCH or the ePDCCH. In order for the WTRU or UE to receive the PDCCH regardless of the PDCCH configuration, at least one of following can be used.

An eNB may transmit both a legacy PDCCH and an ePDCCH in the same subframe for ambiguity periods and may be detect which PDCCH resource the WTRU or UE may be monitoring for from DTX of HARQ-ACK. A PUCCH resource for the legacy PDCCH and the ePDCCH may be defined independently.

A common search space may be defined in the legacy PDCCH, and a fallback transmission mode (e.g., DCI format 1A) may be used for ambiguity periods. The PDCCH resource configuration may indicate the legacy PDCCH or the ePDCCH regarding the WTRU or UE-specific search space. For example, in an embodiment, a fall-back PDCCH resource may be defined in a broadcast channel. A common search space may be defined in legacy PDCCH or ePDCCH via a broadcast channel (e.g., SIB-x) and the common search space may not be changed according to the PDCCH configuration.

Additionally, the PDCCH type may be configured by legacy PDCCH or ePDCCH with an activation timer. If a WTRU or UE monitors the legacy PDCCH, a triggering PDCCH based on the legacy PDCCH may be used to inform a WTRU or UE to monitor the ePDCCH from subframe n+x when the triggering PDCCH may be received in subframe n where x may be predefined or configured. If a WTRU or UE monitors the ePDCCH, a triggering ePDCCH based on the ePDCCH may be used to inform a WTRU or UE to monitor the legacy PDCCH from subframe n+x when the triggering ePDCCH may be received in subframe n, where x may be predefined or configured.

A MAC CE with activation and/or deactivation command may be used to configure PDCCH type according to an embodiment. For example, an activation and/or deactivation command may be transmitted with a timer such as x so that if a WTRU or UE receives MAC CE in subframe n, the command may be activated and/or deactivated in subframe n+x where x may be predefined or configured.

According to example embodiments, if multiple component carriers may be configured, at least one of following may be used to handle ambiguity periods. For example, a common search space may be defined in the legacy PDCCH of a Pcell and cross-carrier scheduling may be activated. Additionally, cross-carrier scheduling may be activated for common search space and available in a legacy PDCCH region. A WTRU or UE-specific search space may also be defined in a legacy PDCCH and/or an ePDCCH (e.g., with or without cross-carrier scheduling).

Embodiments may also be described herein for handling of or avoiding collision with other signals. ePDCCH RBs may be the same as RBs in which ePDCCH candidate(s) may be located. Although described in the case of collision between ePDCCH and PRS, the described embodiments may apply for other cases, for example, if ePDCCH resources may collide with other signals including other reference signals, or broadcasting channels. Although described for handling of or avoiding collision with other signals, the described embodiments may apply for other cases, for example, to restrict or otherwise limit ePDCCH to or from certain resource elements (REs), RBs, or subframes for any reason.

WTRU or UE reception of PRS information may be provided and/or used in an embodiment. For example, the WTRU or UE may receive PRS information for a cell for a reason other than positioning such as for a cell for which it may read ePDCCH or for which it may be configured for ePDCCH. The WTRU or UE may receive this information from the eNB, for example, via RRC signalling which may be dedicated or broadcast signalling. The WTRU or UE may receive this information included with an ePDCCH configuration which may be received in dedicated or broadcast signalling. The certain cell for which, and/or from which, the WTRU or UE may receive this information may be a serving cell of the WTRU or UE, such as a primary serving cell (PCell) or a secondary serving cell (SCell), for example. The WTRU or UE may also receive this information for a neighbor cell, as part of mobility information, or as part of configuration related to a handover to another serving cell.

In an example embodiment, the information the WTRU or UE may receive for a given cell may include one or more of the subframes the PRS may be transmitted in, a PRS configuration index, a number of DL subframes, a BW for PRS transmission, PRS muting information, a PRS period, a PRS offset, a PRS muting period, a PRS muting sequence (e.g., which PRS occasions may be muted in each PRS muting period), and/or an indication as to whether or not the cell transmits PRS. For the PRS muting sequence, which may be included as part of the PRS muting information, if a p-bit field may be used to represent a muting sequence with a period p, the first bit of the field may correspond to the first PRS positioning occasion that may start after the beginning of SFN=0 of the cell for which the PRS muting sequence may be received by the WTRU or UE.

eNB scheduling may be used or performed in an embodiment. For example, the eNB may schedule and/or transmit ePDCCH in such a way as to avoid collision of ePDCCH RBs and PRS RBs or to reduce the impact of the collision. In subframes in which the eNB may transmit PRS in a given cell, the eNB may not schedule or may not transmit ePDCCH in any RBs of that cell. In subframes in which the eNB may transmit PRS in a given cell, the eNB may not schedule or may not transmit ePDCCH in RBs that overlap the PRS BW in that cell, for example, in RBs that may collide with PRS RBs in that cell. The eNB may configure ePDCCH in a given cell in such a way that it may not collide with PRS in subframes in which the eNB may transmit PRS in that cell. This may be applicable for the case in which the PRS BW may not be the full DL BW of the cell, for example.

Whether or not an eNB may schedule or transmit ePDCCH in certain subframes or certain RBs may be based on whether, or how much, the ePDCCH DM-RS REs may collide with PRS REs. For example, if in a given subframe in which the eNB may transmit PRS, one or more ePDCCH RBs may collide with PRS RBs, then one or more of the following may apply: the eNB may transmit ePDCCH in that subframe or in the colliding RBs if in the colliding RBs, the ePDCCH DM-RS REs may not collide with PRS REs; the eNB may not transmit ePDCCH in that subframe or in the colliding RBs if in the colliding RBs, at least one ePDCCH DM-RS RE may collide with a PRS RE; the eNB may not transmit ePDCCH in that subframe or in the colliding RBs if in the colliding RBs, certain ePDCCH DM-RS REs collide with PRS REs; the eNB may not transmit ePDCCH in that subframe or in the colliding RBs if in the colliding RBs, at least a certain number of ePDCCH DM-RS REs collide with PRS REs; the eNB may not transmit ePDCCH in that subframe or in the colliding RBs if due to the collision of ePDCCH REs and PRS REs in the colliding RBs certain or at least a certain number of antenna ports become unavailable for use in those RBs which may be due to the collision of one or more ePDCCH REs and PRS REs; and/or the like.

Embodiments may be described herein for WTRU or UE reception of ePDCCH, for example, for collision handling. The WTRU may determine whether or not to monitor or attempt to decode ePDCCH candidates in certain subframes or RBs of a cell based on at least one or more PRS parameters or transmission characteristics for that cell. The WTRU or UE may take into account the subframes in which the PRS may be transmitted. For example, in subframes in which PRS may be transmitted, the WTRU or UE may monitor or attempt to decode PDCCH candidate(s) in those subframes and may not (or may be permitted to not) monitor or attempt to decode ePDCCH candidate(s) in those subframes.

In an embodiment, the WTRU or UE may take into account the subframes and the RBs in which ePDCCH and/or PRS may be transmitted. For example, in subframes in which PRS may be transmitted, the WTRU or UE may not (or may be permitted to not) monitor or attempt to decode ePDCCH candidate(s) in those subframes if the ePDCCH candidate(s) may be located in RBs that may collide with PRS RBs. In subframes in which PRS may be transmitted, the WTRU or UE may not (or may be permitted to not) perform one or more of the following: monitor or attempt to decode ePDCCH candidate(s) in those subframes if at least one of the ePDCCH candidates may be located in RBs that may collide with PRS RBs; monitor or attempt to decode ePDCCH candidate(s) in those subframes if more than a certain number of ePDCCH candidate(s) may be located in RBs that may collide with PRS RBs; monitor or attempt to decode ePDCCH candidate(s) in those subframes if the ePDCCH candidate(s) (e.g., each or all of them) in those subframes may be located in RBs that may collide with PRS RBs; monitor or attempt to decode ePDCCH candidate(s) located in RBs that may collide with PRS RBs; and/or the like. In subframes in which PRS may be transmitted, the WTRU may (or may be required to) monitor or attempt to decode one or more of the following: ePDCCH candidate(s) located in RBs that may not collide with PRS RBs in that cell and/or certain (e.g., each or all) ePDCCH candidates if no ePDCCH candidate(s) may be located in RBs that may collide with PRS RBs (e.g., if there may not be overlap between the RBs in which the ePDCCH candidate(s) may be located and the PRS BW).

Additionally, the WTRU or UE may take into account the subframes and the REs in which PRS may be transmitted and may take into account whether, or how much, the PRS REs may collide with ePDCCH DM-RS REs, for example. In subframes in which PRS may be transmitted, the WTRU or UE may (or may be required to) monitor or attempt to decode ePDCCH candidate(s) located in RBs that may collide with PRS RBs if, in the colliding RBs, none of the ePDCCH DM-RS REs may collide with PRS REs; and/or may not (or may be permitted to not) monitor or attempt to decode ePDCCH candidate(s) located in RBs that may collide with PRS RBs if, in the colliding RBs, at least one ePDCCH DM-RS RE may collide with a PRS RE; and/or may not (or may be permitted to not) monitor or attempt to decode ePDCCH candidate(s) located in RBs that may collide with PRS RBs if, in the colliding RBs, certain ePDCCH DM-RS REs may collide with PRS REs; and/or may not (or may be permitted to not) monitor or attempt to decode ePDCCH candidate(s) located in RBs that may collide with PRS RBs if, in the colliding RBs, at least a certain number of ePDCCH DM-RS REs may collide with PRS REs; and/or may not (or may be permitted to not) monitor or attempt to decode ePDCCH candidate(s) located in RBs that may collide with PRS RBs if, in the colliding RBs, certain or at least a certain number of antenna ports may become unavailable for use in those RBs which may be due to the collision of one or more ePDCCH REs and PRS REs; and/or the like.

In subframes in which PRS may be transmitted in a given cell, the WTRU or UE may determine which ePDCCH candidate(s) it may (or may be required to) or may not (or may be permitted to not) monitor or attempt to decode based on at least one of the physical layer cell ID, the value of the PRS value which may be defined as $v_{shift}=N_{ID}^{cell} \bmod 6$, where $N_{ID}^{cell}$ may be the physical layer cell identity, or the cyclic prefix (CP length) of the subframe or cell, for example, that may be normal or extended. One or more of these parameters may be used by the WTRU to determine the location of the PRS REs which the WTRU or UE may use to determine which ePDCCH DM-RS REs may collide with PRS REs.

In subframes in which PRS may be transmitted in a given cell, the WTRU or UE may determine which ePDCCH candidate(s) it may (or may be required to) or may not (or may be permitted to not) monitor or attempt to decode based on at least the number of antenna ports configured for ePDCCH in that cell. If the antenna ports may be restricted in certain subframes, the WTRU may use the ports after the restriction instead of the configured ports in those subframes for the determination. For example, antenna ports {7, 8, 9, 10} may be used in regular subframes while antenna ports {7, 8} or {9, 10} may be used in certain subframes.

In another embodiment, a search space fallback may be implemented or used. For example, for WTRUs configured for ePDCCH, PDCCH may include common search space. In certain subframes such as subframes in which PRS may be transmitted, PDCCH may include a WTRU or UE-specific search space for WTRUs or UEs configured for ePDCCH. If in a subframe a WTRU or UE configured for ePDCCH may not (or may be permitted to not) monitor or attempt to decode ePDCCH candidate(s), for example in accordance with one of the solutions described herein, the WTRU or UE may (or may be required to) monitor or attempt to decode common search space and/or WTRU or UE-specific search space in the PDCCH region.

For example, a WTRU or UE configured for ePDCCH may fall back to monitor or attempt to decode PDCCH candidate(s) which may be defined within a WTRU or UE-specific search space in a PDCCH region. Fall back may be provided or used in subframes in which PRS may be transmitted in a cell and/or may be based on at least one of PRS information (e.g., one or more of the information items described herein), PRS transmission parameters, physical layer cell ID, CP length in the cell or subframe (e.g., normal or extended), number of antenna ports configured for ePDCCH transmission, antenna port restrictions, and/or the like.

Certain subframes may be configured as fallback subframes. The eNB may provide such a configuration to the WTRU or UE. According to example embodiments, such a configuration may be received by the WTRU or UE from the eNB via broadcast or dedicated signaling such as RRC signaling.

In subframes which may be configured as fallback subframes, a WTRU or UE configured for ePDCCH may not (or may be permitted to not) monitor or attempt to decode ePDCCH candidate(s). In subframes which may be configured as fallback subframes, for a certain WTRU or UE, such as a WTRU or UE configured for ePDCCH, WTRU or UE-specific search space for the WTRU or UE may be defined in a PDCCH region. In subframes such as these subframes, the WTRU or UE may (or may be required to) monitor or attempt to decode PDCCH candidate(s), such as common search space PDCCH candidates and/or WTRU or UE-specific search space PDCCH candidates, in a PDCCH region. In subframes which may not be configured as fallback subframes, a certain WTRU or UE, such as a WTRU or UE configured for ePDCCH, may (or may be required to) monitor or attempt to decode ePDCCH candidates in a PDSCH region. The fallback subframe may be configured with at least one of a period, an offset, a number of subframes consecutively configured (e.g., number of consecutive DL subframes), and/or other parameters.

Additionally, configuration of ePDCCH subframes or ePDCCH monitoring subframes may be equivalent to configuration of fallback subframes where ePDCCH subframes or ePDCCH monitoring subframes may be treated in an opposite manner from fallback subframes. For example, the WTRU or UE and/or eNB may treat subframes which may not be configured as ePDCCH subframes or ePDCCH monitoring subframes in the manner described herein for subframes which may be configured as fallback subframes. The WTRU or UE and/or the eNB may treat subframes which may be configured as ePDCCH subframes or ePDCCH monitoring subframes in the manner described herein for subframes which may not be configured as fallback subframes.

Embodiments may be described herein for handling PRS REs. In subframes in which PRS may be transmitted, for ePDCCH candidate(s) which may be located in RBs that the WTRU or UE may attempt to decode, the WTRU or UE may assume that for the REs which may contain data (e.g., REs which may not contain CRS or DM-RS or CSI-RS), ePDCCH may not be transmitted in REs that may collide with PRS REs. The WTRU or UE may assume that ePDCCH REs are rate-matched around for those REs accordingly and/or are punctured in those REs.

A WTRU or UE may have and/or gain knowledge of PRS parameters and/or transmission characteristics from information provided to it and may use such information for collision handling. For example, the WTRU or UE may gain knowledge from the E-SMLC (e.g., via LPP signaling) or from the eNB (e.g., by RRC signaling). The parameters may include any one or more of those described herein, as well as others.

From these and/or other parameters, the WTRU or UE may determine in which subframes and/or in which RBs of those subframes PRS may be transmitted in a given cell. The WTRU or UE may or may not take into account PRS muting when determining in which subframes of a cell PRS may be transmitted.

When determining whether DM-RS REs, for example ePDCCH DM-RS REs, may collide with PRS REs in an RB of a given cell, the WTRU or UE may use one or more of the CP length for a subframe or the cell, the number of antenna ports configured for ePDCCH transmission, the cell's physical cell ID, and the PRS $v_{shift}$ value which may be derived from the cell's physical cell ID, for example $v_{shift}=N_{ID}^{cell} \mod 6$.

Additionally, for example, for collision handling, location or antenna port mapping may be used for DM-RS REs according to an example embodiment. The eNB may change the placement of the DM-RS REs in RBs in which ePDCCH candidate(s) may be located in subframes of a cell in which PRS may be transmitted. In subframes in which the eNB may transmit PRS in a given cell, the eNB may change the placement of DM-RS REs, such as ePDCCH DM-RS REs to avoid collision with PRS REs. The eNB may change the placement of the DM-RS REs, such as ePDCCH DM-RS REs if at least one DM-RS RE may otherwise collide with a PRS RE. The eNB may change the placement of the DM-RS REs, such as ePDCCH DM-RS REs, that may otherwise collide with PRS REs.

The certain DM-RS REs whose placement may be moved may include: one or more (e.g., which may include all) DM-RS REs that may otherwise collide with PRS REs, one or more (e.g., which may include all) DM-RS REs that have the same carrier frequency as DM-RS REs that may collide with PRS REs if they were not moved, and/or one or more (e.g., which may include all) DM-RS REs in an adjacent carrier frequency to DM-RS REs that if not moved may collide with PRS REs (e.g., if DM-RS REs in frequency X would collide with PRS REs, DM-RS REs in an adjacent frequency to X may be moved).

In subframes in which PRS may be transmitted, the interpretation of antenna ports by the eNB with respect to DM-RS such as ePDCCH DM-RS may be modified. The interpretation may be a function of at least one or more of the physical cell ID of the cell, the PRS $v_{shift}$ of the cell, the CP length (e.g., for the cell, the subframe, or normal subframe), and/or the number of antenna ports configured for ePDCCH transmission.

The placement change may be in frequency, such as an increase or decrease in frequency for example. The placement change may or may not include a change in symbol. The placement change may be a function of at least one or more of the physical cell ID of the cell, the PRS $v_{shift}$ of the cell, the CP length (e.g., for the cell, the subframe, or normal subframe), and/or the number of antenna ports configured for ePDCCH transmission.

In a cell in which the eNB may transmit PRS, the eNB may change the placement of DM-RS REs, such as ePDCCH DM-RS REs, in certain subframes to avoid or reduce collision with PRS REs in the subframes in which the eNB may transmit PRS. The certain subframes may include subframes in which the eNB may transmit PRS and/or may not transmit PRS, for example, the certain subframes may include all subframes. The eNB may change the placement as described above. In this cell (e.g., the cell in which the eNB may transmit PRS), the interpretation of antenna ports by the eNB with respect to DM-RS, such as ePDCCH DM-RS, may be modified in certain subframes to align with a desired modification in the subframes in which the eNB may transmit PRS. The certain subframes may include subframes in which the eNB may transmit PRS and/or may not transmit PRS, for example, the certain subframes may include all subframes.

In a cell in which the eNB may or may not transmit PRS, the eNB may change the placement of DM-RS REs, such as ePDCCH DM-RS REs, in the subframes based on where the PRS may be placed if the cell were to transmit PRS. The eNB may change the placement, as described herein. In this cell (e.g., the cell in which the eNB may or may not transmit PRS), the interpretation of antenna ports by the eNB with respect to DM-RS, such as ePDCCH DM-RS, may be modified in the subframes to align with what would be the desired modification if the cell were to transmit PRS.

The eNB may move the DM-RS REs, or modify the antenna port interpretation, in one or more of the ways described for ePDCCH DM-RS REs in a given subframe. The eNB may move the DM-RS REs, or modify the antenna port interpretation, for PDSCH granted by ePDCCH in that subframe in the same, or similar, way, for example.

In subframes in which PRS may be transmitted, the WTRU or UE may monitor or attempt to decode ePDCCH candidate(s) using a modified DM-RS pattern (e.g., which may be different from the DM-RS pattern which may be used for ePDCCH in subframes in which PRS may not be transmitted). In these subframes (e.g., subframes in which PRS may be transmitted), the interpretation of antenna ports by the WTRU or UE with respect to DM-RS such as ePDCCH DM-RS may be modified. The interpretation may be a function of at least one or more of the physical cell ID of the cell, the PRS $v_{shift}$ of the cell, the CP length (e.g., for the cell, the subframe, or normal subframe), and/or the number of antenna ports configured for ePDCCH transmission.

In one or more subframes (e.g., which may include all subframes) of a cell which may transmit PRS, the WTRU or UE may monitor or attempt to decode ePDCCH candidate(s) using a modified DM-RS pattern (e.g., which may be different from the DM-RS pattern which may be used for ePDCCH in a cell that may not transmit PRS). In these subframes (e.g., one or more, which may include all, subframes of a cell which may transmit PRS), the interpretation of antenna ports by the WTRU or UE with respect to DM-RS such as ePDCCH DM-RS may be modified. The interpretation may be a function of at least one or more of the physical cell ID of the cell, the PRS $v_{shift}$ of the cell, and/or the number of antenna ports configured for ePDCCH transmission.

The modified DM-RS pattern and/or the antenna port interpretation may be a function of one or more of the location of the PRS RBs, the location of the PRS REs, the physical layer cell ID of the cell, the PRS $v_{shift}$ of the cell, the CP length (e.g., for the cell, the subframe, or normal subframe), and/or the number of antenna ports configured for ePDCCH transmission.

According to an embodiment, the WTRU or UE may use a modified DM-RS pattern or antenna port interpretation for decoding PDSCH such as a PDSCH granted by ePDCCH that may use a modified DM-RS pattern or antenna interpretation. For example, the WTRU may use a modified DM-RS pattern such as the same, or similar, pattern used for ePDCCH DM-RS, for decoding PDSCH granted by the ePDCCH in the subframes in which ePDCCH uses a modified DM-RS pattern. In another example, the WTRU may use a modified antenna port interpretation, such as the same, or similar, interpretation used for ePDCCH DM-RS, for PDSCH granted by the ePDCCH in the subframes in which ePDCCH uses a modified antenna port interpretation.

Additionally, for example, for collision handling, embodiments may be described for antenna port restrictions for DM-RS REs. For example, the eNB may impose antenna port restrictions in RBs in which ePDCCH candidate(s) may be located in subframes of a cell in which PRS may be transmitted. In subframes in which the eNB may transmit PRS in a given cell, the eNB may restrict the usage of certain antenna ports for ePDCCH and/or PDSCH. Such restriction may be based on at least one of the physical layer cell ID of the cell, the PRS $v_{shift}$ of the cell, the CP length (e.g., for the cell, the subframe, or normal subframe), and/or the number of antenna ports configured for ePDCCH transmission. As an example, if antenna ports 7, 8, 9, and 10 may be configured for ePDCCH transmission, a restriction to limit to ports 7 and 8 or ports 9 and 10 may be imposed in subframes in which PRS may be transmitted and this restriction may be based on at least one of the physical layer cell ID of the cell, the PRS $v_{shift}$, and/or the CP length (e.g., for the cell, the subframe, or normal subframe).

In subframes in which PRS may be transmitted, the WTRU or UE may monitor or attempt to decode ePDCCH candidate(s) using a restricted set of antenna ports. The WTRU or UE may use a restricted set of antenna ports such as the same, or similar, restricted set of antenna ports used for ePDCCH, for PDSCH granted by the ePDCCH in the subframes in which ePDCCH uses a restricted set of antenna ports. When a restricted set of antenna ports may be used, that restricted set may replace the configured or other antenna port set, for example in any of the solutions or embodiments described herein.

A different ePDCCH configuration may be implemented for certain subframes, such as PRS subframes (e.g., for collision handling). In such an embodiment, for a cell, there may be a different configuration for ePDCCH for use in subframes in which PRS may be transmitted than for ePD- CCH for use in subframes in which PRS may not be transmitted. In subframes in which PRS may be transmitted, the WTRU or UE may monitor or attempt to decode ePDCCH candidate(s) in accordance with the configuration for those subframes. The WTRU or UE may receive the ePDCCH configuration for the subframes in which PRS may be transmitted from the eNB via dedicated or broadcast signaling, which may be RRC signaling for example. The WTRU or UE may receive one or more ePDCCH configurations and may receive instructions, for example from the eNB, as to which configuration to use and when. For example, the instruction may indicate in which subframes (e.g., subframes in which PRS may or may not be transmitted) or under what circumstances to use a certain configuration.

In subframes in which PRS may be transmitted, PRS may also be overridden (e.g., for collision handling). For example, REs, such as ePDCCH REs for example, may override PRS REs. Override of a first signal over a second signal may prevent transmission of the second signal, while transmission of the first signal may be enabled. For example, RE1 may override RE2, upon which RE1, or the signal in RE1, may be transmitted and RE2, or the signal in RE2, may not be transmitted.

In subframes in which PRS may be transmitted, an RE may (e.g., in the case of collision with a PRS RE) override the PRS RE. For example, such an override may occur when one or more of the following may occur or be true: the RE may be an ePDCCH DM-RS RE such as any ePDCCH DM-RS RE; the RE may be a certain ePDCCH DM-RS RE, for example an ePDCCH DM-RS RE corresponding to a certain antenna; the RE may be an ePDCCH DM-RS RE (e.g., any ePDCCH DM-RS RE) in ePDCCH common search space; the RE may be an RE in ePDCCH common search space such as any RE in ePDCCH common search space; and/or the like.

If an RE, such as an ePDCCH RE or an ePDCCH DM-RS RE for example, may override a PRS RE, a collision between the RE and the PRS RE may be removed or avoided (e.g., since the PRS RE or the signal in the PRS RE may not be transmitted). If a collision between an RE and a PRS RE may be removed or avoided, for example by override, the WTRU may determine that there may be no collision between the RE and the PRS RE. Based on this determination, the WTRU may make various decisions, such as whether or not to monitor or attempt to decode ePDCCH candidate(s) or ePDCCH candidates which may be located in RBs or REs in subframes in which PRS may be transmitted in a cell.

Blind decoding (e.g., optimization thereof) may be performed (e.g., for collision handling). For example, based on the configured ePDCCH resources, the WTRU or UE may perform a number of blind decodes, which may be referred to as the full set of blind decodes. In an example, when some of the ePDCCH candidate(s) may be located in RBs which may collide with PRS RBs in subframes in which PRS may be transmitted in a cell, the WTRU or UE may monitor or attempt to decode a subset of the configured RBs in which ePDCCH candidates may be located. In such scenarios, the WTRU or UE may perform one or more of the following: use the full set of blind decodes in the subset of RBs (e.g., to recover the overall decodes for the subframe) and/or use a set of blind decodes in the subset of RBs which may be greater than or equal to the set for these RBs as part of the full configuration and less than or equal to the full set for the full configuration. For example, if the full set of RBs corresponds to N blind decodes and a partial set corresponds to M of those N, when attempting to decode the partial set (or only the partial set), the WTRU or UE may use W blind decodes where W may be N or M≤W≤N.

Additionally, in embodiments (e.g., for collision handling), the eNB may have or gain knowledge of WTRU or UE positioning capabilities and/or of which WTRUs or UEs may know about PRS transmission and/or PRS parameters. For example, the eNB may receive information from the E-SMLC or another network entity regarding WTRU or UE positioning capabilities and/or regarding which WTRUs or UEs may have knowledge of PRS transmission and/or PRS parameters in one or more cells. The eNB may request and/or receive this and/or other information via the LPPa interface or protocol, for example. For a given or certain WTRU or UE (or WTRUs or UEs), this information may include one or more of whether the WTRU(s) or UE(s) may have the capability to support OTDOA, whether PRS information has been provided to the WTRU(s) or UE(s) (e.g., by the E-SMLC or other network entity, for example, as part of positioning assistance data), whether the PRS information may have been provided for a certain cell or cells (e.g., such as cells under the control of the eNB which may be a serving cell or cells of the WTRU(s) or UE(s)), for which cell or cells such information may have been provided to the WTRU(s) or UE(s), and/or whether PRS information may have been successfully received by the WTRU(s) or UE(s), and/or the like. The PRS information may include one or more of the PRS transmission subframes, BW, RBs, REs, muting information, and/or any other information related to PRS (e.g., PRS information described herein or parameters from which the enumerated information may be determined).

The E-SMLC and/or another network entity may know whether the PRS information has been successfully received by a WTRU or UE based on receiving an acknowledgement (ACK) or other indication from the WTRU or UE in response to successful receipt of this information, which may have been provided by the E-SMLC or other network entity. If there is no ACK or other indication from a WTRU or UE in response to the E-SMLC or other network entity providing PRS information, the E-SMLC or other network entity's knowledge of WTRU or UE awareness of PRS information may be unreliable.

The WTRU or UE may also handle PRS information from one or more sources (e.g., for collision handling). For example, the WTRU or UE may receive PRS information for a cell from at least one source such as the E-SMLC, the eNB controlling the cell transmission of PRS, another cell, or another network entity. The WTRU or UE may handle the PRS information it receives as described herein.

Knowledge of a cell's PRS transmission information by a WTRU or UE may be stale or unreliable, for example, if that information may have been received from the E-SMLC or a network entity other than the eNB that may be controlling or that may have knowledge of the PRS transmission. For example, although the eNB may inform the E-SMLC or other network entity when PRS transmission parameters for one or more cells changes, if the WTRU or UE receives PRS information for a cell and PRS information changes, for example, some time later, the PRS information known to the WTRU or UE may be incorrect. This information may be incorrect until the eNB informs the E-SMLC or other network entity of the change and/or the E-SMLC or other network entity informs the WTRU or UE.

The WTRU or UE may use (or may only use) PRS information it may receive from an eNB, for example for determining how to handle ePDCCH in a cell, or in PRS subframes of a cell, which may transmit PRS. The eNB may be the eNB responsible for the PRS transmission in the cell, or another eNB which may provide configuration to the WTRU or UE for that cell (e.g., as part of information provided in signaling related to handover). The WTRU or UE may not use (or may not be permitted to use) PRS information it may receive from another source, such as the E-SMLC or another network entity, for example, to determine how to handle ePDCCH in a cell, or in PRS subframes of a cell, which may transmit PRS. This may be provided (or beneficial) when the eNB may not be aware of which WTRUs or UEs may have acquired PRS information from another source, such as the E-SMLC or other network entity. The WTRU or UE behavior may be unknown to, or unpredictable by, the eNB if the WTRU or UE were to use the information received from the other source. The eNB may send different PRS information to the WTRU or UE than what may be sent to the WTRU or UE by the E-SMLC or other network entity to achieve a certain behavior.

The WTRU or UE may use PRS information it may receive from the E-SMLC or other network entity, for example to determine how to handle ePDCCH in a cell, or in PRS subframes of a cell, which may transmit PRS. If the WTRU or UE may receive PRS information for a given cell from multiple sources the WTRU or UE may expect the information from the multiple sources to be the same and behavior may be undefined if they may not be. The WTRU or UE may consider PRS information for a given cell received from an eNB to override PRS information it may have previously received from a source (e.g., any source), for example, for the purpose of ePDCCH handling. The WTRU or UE may consider PRS information for a given cell received from any source to override PRS information it may have previously received from a source (e.g., any source), for example, for the purpose of ePDCCH handling.

Furthermore (e.g., for collision handling), embodiments may be described for handling ePHICH collision with PRS. In subframes in which PRS may be transmitted, one or more of the following may apply: if ePHICH may collide with PRS, ePHICH may override PRS; if DM-RS REs for ePHICH may collide with PRS REs, DM-RS REs for ePHICH may override PRS REs; and/or if ePHICH REs may collide with PRS REs, ePHICH REs may be rate-matched around the PRS REs. The WTRU or UE may take this into account when monitoring or attempting to decode ePHICH.

One or more of the embodiments described herein for handling ePDCCH or ePDCCH and PRS may be applied for handling ePHICH or ePHICH and PRS. For example, a WTRU configured for at least one of ePDCCH or ePHICH may fallback to monitoring or attempting to decode PHICH and/or may not monitor or attempt to decode ePHICH in subframes in which fallback may be configured, in subframes in which ePDCCH or ePDCCH monitoring or ePHICH or ePHICH monitoring may have not been configured, in subframes in which PRS may be transmitted, or in subframes in which the collision or possibility of collision with PRS in those subframes warrants such behavior in accordance with one or more embodiments described herein.

Quasi-collocated antenna ports may also be provided and/or used according to an embodiment. For example, the demodulation of certain downlink channels such as PDSCH in certain transmission modes may need the WTRU or UE to estimate the channel from reference signals such as WTRU or UE-specific reference signals (e.g., transmitted over antenna ports 7 to 14). As part of such a procedure, the WTRU or UE may perform fine time and/or frequency synchronization to these reference signals as well as an estimation of certain properties related to the large-scale characteristics of the propagation channel.

In an embodiment, such a procedure may normally be facilitated by an assumption that another reference signal that may be measured on a regular basis such as the cell-specific reference signal may share the same timing (e.g., and some other properties) as the WTRU or UE-specific reference signal. Such an assumption may be valid if these signals may be physically transmitted from the same set of antennas. On the other hand, in embodiments with geographically distributed antennas the assumption may not be valid as the WTRU or UE-specific reference signal (e.g., and the associated downlink channel) may be transmitted from a different point than the cell-specific reference signal. As such, the WTRU or UE may be informed via a reference signal (e.g., CSI-RS) that may share the same timing and/or other characteristics as a reference signal used for demodulation. The corresponding antenna ports (e.g., two antenna ports) may then be "quasi-collocated" such that the WTRU or UE may assume that large-scale properties of the signal received from the first antenna port may be inferred from the signal received from another antenna port. The "large-scale properties" may include one or more of the following: delay spread; Doppler spread; frequency shift; average received power; received timing; and the like. As described herein, an ePDCCH may be demodulated using these reference signals that may be transmitted on antenna ports such as antenna ports 7-10. To exploit the potential capacity benefit of an ePDCCH as well as area splitting gains, the ePDCCH may also be transmitted from a transmission point of a cell. To transmit the ePDCCH from a transmission point of cell, user devices UEs may need to use and/or know one or more reference signals such as a CSI-RS that may be quasi-collocated with an antenna port used for the demodulation of the ePDCCH. Unfortunately, the use and knowledge of such reference symbols that may be quasi-collocated with an antenna port that may be used for the demodulation of the ePDCCH may be difficult as downlink control information that may be potentially signaled tends to be available after the ePDCCH may be decoded.

As such, systems and/or methods for providing a demodulation a reference timing indication may be disclosed herein. For example, a single demodulation reference timing may be provided and/or used. In such an embodiment (e.g., a first embodiment), the WTRU or UE may assume, identify, or determine that at least one quasi-collocated antenna port may be a pre-defined antenna port (e.g., at least one of ports 0-3 on which cell-specific reference signals may be transmitted) and/or at least one antenna port configured by higher layers (e.g., at least one of ports 15-23 of one configuration of CSI-RS reference signal). The network may transmit the ePDCCH to the WTRU or UE over the same transmission point corresponding to the pre-defined or pre-configured quasi-collocated antenna port. The network may also transmit the ePDCCH over a different transmission point if it may know that the large-scale properties of a reference signal transmitted from this point may be sufficiently similar to not impact demodulation performance. For example, in an embodiment, if antenna port 0 (CRS) may be defined to be a quasi-collocated antenna port and if the CRS may be transmitted from nodes (including a high power node and low power nodes), the network may transmit ePDCCH from a certain low-power node if it knows that the received timing of a reference signal transmitted from that low-power node may be sufficiently close to that of the CRS.

To enable such an embodiment, the WTRU or UE may estimate at least one property of at least one reference signal such as CSI-RS that may be known by the network to be transmitted from a given transmission point. The property that may be measured may include at least one of the following: received timing, average received power, frequency shift, Doppler spread, delay spread, and the like.

At least one of the above properties may be relative to the same property for another pre-defined or configured reference signal. For example, the WTRU or UE may estimate the difference in received timing between the concerned reference signal and a cell-specific reference signal (CRS). In another example, the WTRU or UE may estimate the ratio (in dB) between the averages received power of the concerned reference signal and the CRS.

In an embodiment, to calculate the estimate, the WTRU or UE may perform averaging over more than one antenna port over which the concerned reference signal(s) may be transmitted. The WTRU or UE may also perform averaging over multiple subframes and multiple resource blocks (e.g., in a frequency domain). A new measurement type may also be defined for each of the above-mentioned properties.

The WTRU or UE may report the measurement result for the at least one property to the network using RRC message (e.g., a measurement report) or lower layer signaling (e.g., a MAC control element or physical layer signaling). Using these results, the network may determine if transmission from a certain point may be feasible based on or taking into account what antenna port (or reference signal) the WTRU or UE assumes, identifies, or determines to be quasi-collocated with the antenna port utilized for demodulation. For example, if the difference in timing with a CRS that the WTRU or UE may assume, identify, or determine to be quasi-collocated may too large, the network may transmit using the same transmission point(s) as those used for CRS (e.g., at the expense of a loss or splitting gain).

Additionally, in an embodiment, the WTRU or UE may trigger the transmission of the measurement result(s) periodically. Alternatively, the WTRU or UE may trigger the transmission of the results when at least one of the following events may occur. The WTRU or UE may trigger the transmission when the difference of the property between the reference signals becomes higher or lower than a threshold. For example, the WTRU or UE may trigger transmission of the report if the received timing difference between a certain configured CSI-RS and the CRS may become higher than a threshold. The WTRU or UE may also trigger the transmission when an absolute value of the property of the reference signals becomes higher or lower than a threshold. For example, the WTRU or UE may trigger transmission of the report if the measured delay spread may become higher than a threshold. Such events and associated parameters or thresholds may be configured as part of a measurement reporting configuration (e.g., reportConfig).

The network may also estimate whether some large-scale properties may be similar or not (e.g., if the received timing may similar) by measuring uplink transmissions from the WTRU or UE such as SRS, PUCCH, PUSCH or PRACH, and the like in different reception points coinciding with transmission points potentially used for downlink transmissions.

Multiple demodulation reference timing may be provided and/or used. In such an embodiment (e.g., a second embodiment), to receive ePDCCH and/or PDSCH based on a WTRU or UE-specific reference signal (e.g., antenna port 7-14), at least one of following reference signals may be used to indicate the demodulation reference timing for a WTRU or UE: CSI-RS, CRS, PRS, and the like.

If a WTRU or UE may be provided or informed about a demodulation reference timing with a reference signal, a WTRU or UE demodulation process including FFT timing and channel estimation filter coefficient may follow the reference signals. For example, if there may be two CSI-RS configured for a WTRU or UE such as $CSI-RS_1$ and $CSI-RS_2$ and the WTRU or UE may report CSI for both CSI-RS configurations, FFT timing and fine time and/or frequency synchronization for PDSCH demodulation may follow one of two CSI-RS configurations according to the demodulation reference timing indication.

Alternatively, if a WTRU or UE informed about the demodulation reference timing with a reference signal, the PDSCH demodulation procedure may be different according to the type of reference signal based on one or more of the following.

If a CSI may be used for reference timing, the FFT timing and channel estimation filter coefficient for the CSI-RS may be used for PDSCH demodulation. For example, a WTRU or UE may assume, identify, or determine that the PDSCH and/or WTRU or UE-specific demodulation RS (e.g., antenna ports 7~14) may be transmitted from the same quasi-collocated antenna ports. As such, if a WTRU or UE may be configured to monitor ePDCCH (e.g., for each PRB set), the WTRU or UE may assume, identify, or determine that a first set of antenna ports (e.g., 15-22) may be associated with or correspond to the CSI-RS information and/or may identify a mapping for the PDSCH and other antenna ports (e.g., 7-14 or other ports) may be quasi co-located with respect to parameters such as Doppler shift, Doppler spread, average delay, delay spread, and the like as described above.

If a CRS may be used for reference timing, the FFT timing and channel estimation filter coefficients for the CRS may be used for PDSCH demodulation. Alternatively, a time and/or frequency offset for the CRS may be provided for PDSCH demodulation. If a WTRU or UE may be informed about the offsets, the WTRU or UE may apply the offsets from the CRS. In example embodiments, at least one of following offsets may be provided: FFT timing offset ($\Delta FFT$), time offset ($\Delta T$), frequency offset ($\Delta F$), and the like.

If a PRS may be used for reference timing, the similar WTRU or UE behavior as either CSI-RS or CRS may be applied in such an embodiment.

In an embodiment, the demodulation reference timing may be informed to a WTRU or UE in implicit or explicit manner. Also, a single demodulation reference for a given time window (e.g., a subframe or radio frame) may be applied or multiple demodulation reference may be used.

An implicit demodulation reference timing indication may be provided and/or used. In such an embodiment (e.g., a first solution), the demodulation reference timing may be tied with ePDCCH and/or PDCCH resources and may be implicitly informed to a WTRU or UE. Since a DCI should be received to demodulate PDSCH, the demodulation timing reference may be inferred from the location of ePDCCH and/or PDCCH resources where a WTRU or UE may receive the DCI. At least one of following methods may be used to implement an ePDCCH and/or PDCCH resource based indication.

In one embodiment, a WTRU or UE-specific search space may be split to two or more number of subsets and each subset may be tied with a specific demodulation timing reference. For example, within a WTRU or UE-specific search space, the total blind decoding attempts $2N_{blind}$ may be split to two subsets ($subset_1$ and $subset_2$) and each subset may include exclusive $N_{blind}$ blind decoding attempts where each subset may be tied with a different demodulation timing reference. For example, subset$_1$ may be tied with CSI-RS$_1$ and subset$_2$ may be tied with CSI-RS$_2$. As such, in an embodiment, if a WTRU or UE may receive a DCI for PDSCH in the subset$_1$, the WTRU or UE may assume, identify, or determine that the PDSCH may be transmitted in the same transmission point with CSI-RS$_1$.

Additionally, as described herein, for an ePDCCH WTRU or UE-specific search space, the search space subset may be tied with the demodulation timing reference. Therefore, when a WTRU or UE may perform blind decoding for ePDCCH, the WTRU or UE may assume, identify, or determine that the subset$_1$ and subset$_2$ may be transmitted from the same transmission point with CSI-RS$_1$ and CSI-RS$_2$ respectively. In another embodiment, as described herein, if a WTRU or UE may receive a DCI via ePDCCH, the WTRU or UE may assume, identify, or determine that the corresponding PDSCH may be transmitted from the same transmission point with ePDCCH. Furthermore, for an ePDCCH common search space (e.g., as described herein), a WTRU or UE may assume, identify, or determine that the ePDCCH may be transmitted from the same transmission point with CRS.

As such, in embodiments, if the WTRU or UE may be configured to monitor ePDCCH (e.g., for each PRB set), the WTRU or UE may use a parameter set indicated by a higher layer parameter such as CSI-RS for determining mapping information and/or antenna port quasi co-location (e.g., ePDCCH).

According to another embodiment (e.g., a second solution), the demodulation antenna ports may be tied with demodulation timing reference. If antenna ports 7-10 may be available for ePDCCH and/or PDSCH demodulation, multiple pairs of quasi-collocated ports may be pre-defined. For example, a WTRU or UE may assume, identify, or determine that the antenna ports {7, 8} and {9, 10} may be quasi-collocated, where the quasi-collocated pair {7, 8} and {9, 10} may be tied with CSI-RS$_1$ and CSI-RS$_2$, respectively. In such an embodiment, a WTRU or UE may also assume, identify, or determine that the demodulation timing reference for antenna port-7 may be the same as antenna port-8. Alternatively, scrambling ID (n$_{SCID}$) may be also tied with demodulation timing reference assuming that multiple n$_{SCID}$ may be used. If n$_{SCID}$=0 and n$_{SCID}$=1 may be used, a WTRU or UE may assume, identify, or determine that n$_{SCID}$=0 may be tied with CSI-RS$_1$ and n$_{SCID}$=1 may be tied with CSI-RS$_2$ for example. According to another alternative, the n$_{SCID}$ may be tied with antenna ports. For example, n$_{SCID}$=0 may be used for antenna ports {7, 8} and n$_{SCID}$=1 may be used for antenna ports {9, 10}. As such, a WTRU or UE may assume, identify, or determine that n$_{SCID}$=0 may be used when the WTRU or UE may demodulate signals based on antenna ports {7, 8}, and n$_{SCID}$=1 may be used when the WTRU or UE may demodulate signals based on antenna port {9, 10}. The antenna ports to n$_{SCID}$ mapping may be configured at least one of following: the antenna port to n$_{SCID}$ mapping may be predefined where, in such an embodiment, the quasi-collocated antenna ports may have the same n$_{SCID}$; the antenna port to n$_{SCID}$ mapping may be configured by broadcasting channels or higher layer signalling; and the like.

The scrambling sequence may be initialized by $$c_{init}=(\lfloor n_s/2 \rfloor+1)\cdot(2N_{ID}^X+1)\cdot 2^{16}+n_{SCID}$$

where in $c_{init}$, $N_{ID}^X$ may be higher layer configurable value or predefined value as physical cell ID.

In another embodiment (e.g., a third solution), downlink resources may be tied with demodulation timing reference. In such an embodiment, according to the downlink resource position for E-PDSCH and/or PDSCH, a WTRU or UE may infer the demodulation reference timing. The downlink position may include at least one of following: a subset of downlink subframe(s) and/or PRBs that may be configured to use a specific demodulation reference time. Optionally, the reference time may be used for the demodulation of antenna ports 7~14. Otherwise, CRS may be used as the reference timing.

In yet another embodiment (e.g., a forth solution), the demodulation reference timing may be defined with a time relation with CSI-RS and CSI feedback. The WTRU or UE behaviors in such an embodiment may be defined by at least one of the following. A WTRU or UE may assume, identify, or determine that the PDSCH may be transmitted from the transmission point with CSI-RS$_k$ if the latest CSI-RS WTRU or UE received may be the CSI-RS$_k$. In such an embodiment, a subframe offset may be additionally be defined such that a WTRU or UE may assume, identify, or determine the demodulation reference timing may be changed after the number of offset subframe.

Additionally, a WTRU or UE may assume, identify, or determine that the PDSCH may be transmitted from the transmission point with CSI-RS$_k$ if the latest CSI feedback WTRU or UE report may be based on the CSI-RS$_k$, where the latest CSI feedback may be at least one of following: aperiodic CSI reporting; periodic CSI reporting with PMI/CQI where if the latest CSI reporting type was RI, the demodulation reference timing may be kept unchanged; periodic CSI reporting with PMI/CQI/RI; the offset subframe that may be applied such that the demodulation reference timing may be changed after the number of offset subframe; and the like.

An implicit indication of PDSCH demodulation information may also be provided and/or used as described herein. For example, as described herein, methods or procedures may be used to determine, for example, PDSCH demodulation information that may be used by the WTRU or UE upon decoding PDSCH in a subframe. The PDSCH demodulation information may include one or more of the following. For example, the PDSCH demodulation information may include a reference signal (e.g., or antenna port) that may be assumed as quasi-collocated to reference signals (e.g., or antenna ports) that may be used for PDSCH demodulation (e.g., including an index to a non-zero-power CSI-RS resource). The PDSCH demodulation information may also include at least one parameter that may be used to determine a location of resource elements (RE) on which PDSCH may be transmitted, or on which PDSCH may not be transmitted (e.g., for rate matching purposes), such as one or more of the following: at least one parameter indicating the location of CRS ports on which PDSCH may not be transmitted (e.g., a number of CRS ports, a CRS frequency shift); a MBSFN configuration; at least one parameter indicating the location of zero-power CSI-RS on which PDSCH may not be transmitted such as a configuration of zero-power CSI-RS; an indication of the PDSCH starting symbol; at least one parameter indicating the location of a non-zero-power CSI-RS on which PDSCH may not be transmitted; at least one parameter indicating the location of resource elements that may be used for interference measurement resources; and the like. Additionally, the PDSCH demodulation information may further include a scrambling identity that may be used to determine a demodulation reference signal In one example embodiment (e.g., an example method), the WTRU or UE may determine PDSCH demodulation information based on the identity of a reference signal (e.g., such as CRS or CSI-RS) that may be assumed as quasi-collocated to the reference signal that may be used for demodulating the ePDCCH including the assignment (e.g., control information) for this PDSCH. In such an embodiment (e.g., method), the network may use the same transmission point for the ePDCCH and the PDSCH that may be signalled by the same ePDCCH. Additionally, since some of the PDSCH demodulation information may be tied (e.g., often closely tied) to the used transmission point, such information may be derived implicitly from the reference signal that may be assumed to be quasi-collocated.

For example, if the WTRU or UE may determine that a certain non-zero-power CSI-RS resource may be collocated to the reference signal that may be used for the ePDCCH, the WTRU or UE may assume that the same non-zero-power CSI-RS resource may correspond to a reference signal collocated to the reference signals that may be used for demodulating the PDSCH. Additionally, the index of this non-zero-power CSI-RS resource may indicate (e.g., possibly in combination with another indication of the downlink control information) a set of parameters that may determine PDSCH demodulation information that may be configured by higher layers.

In another embodiment (e.g., example method), the WTRU or UE may determine PDSCH demodulation information based on, for example, a property (e.g., another property) of the ePDCCH including the downlink control information that may be applicable to this PDSCH such as a search space, or ePDCCH set in which ePDCCH may have been decoded, the aggregation level, whether the corresponding ePDCCH set may be distributed or localized, and the like.

In example embodiments, the use of one or more of the above embodiments or methods may be conditioned on at least one of the following: an indication from higher layers that PDSCH demodulation information may be obtained using the method; an indication from the downlink control information applicable to this PDSCH (e.g., the method may be applied if one of a specific subset of values of a new or existing field may be received and for other values of this field, the WTRU or UE may obtain the PDSCH demodulation information based on the value of the field); a RRC configuration, for example, based on the configured DCI format, the configured transmission mode (e.g., may be applicable to TM10), the configured behavior for determining ePDCCH collocation reference signal (e.g., the method may apply if ePDCCH quasi-collocated reference signal may be obtained based on the ePDCCH set in which ePDCCH may be decoded, whether the non-zero-power CSI-RS resources configured for each ePDCCH set for the purpose of determining quasi-collocation may be different; and the like.

An explicit demodulation reference timing indication may be provided and/or used. In such an embodiment (e.g., a first solution), the demodulation reference timing may be indicated or included in a DCI for PDSCH. For example, indication bit(s) may be explicitly located in a DCI. As such, a WTRU or UE may be informed which demodulation reference timing may be used for corresponding PDSCH demodulation. Alternatively, the demodulation reference timing may be informed to a WTRU or UE via higher layer signalling (e.g., RRC, MAC control element, and the like).

In another such embodiment (e.g., a second solution), the demodulation reference timing may be indicated via a specific ePDCCH and/or PDCCH such that the demodulation reference timing may be changed from a subframe to another in a WTRU or UE-specific manner. In such an embodiment, the ePDCCH and/or PDCCH may be use at least one of following: an ePDCCH and/or PDCCH may trigger one of the demodulation reference timings and the triggered demodulation reference timing may be valid for a time window where the time window may be pre-defined or configured by higher layer signalling; an ePDCCH and/or PDCCH may trigger one of the demodulation reference timings and it may be valid unless a different demodulation reference timing may be triggered; an ePDCCH and/or PDCCH may be used for activation/de-activation to indicate the demodulation reference timing.

WTRU or UE blind decoding attempts for multiple demodulation reference timing may also be provided and/or used according to example embodiments. For example, without demodulation reference timing information, a WTRU or UE may blindly attempt multiple demodulation reference timing at the receiver. In such an embodiment, a WTRU or UE may demodulate ePDCCH and/or PDSCH with each possible demodulation reference timing candidate. For example, if two CSI-RS may be configured for a WTRU or UE and the WTRU or UE may report CSIs for both CSI-RS configurations, the WTRU or UE may demodulate ePDCCH and/or PDSCH with both CSI-RS configurations.

Although the terms UE or WTRU may be used herein, it may and should be understood that the use of such terms may be used interchangeably and, as such, may not be distinguishable. Additionally, for the enhanced physical downlink control channel described herein, ePDCCH, EPDCCH, and/or ePDCCH may be used interchangeably.

Although the terms legacy PDCCH or PDCCH may be used herein to indicate the Rel-8/9/10 PDCCH resources, it may and should be understood that the use of such terms may be used interchangeably and, as such, may not be distinguishable. Additionally, PDCCH and DCI may be used interchangeably as a meaning of downlink control information transmitted from to eNB to a WTRU or UE.

Furthermore, although features and elements may be described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but may not be limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:
1. A method for providing enhanced physical downlink control channel (ePDCCH) in a wireless communication system, the method comprising:
deriving, at a wireless transmit and receive unit (WTRU), a set of aggregation levels for monitoring an ePDCCH resource based on a number of available resource elements (REs) in a physical resource block (PRB) pair configured for the ePDCCH resource, wherein the number of available REs is derived for a subframe;

deriving, at the WTRU, a subset of the set of aggregation levels for monitoring the ePDCCH resource based on a number of PRB pairs configured for the ePDCCH resource; and monitoring, at the WTRU, the ePDCCH resource on the subframe using the subset of the set of aggregation levels.

2. The method of claim 1, wherein, for at least one of time-division duplex (TDD) or a downlink cyclic prefix (CP), the subframe is not a special subframe associated with a particular special subframe configuration.

3. The method of claim 2, wherein the particular special subframe configuration comprises at least one of a special subframe configuration 0 or a special configuration 5.

4. The method of claim 1, wherein the number of available REs excludes an RE used for a reference signal.

5. The method of claim 4, wherein the reference signal comprises at least one of CRS, CSI-RS, or DM-RS.

6. The method of claim 1, wherein the set of aggregation levels comprise one of {2, 4, 8, 16} or {1, 2, 4, 8} based on the number of available REs.

7. The method of claim 1, wherein the PRB pair configured for the ePDCCH resource comprises a fixed number of enhanced resource element groups (eREGs) and one or more enhanced control channel elements (eCCEs), wherein one or more eREGs are mapped to each eCCE.

8. The method of claim 7, wherein the number of eREGs that are mapped to an eCCE is based on a cyclic prefix (CP) and the subframe.

9. The method of claim 8, wherein four eREGs are mapped to an eCCE when the CP comprises a normal CP and the subframe comprises a normal subframe or a special subframe associated with a special subframe configuration of 3, 4, or 8.

10. The method of claim 8, wherein eight eREGs are mapped to an eCCE when the CP comprises a normal CP and the subframe comprises a special subframe associated with a special subframe configuration of 1, 2, 6, 7, or 9 or when the CP comprises an extended CP and the subframe comprises a special subframe associated with a special subframe configuration of 1, 2, 3, 5, or 6.

11. The method of claim 7, wherein number of eCCEs is a function of one or more of a type of ePDCCH, the subframe, a subframe configuration, the number of PRB pairs associated with the ePDCCH resource, the number of available REs in a PRB pair associated with the ePDCCH resource, or a cyclic prefix (CP).

12. The method of claim 1, further comprising monitoring, at the WTRU, a PDCCH resource on a subframe not configured for monitoring the ePDCCH resource.

13. The method of claim 1, further comprising monitoring, at the WTRU, a PDCCH resource on a subframe not configured for monitoring the ePDCCH resource based on the configuration.

14. The method of claim 13, wherein the PDCCH resource monitored comprises a common search space.

15. The method of claim 1, wherein candidates for the ePDCCH resource of the subframe are selected based on a hashing function, wherein the hashing function is different for each ePDCCH resource.

16. A wireless transmit/receive unit (WTRU) comprising:
a receiver;
a memory storing processor-executable instructions; and
a processor configured to execute the processor-executable instructions to
derive a set of aggregation levels for monitoring an enhanced physical downlink control channel (ePD-CCH) resource in a wireless communication system based on a number of available resource elements (REs) in a physical resource block (PRB) pair configured for the ePDCCH resource, wherein the number of available REs is derived for a subframe;
derive a subset of the set of aggregation levels for monitoring the ePDCCH resource based on a number of PRB pairs configured for the ePDCCH resource; and
monitor the ePDCCH resource on the subframe using the subset of the set of aggregation levels.

17. The WTRU of claim 16, wherein, for at least one of a time-division duplex (TDD) or a downlink cyclic prefix (CP), the subframe is not a special subframe associated with a particular special subframe configuration.

18. The WTRU of claim 17, wherein the particular special subframe configuration comprises at least one of a special subframe configuration 0 or a special configuration 5.

19. The WTRU of claim 16, wherein the number of available REs excludes an RE used for a reference signal.

20. The WTRU of claim 19, wherein the reference signal comprises at least one of CRS, CSI-RS, or DM-RS.

21. The WTRU of claim 16, wherein the set of aggregation levels comprise {2,4,8,16} or {1,2,4,8} based on the number of available REs.

22. The WTRU of claim 16, wherein the PRB pair configured for the ePDCCH resource comprises a fixed number of enhanced resource elements groups (eREGs) and one or more enhanced control channel elements (eCCEs), wherein one or more eREGs are mapped to each eCCE.

23. The WTRU of claim 22, wherein the number of eREGs that are mapped to an eCCE is based on a cyclic prefix (CP) and the subframe.

24. The WTRU of claim 23, wherein four eREGs are mapped to an eCCE when the CP comprises a normal CP and the subframe comprises a normal subframe or a special subframe associated with a special subframe configuration of 3, 4, or 8.

25. The WTRU of claim 23, wherein eight eREGs are mapped to an eCCE when the CP comprises a normal CP and the subframe comprises a special subframe associated with a special subframe configuration of 1, 2, 6, 7, or 9 or when the CP comprises an extended CP and the subframe comprises a special subframe associated with a special subframe configuration of 1, 2, 3, 5, or 6.

26. The WTRU of claim 22, wherein number of eCCEs available to the ePDCCH is a function of one or more of a type of ePDCCH, the subframe, a subframe configuration, the number of PRB pairs associated with the ePDCCH resource, the number of available REs in a PRB pair associated with the ePDCCH resource, or a cyclic prefix (CP).

27. The WTRU of claim 16, wherein the ePDCCH resource monitored on the subframe comprises a WTRU-specific search space.

28. The WTRU of claim 16, wherein the processor is configured to execute the processor-executable instructions to monitor a PDCCH resource on a subframe not configured for monitoring the ePDCCH resource.

29. The WTRU of claim 28, wherein the PDCCH resource monitored comprises a common search space.

30. The WTRU of claim 16, wherein candidates for the ePDCCH resource of the subframe are selected based on a hashing function, wherein the hashing function is different for each ePDCCH resource.

* * * * *